(12) United States Patent
Ichiyama

(10) Patent No.: US 7,999,432 B2
(45) Date of Patent: Aug. 16, 2011

(54) FIELD CONTROLLABLE ROTATING ELECTRIC MACHINE SYSTEM WITH MAGNETIC EXCITATION PART

(75) Inventor: Yoshikazu Ichiyama, Kyoto (JP)

(73) Assignee: Kura Laboratory Corporation, Kyoto (JP)

( * ) Notice: Subject to any disclaimer, the term of this patent is extended or adjusted under 35 U.S.C. 154(b) by 576 days.

(21) Appl. No.: 12/136,975

(22) Filed: Jun. 11, 2008

(65) Prior Publication Data

US 2009/0045765 A1    Feb. 19, 2009

Related U.S. Application Data

(63) Continuation-in-part of application No. 12/024,911, filed on Feb. 1, 2008, now abandoned.

(30) Foreign Application Priority Data

| Aug. 17, 2007 | (JP) | ................................. 2007-212674 |
| Oct. 29, 2007 | (JP) | ................................. 2007-279975 |
| Dec. 4, 2007  | (JP) | ................................. 2007-313140 |
| Jan. 24, 2008 | (JP) | ................................. 2008-13500  |
| Mar. 24, 2008 | (JP) | ................................. 2008-74809  |
| Apr. 28, 2008 | (JP) | ................................. 2008-116918 |

(51) Int. Cl.
- *H02K 21/16* (2006.01)
- *H02K 1/22* (2006.01)
- *H02K 1/27* (2006.01)
- *H02K 16/02* (2006.01)
- *H02K 21/12* (2006.01)
- *H02P 9/14* (2006.01)

(52) U.S. Cl. .......... 310/190; 310/191; 310/114; 322/28; 322/51

(58) Field of Classification Search ........... 310/190, 310/191, 114; 322/29, 50
See application file for complete search history.

(56) References Cited

U.S. PATENT DOCUMENTS

| 3,411,027 | A | * | 11/1968 | Rosenberg | .................... 310/181 |
| 3,713,015 | A |   | 1/1973  | Frister    |                              |
| 4,027,229 | A | * | 5/1977  | Frink      | .............................. 322/50 |
| 4,766,362 | A | * | 8/1988  | Sadvary    | .......................... 322/50 |
| 4,885,493 | A |   | 12/1989 | Gokhale    |                              |
| 6,049,152 | A | * | 4/2000  | Nakano     | ......................... 310/114 |
| 6,121,705 | A | * | 9/2000  | Hoong      | ........................... 310/113 |
| 6,900,570 | B2| * | 5/2005  | Ifrim      | ............................ 310/190 |
| 7,567,006 | B2| * | 7/2009  | Ichiyama   | ....................... 310/191 |
| 7,750,527 | B2| * | 7/2010  | Shibukawa  | ................... 310/191 |

FOREIGN PATENT DOCUMENTS

JP    2001-25190    1/2001

(Continued)

*Primary Examiner* — Burton Mullins
(74) *Attorney, Agent, or Firm* — Ditthavong Mori & Steiner, P.C.

(57) ABSTRACT

In a magnet-exciting rotating electric machine system, every magnetic salient pole group to be magnetized in a same polarity is collectively magnetized by a magnetic excitation part. In the magnetic excitation part, a main magnetic flux path in which a magnetic flux circulates through the armature and a bypass magnetic flux path are connected to the field magnet in parallel. Magnetic flux amount in each path is controlled by mechanical displacement. Thereby, the rotating electric machine system and the magnetic flux amount control method in which magnetic field control is easy are provided. Also, means and method are provided so that a power required for the displacement may be made small by adjusting magnetic resistance of the above magnetic flux path.

34 Claims, 31 Drawing Sheets

FOREIGN PATENT DOCUMENTS

| | | |
|---|---|---|
| JP | 2001-275326 | 10/2001 |
| JP | 2002-58223 | 2/2002 |
| JP | 2002-136012 | 5/2002 |
| JP | 2002-204541 | 7/2002 |
| JP | 2004-222350 | 8/2004 |
| JP | 2004-242462 | 8/2004 |
| JP | 2004-320864 | 11/2004 |
| JP | 2004-328944 | 11/2004 |
| JP | 2004-336880 | 11/2004 |
| JP | 2004-357357 | 12/2004 |
| JP | 2006-136088 | 5/2006 |
| JP | 2006-191783 | 7/2006 |
| JP | 2006-246662 | 9/2006 |
| JP | 2007/110776 | 4/2007 |

* cited by examiner

FIELD CONTROLLABLE ROTATING ELECTRIC MACHINE SYSTEM WITH MAGNETIC EXCITATION PART

CROSS-REFERENCE TO RELATED APPLICATIONS

The present application is a continuation-in-part of U.S. patent application Ser. No. 12/024,911, filed Feb. 1, 2008, and claims priority under 35 U.S.C. §119 to Japanese Patent Application Nos. 2007-212674 filed Aug. 17, 2007, 2007-279975 filed Oct. 29, 2007, 2007-313140 filed Dec. 4, 2007, 2008-13500 filed Jan. 24, 2008, 2008-74809 filed Mar. 24, 2008 and 2008-116918 filed Apr. 28, 2008. The contents of these applications are incorporated herein by reference in their entirety.

BACKGROUND OF THE INVENTION

1. Field of the Invention

The present invention relates to rotating electric machines such as electric generators and electric motors having a permanent magnet.

2. Description of the Related Art

Rotating electric machine apparatuses, such as an electric generator for generating electric power electromagnetically by relative rotation between a permanent magnet and an armature, or an electric motor for generating relative rotation between a permanent magnet and an armature by interaction between the permanent magnet and a magnetic field generated by current supplied to the armature, are excellent in energy efficiency and have been widely used routinely along with technical progress of permanent magnets. However, in both electric motors and electric generators, optimum power is not always obtained in a wide rotational speed range because of constant magnetic field strength from the field magnet.

In the case of the electric motor, the control thereof becomes difficult in a high-speed rotational region because the back electromotive force (power generation voltage) becomes too high, and therefore, various methods for weakening the field strength as field-weakening control have been proposed. Moreover, in the case of the electric generator, a constant-voltage electric generator by only field current control or a constant-voltage circuit in which the power generation voltage is made to be constant by a semiconductor has been exclusively used so that the power generation voltage is made to be a predetermined level in a wide rotational-speed range. In the electric motor, field-weakening control by current phase control has been widely adopted, but energy loss is large because current flows that does not directly contribute to the rotation. When current excitation for the control is used with a permanent magnet excitation, the structure of the rotating electric machine becomes complex and additionally energy loss is involved. Furthermore, in the case of the electric generator, there has been a problem that cost of constant-voltage electronic circuit with a large electric power is large. Under such a circumstance, measures for reducing the cost of the entire apparatus while binding the electronic-circuit control to a minimum by devising the structure of the rotating electric machine apparatus have been required for a long time, and various proposals have been made.

In U.S. Pat. No. 3,713,015, there is described an alternating current generator in which a permanent magnet rotor is divided into two and the two permanent magnet rotors are relatively displaced in the circumferential direction to effectively control the field strength. There is an advantage that the energy loss for the control is small because the relative displacement can be maintained mechanically, but there is a disadvantage that eddy-current loss is large in a high-speed rotational region because the amount of the magnetic flux flowing into the armature is constant. In Japanese Unexamined Patent Publication (Kokai) No. 2004-320864 and No. 2004-328944, there are described apparatuses for controlling a magnetic field strength by changing magnetic resistance in a magnetic circuit including the field magnet. Furthermore, in U.S. Pat. No. 4,885,493, Japanese Unexamined Patent Publication (Kokai) No. 2004-357357 and No. 2006-246662, apparatuses for making the field magnet short have been described. In general, when the magnetic circuit including the magnet has a movable part, there is a magnetic force of displacing the movable part to the direction in which the magnetic flux quantity flowing through the magnetic circuit becomes larger (the direction in which the magnetic resistance becomes smaller). The field magnet is a source for generating force or generating power in the rotating electric machine apparatus, and the magnetic force thereof is proportional to the output of the rotating electric machine in the proposed example of the rotating electric machine apparatus for controlling the magnetic resistance of the magnetic circuit or for short-circuiting the field magnet by mechanical displacement. A large force is required for the displacement control of the mechanism and vibration or hunting of the members is caused to make it difficult to perform the accurate control. Furthermore, a large-power actuator, a control mechanism involving excessive mechanical strength, and so forth are required, and therefore, realization of the apparatus involves difficulty.

The contents of U.S. Pat. Nos. 3,713,015 and 4,885,493, Japanese Unexamined Patent Publication Nos. 2004-320864, 2004-328944, 2004-357357, and No. 2006-246662 are incorporated herein by reference in their entirety.

SUMMARY OF THE INVENTION

Accordingly, an embodiment of the present invention advantageously provides a method for controlling a magnetic flux amount, and a rotating electric machine system, by which field-weakening control becomes easy, while considering the following conditions: (1) there is little concern made to demagnetize a field magnet; (2) power required for an actuator in the magnetic flux amount control can be reasonable, and so forth.

An embodiment of a rotating electric machine system according to the present invention is indicated as follows. A surface magnetic pole part and an armature are disposed to be capable of relatively rotating, and a magnetic excitation part is further included. The armature having an armature coil. The surface magnetic pole part has a plurality of magnetic salient poles disposed in a circumferential direction oppositely to the armature, and every magnetic salient pole group to be magnetized in same polarity is collectively magnetized by the magnetic excitation part. The magnetic excitation part has a field magnet, one pole of the field magnet is opposed to a main magnetic pole and a bypass magnetic pole. A main magnetic flux path and a bypass magnetic flux path are connected to the field magnet in parallel. The main magnetic flux path is a magnetic flux path in which a magnetic flux flowing into the main magnetic pole from one pole of the field magnet returns to other pole of the field magnet through the magnetic salient pole and the armature. The bypass magnetic flux path is a magnetic flux path in which a magnetic flux flowing into the bypass magnetic pole from one pole of the field magnet returns to other pole of the field magnet mainly in the magnetic excitation part. Any one of the field magnet and a unit of the main magnetic pole and the bypass magnetic pole serves as a movable magnetic pole part, and the movable magnetic pole part is composed capable of being relatively displaced with respect to the other one thereof so that an area of the field magnet opposed to the main magnetic pole and an area of the field magnet opposed to the bypass magnetic pole can be changed respectively while a sum of the area of each above is maintained to be substantially constant. And thereby, an amount of the magnetic flux flowing through the armature is controlled by displacing the movable magnetic pole part according to the output of the rotating electric machine system so that the output is optimized.

In this composition, the main magnetic pole and the bypass magnetic pole are opposite to the field magnet through a minute gap, magnetic flux is perpendicular to those boundary surfaces in the field magnet and a magnetic material neighborhood, so the magnetic flux from the field magnet approximately flows like laminar flow into the main magnetic pole and the bypass magnetic pole, and therefor an amount of the magnetic flux shunted to the main magnetic pole is almost proportional to an area of the field magnet opposed to the main magnetic pole. If the above-mentioned minute gap is made small as much as possible and the gap between the main magnetic pole and the bypass magnetic pole in an opposite face with the field magnet is also further set up minutely, the above-mentioned magnetic flux distribution will become close to more complete laminar flow. Still more precise control of the amount of magnetic flux is attained. Even if an amount of the magnetic flux flowing through the main magnetic flux path is changed, the field magnet has the bypass magnetic flux path, so risk for the field magnet being demagnetized is avoidable.

This invention is further proposing, establishing magnetic resistances of the main magnetic flux path and the bypass magnetic flux path approximately equal each other as a minimum magnetic force condition. Then total amount of the magnetic flux which flows from the field magnet is maintained substantially constant, magnetic force preventing the movable magnetic pole part displacement can be maintained small, and precise magnetic flux amount control is made possible. The meaning which is "approximately equal" is to establish magnetic resistances thereof equally each other so that the magnetic force may be suppressed below power of an actuator used for the displacement.

Setting magnetic resistance of both above-mentioned magnetic flux paths to the minimum magnetic force condition, the magnetic force disturbing the movable magnetic pole part displacement can be maintained small and also magnetic flux leakage between both magnetic flux paths can be made small. But there are many factors which fluctuate the magnetic resistance of magnetic flux paths. That is, sizes of parts may vary within tolerances in mass production stage, when magnetic flux leakage between magnetic flux paths cannot be disregarded, a displacement position of the movable magnetic pole part may influence the magnetic resistance thereof, and magnetic permeability of the magnetic material of which constitutes magnetic flux path is sensitive to the temperature, then the magnetic resistance of magnetic flux paths may fluctuate. Furthermore, when current flows into an armature coil, the magnetic resistance of the main magnetic flux path may fluctuate effectively. Then the magnetic resistance of each magnetic flux path may be changed according to the operating condition of the rotating electric machine, therefore magnetic resistances of the bypass magnetic flux path and the main magnetic flux path are set to the minimum magnetic force condition on a state of rest or an average operating condition according to the rotating electric machine system specification.

This invention is further proposing, providing a magnetic resistance adjusting means, adjusting the magnetic resistance of the main magnetic flux path or the bypass magnetic flux path just after manufacture or during operation of the rotating electric machine apparatus, and making power smallness required for the displacement of the movable magnetic pole part. Also, this invention is proposing means and method for acquiring the minimum magnetic force condition in learning way during normal operation of the rotating electric machine apparatus. Thereby, a magnetic force disturbing the displacement of the movable magnetic pole part may be made smallness by adjusting the magnetic resistance of the both magnetic flux paths to the minimum magnetic force condition at each operating condition or at a time of the magnetic flux amount change. Moreover, this invention is proposing means and method to exploit a magnetic force appeared by making the magnetic resistance of the both main magnetic flux paths deviate from the minimum magnetic force condition for the movable magnetic pole part displacement. That is to adjust the magnetic resistance of the main magnetic flux path and the bypass magnetic flux path as follows; a magnetic resistance of the main magnetic flux path is made smaller or the bypass magnetic flux path thereof is made larger from the minimum magnetic force condition at a time of increasing the magnetic flux amount, and a magnetic resistance of the main magnetic flux path is made larger or the bypass magnetic flux path thereof is made smaller from the minimum magnetic force condition at a time of decreasing the magnetic flux amount. Specifically, changing a non-magnetic gap length of which magnetic flux path includes and controlling current which flows through the coil wound around the magnetic flux path are proposed. And also controlling magnetic property of the magnetic material with temperature change or magnetic saturation phenomena etc. may be adopted.

According to this invention explained above, the magnetic flux amount in the armature is controllable by making the movable magnetic pole part displace, various means can be applied for displacing the movable magnetic pole part. For example, there are a mechanical means for preliminarily setting by hand as a semi-fixed mechanism, a governor mechanism for moving the movable magnetic pole part by utilizing a centrifugal force, a mechanical means having an actuator in a rotor in the case that the field magnet part is in the rotor side, a mechanical means for performing displacement from the outside of the rotor, and so forth.

In the rotating electric machine apparatus, there are a structure in which the field magnet part rotates and the armature stands still and an opposite structure thereof, a structure in which the cylindrical armature and the field magnet part are opposed to each other in the radial direction through an air gap, and a structure in which the approximately disc-like armature and the field magnet part are opposed in the axial direction through an air gap. Embodiments of the present invention can also be applied to any one of the above-described structures with a permanent magnet excitation. Moreover, the rotating electric machine is an electric motor when a current to the armature coils is input and the rotational force is output, and the rotating electric machine is an electric generator when the rotational force is input and the current is output from the armature coils. Optimal magnetic structures exist in the electric motor or the electric generator, but are reversible, and the rotating electric machine system of this invention can be applied to both of the electric motor and the electric generator.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DETAILED DESCRIPTION OF THE PREFERRED EMBODIMENTS

Figure 1:
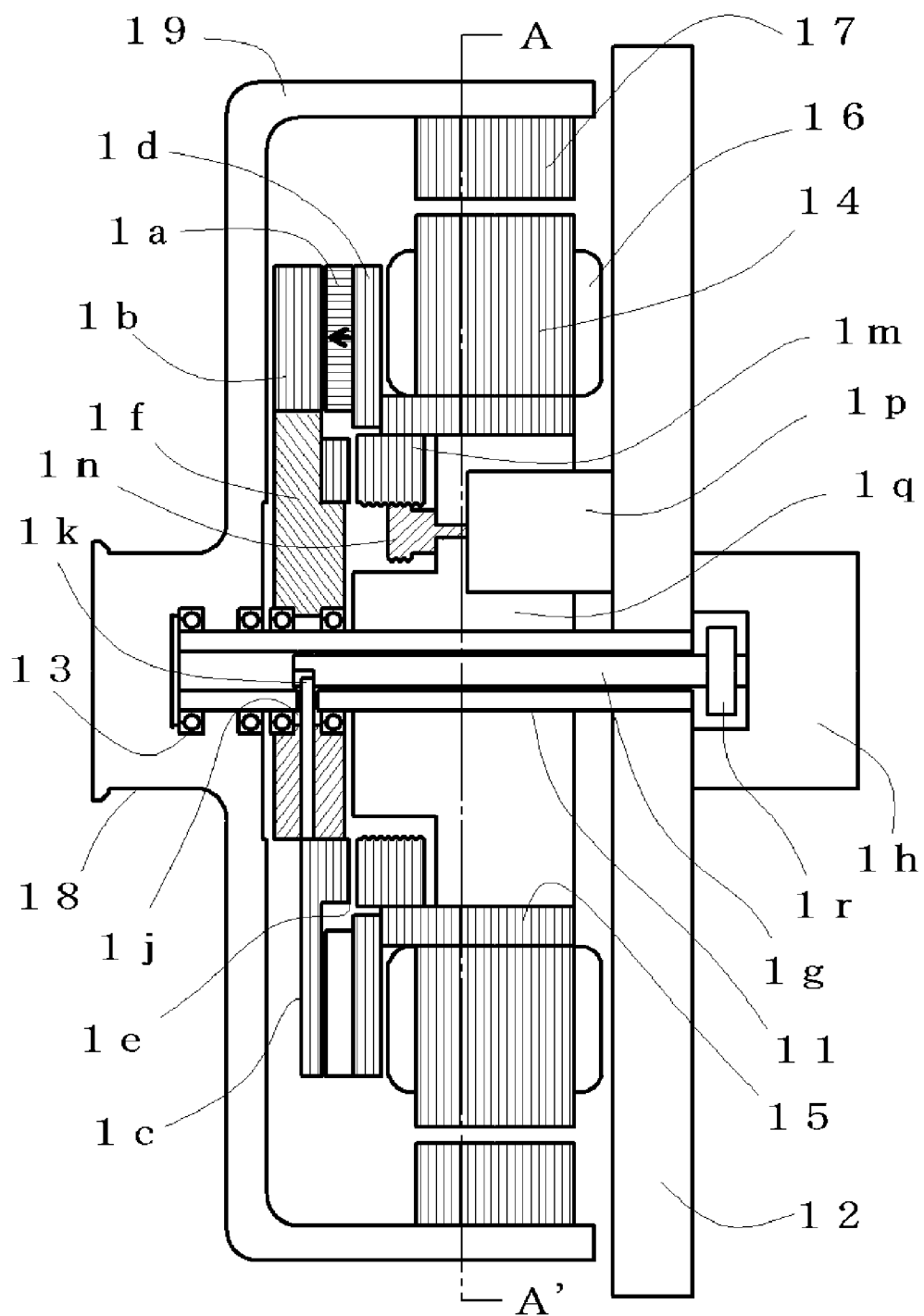
FIG. 1 is a longitudinal sectional view of a rotating electric machine apparatus according to a first embodiment of the present invention.

Embodiments of the present invention will be described hereinafter with reference to the accompanying drawings. In the following description, the constituent elements having substantially the same function and arrangement are denoted by the same reference numerals, and repetitive descriptions will be made only when necessary.

The rotating electric machine system according to a first embodiment of the present invention will be explained by using FIGS. 1 to 6. The first embodiment is a rotating electric machine system having a unipolar rotor with a radial gap structure and an outer rotor structure. A magnetic excitation part is disposed in a static side contiguous to an armature in an axial direction, and has a magnetic resistance adjusting means of a bypass magnetic flux path.

FIG. 1 illustrates embodiment applied this invention to the rotating electric machine apparatus with an outer rotor structure, and the magnetic salient pole is disposed in the rotor, and the armature is disposed on a fixed shaft 11. The fixed shaft 11 is fixed to a substrate 12, the armature is fixed to the fixed shaft 11, magnetic salient poles 17 are disposed in an iron rotor housing 19 made of a magnetic material that is supported rotatably through bearings 13 by the fixed shaft 11.

The armature includes, a cylindrical magnetic yoke 15 fixed to the fixed shaft 11, a plurality of magnetic teeth 14 extending in the radial directions from the cylindrical magnetic yoke 15, and armature coils 16 wound around the magnetic teeth 14. The rotor housing 19 of the rotor has a pulley portion 18 for transmitting a rotational force between the rotor and outer equipment, the magnetic salient poles 17 and non-magnetic portions are disposed one after the other in the circumferential direction, oppositely to the magnetic teeth 14.

The magnetic excitation part for magnetically exciting the magnetic salient poles 17 is disposed around the fixed shaft 11 and is disposed along with the armature, and main part thereof includes a field magnet 1a, a main magnetic pole 1b, a bypass magnetic pole 1c, and a base magnetic pole 1d. And, the main magnetic pole 1b and the bypass magnetic pole 1c are supported by a magnetic excitation part support 1f, and the magnetic excitation part support 1f is rotatably supported by the fixed shaft 11. The number 1e represents an air gap between an extending portion of the bypass magnetic pole 1c and a movable base magnetic pole 1m. A gap length adjusting means of the air gap 1e includes the movable base magnetic pole 1m, an adjusting screw in prepared in an armature support 1q, and an actuator 1p.

The fixed shaft 11 has a hollow structure and has a control rod 1g to be able to slide in the hollow, and the control rod 1g is composed so as to be displaced in the circumferential direction by an actuator 1h. The fixed shaft 11 has a slit portion 1j passing through the hollow, and is composed so that a pin 1k fixed to the magnetic excitation part support 1f through the slit portion 1j engages with the control rod 1g. Therefore, the magnetic excitation part support 1f, the main magnetic pole 1b, and the bypass magnetic pole 1c are rotationally displaced by rotational displacement of the control rod 1g. The number 1r represents a torque sensor.

Figure 2:
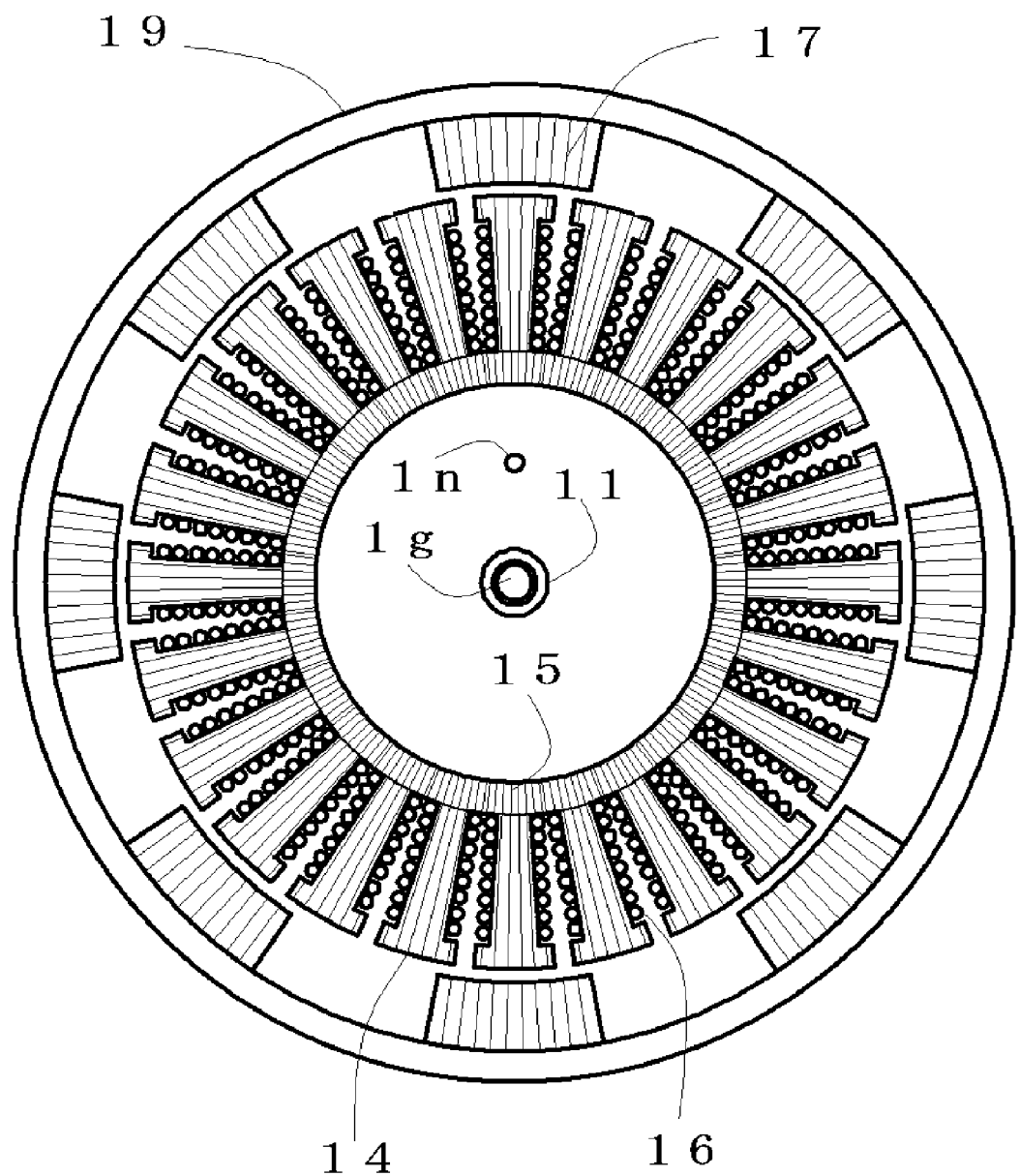
FIG. 2 is a sectional view showing an armature and a rotor of the rotating electric machine apparatus shown in FIG. 1.

FIG. 2 illustrates a sectional view of the armature and the rotor along A-A' of FIG. 1, and some of component parts are appended with numbers for explaining the reciprocal relation. The armature is composed of the cylindrical magnetic yoke 15 fixed to the armature support 1q, a plurality of the magnetic teeth 14 having non-magnetic portions in the circumferential direction, and the armature coils 16 wound around the magnetic teeth 14. In the first embodiment, twenty four armature coils 16 are included and connected so as to have three phases. The magnetic teeth 14 and the cylindrical magnetic yokes 15 are composed by punching out a silicon steel plate by a predetermined die and then stacking the punched plates, and the armature coils 16 are wound.

In FIG. 2, in the rotor, eight magnetic salient poles 17 each in which silicon steel plates are stacked are disposed at even intervals in the circumferential direction. Spaces between the magnetic salient poles 17 are non-magnetic portions and composed as mere air gaps, but when windage loss works against the energy efficiency or acoustic noise generates at high-speed rotation, non-magnetic resin or the like having large specific resistance can be disposed in the air gap. The field magnet is not disposed in the rotor, but by the magnetic excitation part, each of the magnetic salient poles 17 is magnetically connected to an pole of the field magnet 1a and each of the magnetic teeth 14 is magnetically connected to the other pole, and then the magnetic salient poles 17 are magnetized to be same magnetic direction. Such composition is a unipolar rotating electric machine and has a difficult point of being used as an electric motor or as an electric generator, but has a merit that the structure is simple.

Figure 3A:
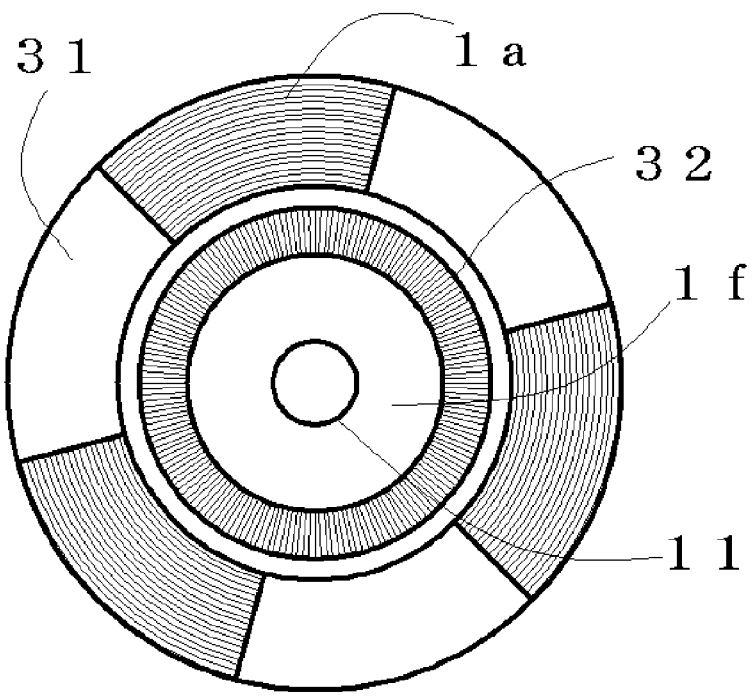
FIG. 3A is a plan view containing a field magnet seen from a main magnetic pole and a bypass magnetic pole side, 3B is a plan view containing a main magnetic pole and a bypass magnetic pole seen from a rotor housing side of the rotating electric machine apparatus shown in FIG. 1.
Figure 3B:
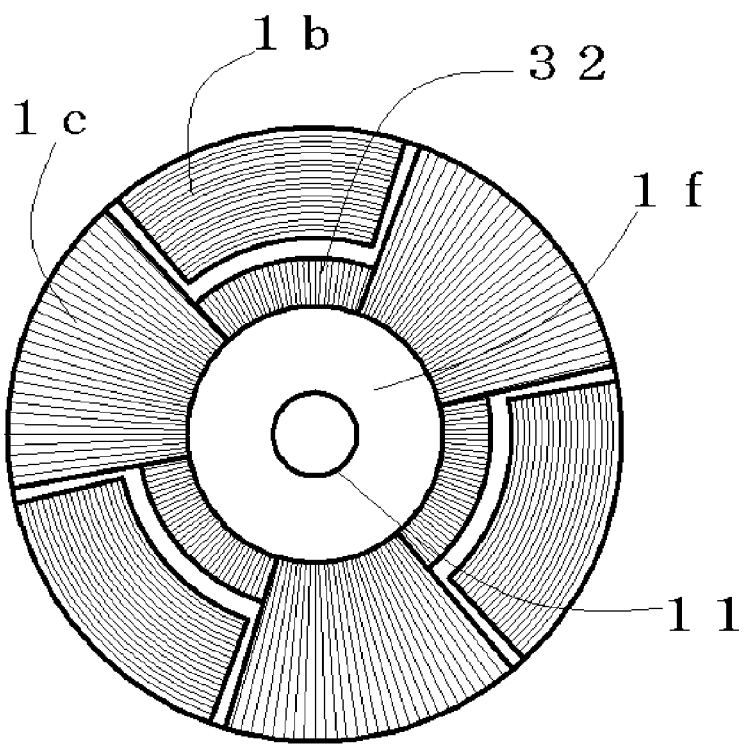

FIGS. 3A and 3B are plan views for explaining a structure of the magnetic excitation part as indicated in FIG. 1 and the operating principle for controlling magnetic flux amount.

FIG. 3A is a plan view including the field magnet 1a viewed from the side of the main magnetic pole 1b and the bypass magnetic pole 1c, and the FIG. 3B is a plan view including the main magnetic pole 1b and the bypass magnetic pole 1c viewed from the side of the rotor housing 19. In FIG. 1 and FIG. 3A, three field magnets 1a are disposed in the circumferential direction with sandwiching non-magnetic portions 31. The magnetization direction of each of the field magnets 1a is the axial direction as represented by the arrows in FIG. 1, and two poles of the field magnet 1a are made to serve as a first magnet pole and a second magnet pole, the second magnet pole is connected to the cylindrical magnetic yoke 15 through the base magnetic pole 1d, and the first magnet pole 1s magnetically connected to the rotor housing 19 through the main magnetic pole 1b.

As shown in FIG. 1 and FIG. 3B, each of the main magnetic poles 1b and each of the bypass magnetic poles 1c are rotatably disposed side by side, through micro gap and oppositely to the first magnet pole of the field magnet 1a. In FIGS. 3A and 3B, a cylindrical magnetic core represented by the number "32" is connected to the bypass magnetic pole 1c and rotatably displaced together, and connected to the base magnetic pole 1d through the air gap 1e, the movable base magnetic pole 1m, the cylindrical magnetic yoke 15. The movable base magnetic pole 1m is slid along the cylindrical magnetic yoke 15 by rotating the adjusting screw 1n.

The magnetic flux flowing from the first magnet pole of the field magnet 1a to the main magnetic pole 1b forms a main magnetic flux path circulating to the second magnet pole through the rotor housing 19, the magnetic salient poles 17, the magnetic teeth 14, the cylindrical magnetic yoke 15, and the base magnetic pole 1d. The magnetic flux flowing into the bypass magnetic pole 1c forms a bypass magnetic flux path circulating to the second magnet pole through the cylindrical magnetic core 32, the air gap 1e, the movable base magnetic pole 1m, the cylindrical magnetic yoke 15, and the base magnetic pole 1d. By adjusting an opposed area and gap length of the air gap 1e, the magnetic resistance of the main magnetic flux path and the magnetic resistance of the bypass magnetic flux path are set to be approximately equal each other. At this time, the magnetic resistance of the main magnetic flux path fluctuates according to relative position between the magnetic salient poles 17 and the magnetic teeth 14, and therefore, the averaged magnetic resistance thereof is set to be approximately equal to the magnetic resistance of the bypass magnetic flux path.

Alternating magnetic flux does not flow through the main magnetic pole 1b, the bypass magnetic pole 1c, the cylindrical magnetic core 32, the movable base magnetic pole 1m, and the base magnetic pole 1d as a general rule, and therefore, they are composed of magnetic material that mainly has iron, which has a large saturation magnetic flux density, and the entirety thereof is compactly composed. In order that the magnetic resistance between the field magnet 1a and (the main magnetic pole 1b and the bypass magnetic pole 1c) is composed to be small, the field magnet 1a and (the main magnetic pole 1b and the bypass magnetic pole 1c) are composed to be opposed through micro air gap or slid to each other.

In FIGS. 3A and 3B, an angular length of the main magnetic pole 1b and an angular length of the bypass magnetic pole 1c are set up equally each other, an angular length of the field magnet 1a is set up equal to a sum of the angular length of the main magnetic pole 1b and an angular length of the gap between the main magnetic pole 1b and the bypass magnetic poles 1c, and displacement amount of the main magnetic pole 1b and the bypass magnetic pole 1c is specified below to the angular length of the main magnetic pole 1b. In this embodiment, a magnetic pole unit of the main magnetic pole 1b and the bypass magnetic pole 1c corresponds to a movable magnetic pole part, and is made to displace with respect to the field magnet 1a.

Figure 4A:
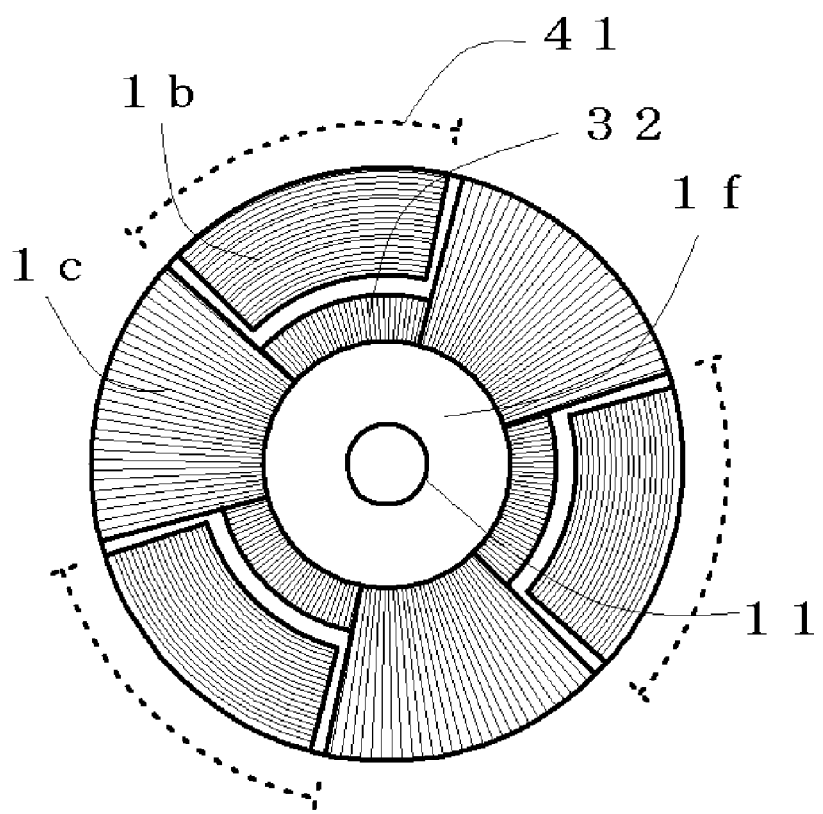
FIGS. 4A and 4B are plan views showing the main magnetic pole and the bypass magnetic pole seen from the rotor housing side of the rotating electric machine apparatus shown in FIG. 1.
Figure 4B:
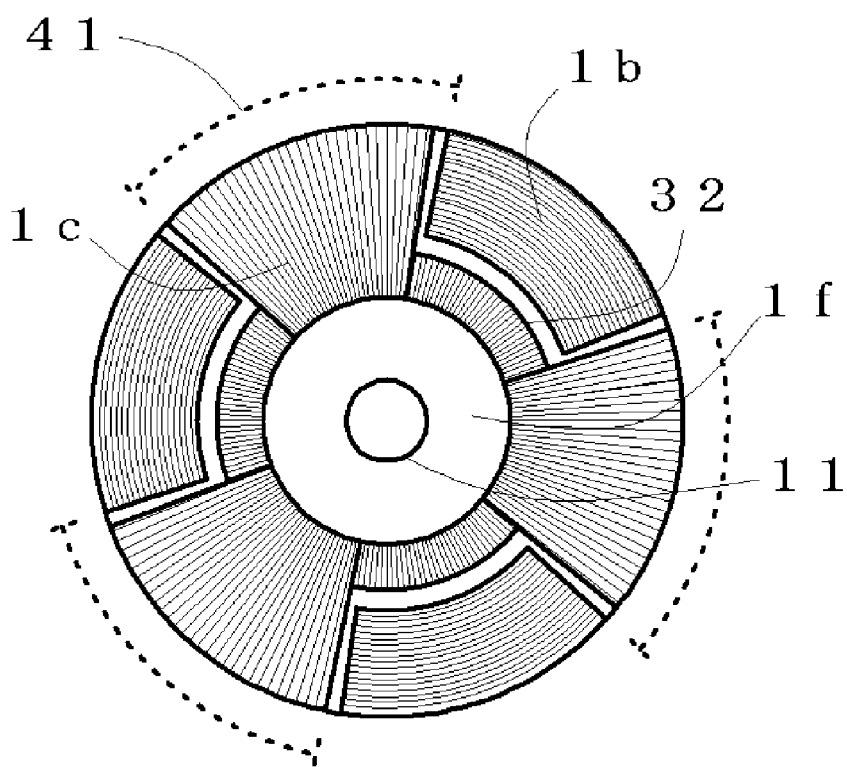

FIGS. 4A and 4B are plan views showing the main magnetic pole 1b and the bypass magnetic pole 1c viewed from the side of the rotor housing 19, similarly to FIG. 3B. The respective figures show the cases in which the displacement in the circumferential direction between the magnetic pole unit (the main magnetic pole 1b and the bypass magnetic pole 1c) and the field magnet 1a is minimum and maximum, respectively. That is, they show the cases in which the magnetic flux amount between the magnetic salient poles 17 and the magnetic teeth 14 are set to be maximum and minimum, respectively. In the figures, the number 41 shows the existence regions of the field magnets 1a in the circumferential direction, and as shown in FIG. 4A, in the state at the standard position, the field magnets 1a are opposed to the entire region of the main magnetic pole 1b and opposed slightly to the bypass magnetic pole 1c. In this case, the approximately entire amount of the magnetic flux from the field magnets 1a flows through the main magnetic poles 1b, the magnetic salient poles 17 and the magnetic teeth 14.

FIG. 4B shows the case in which the magnetic pole unit is rotationally displaced clockwise at the degree equal to the angular length of the main magnetic pole 1b, and in this state, the field magnet 1a is opposed to the entire region of the bypass magnetic pole 1c and opposed slightly to the main magnetic pole 1b. In this case, the approximately entire amount of the magnetic flux from the field magnets 1a circulates to the second magnet pole through the bypass magnetic pole 1c and through the cylindrical magnetic core 32, the air gap 1e, the movable base magnetic pole 1m, the cylindrical magnetic yoke 15, and the base magnetic pole 1d.

In the intermediate state between the cases shown in FIGS. 4A and 4B, the field magnet 1a is opposed to both of the main magnetic pole 1b and the bypass magnetic pole 1c, and magnetic flux from the field magnet 1a is divided to flow into the main magnetic flux path and the bypass magnetic flux path. The field magnet 1a faces the main magnetic pole 1b and the bypass magnetic pole 1c through micro gap by almost overall width of the field magnet 1a, magnetic flux crosses at right angles in a face of the field magnet 1a, the main magnetic pole 1b and the bypass magnetic pole 1c, so the magnetic flux flows like laminar flow between the field magnet 1a and the main magnetic pole 1b, the bypass magnetic pole 1c. Therefor, the magnetic flux is divided to flow, proportionally to the respective opposed areas of the main magnetic pole 1b and the bypass magnetic pole 1c. Furthermore, in this structure, the sum of the respective opposed areas of the main magnetic pole 1b and the bypass magnetic pole 1c is constant, and each area is changed according to the displacement. Magnetic resistances of the main magnetic flux path and the bypass magnetic flux path are set to be equal each other and the total amount of the magnetic flux from the field magnets 1a is always constant, and therefore, a magnetic force preventing the rotational displacement of the magnetic pole unit does not appear theoretically.

When position of the magnetic pole unit is kept within limits shown in FIGS. 4A and 4B, an area of the field magnet 1a opposed to the main magnetic pole 1b and an area of the field magnet 1a opposed to the bypass magnetic pole 1c are changed respectively according to the position while a sum of the area of each above is maintained to be constant. The magnetic flux amount which shunts in the main magnetic flux path is proportional to the displacement amount mostly. Even if the position exceeds the above-mentioned range, the magnetic flux amount control is also possible, but the relation between the displacement amount and the magnetic flux amount becomes unfixed. In this embodiment, position and angular length of the slit 1j in circumferential direction are set up to keep the position of the magnetic pole unit within the above-mentioned limits.

In general, when a magnetic circuit including a magnet has a movable part, there is a magnetic force of displacing the movable part to the direction in which magnetic flux quantity flowing through the magnetic circuit becomes larger (the direction in which a magnetic resistance becomes smaller). There are many proposals which are going to short-circuit the field magnet in order to control magnetic flux, or are going to change the magnetic resistance of the magnetic circuit by displacing a part of the magnetic circuit preceding this invention. However, the field magnet is a source for generating force or generating power in the rotating electric machine apparatus, and the magnetic force thereof is too large, and precise magnetic flux amount control thereby has been difficult. The magnetic force is suppressed small according to embodiments of the present invention explained above, and the precise control of magnetic flux amount becomes possible.

The field magnet 1a is opposing to the main magnetic pole 1b and the bypass magnetic pole 1c through micro gap in this embodiment. It is hard to constitute a magnetic resistance of the main magnetic flux path and the bypass magnetic flux path equally strictly each other. When a difference is in both magnetic resistances, and the field magnet 1a opposes to the main magnetic pole 1b and the bypass magnetic pole 1c through some magnetic material, a magnetic flux from the field magnet 1a is divided in the above-mentioned magnetic material. Therefore amount of the magnetic flux flowing through the main magnetic flux path does not become proportional to an opposite area between the field magnet 1a and the main magnetic pole 1b and becomes difficult for the magnetic flux amount control. When the field magnet 1a is opposed to the main magnetic pole 1b and the bypass magnetic pole 1c through some magnetic material because of structural reason, the magnetic material having strong anisotropy or thin thickness should be used to prevent the magnetic flux from being divided to flow within the magnetic material. This structure is included in the theme of the present invention in the point that the magnetic flux is substantially divided to flow at an end face of the field magnet 1a.

Figure 5:
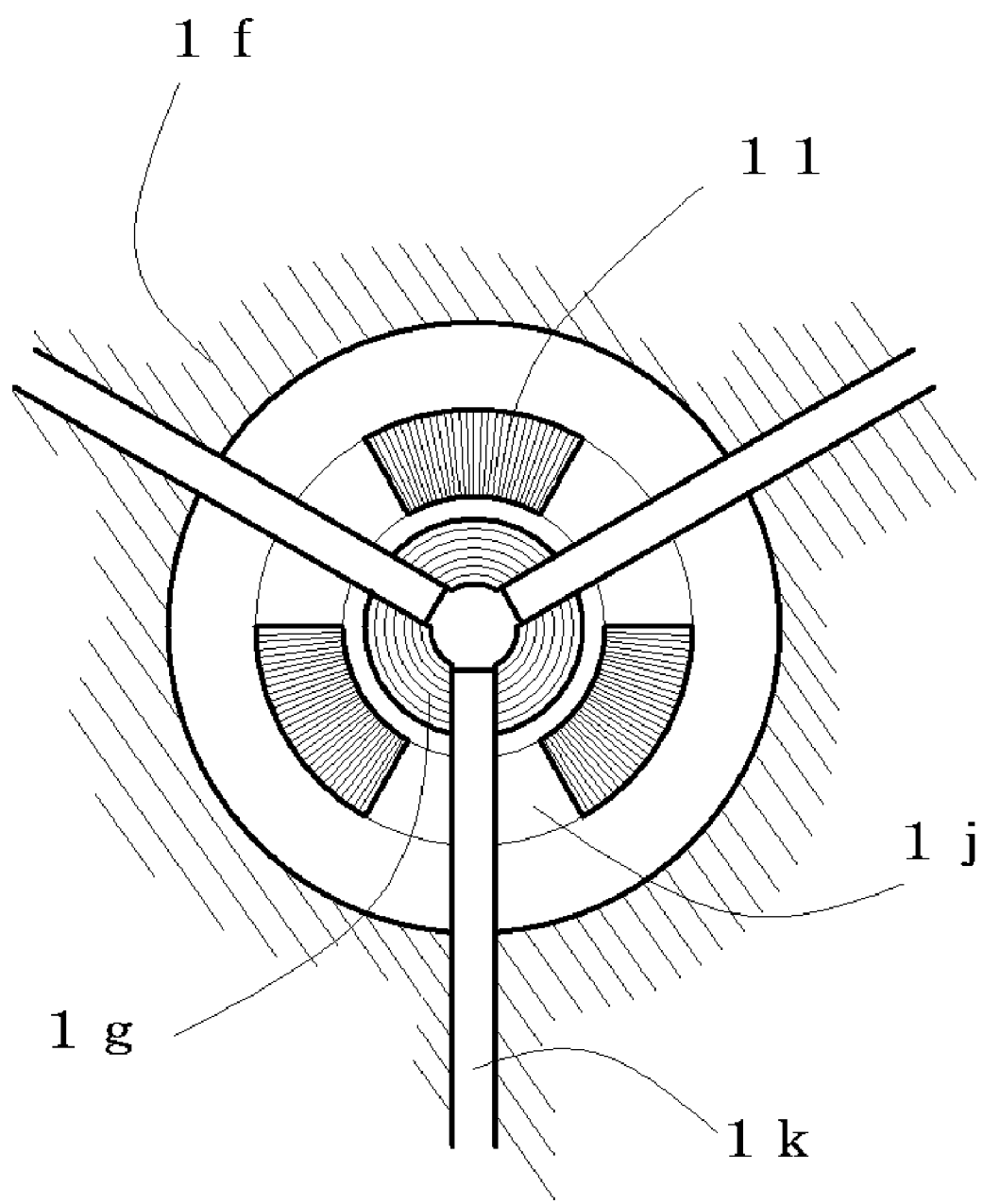
FIG. 5 is a sectional view showing a part of a displacement control means of the rotating electric machine apparatus shown in FIG. 1.

It has been explained that by rotationally displacing the magnetic pole unit, the magnetic flux flowing between the magnetic salient poles 17 and the magnetic teeth 14 can be controlled and the magnetic force preventing the rotational displacement is not theoretically caused. Hereinafter, by using FIGS. 1 and 5, the structure in which the magnetic pole unit are rotationally displaced will be explained. FIG. 5 is a magnified sectional view showing a part in which the pin 1k fixed to the magnetic excitation part support 1f engages with the control rod 1g. In this structure, there are three pins 1k, and the fixed shaft 11 is provided with the slit portion 1j, and three groove portions engaging to the pins 1k at the end face of the control rod 1g. The fixed shaft 11 is inserted into the magnetic excitation part support 1f, and then, the pins 1k are punched in from the periphery of the magnetic excitation part support 1f, and the pins 1k are fixed so as to stick out to the hollow in the fixed shaft 11. The control rod 1g is inserted into the hollow of the fixed shaft 11 and the pins 1k are made to engage with the groove portions at the end face of the control rod 1g.

The actuator 1h rotationally displaces the control rod 1g according to order from a control device, and rotationally displaces the magnetic excitation part support 1*f*. In this case, position in the circumferential direction and angular length of each of the slit portions 1*j* are set as displacement regulating means for binding the magnetic pole unit into the displacement in the range shown in FIGS. 4A and 4B. The actuator 1*h* is composed to maintain the rotational position of the magnetic pole unit by using a stepping motor, but can also be composed to be capable of maintaining the rotational position thereof by additionally combining a motor, a screw mechanism, a gear mechanism, or the like.

Setting magnetic resistance of the main magnetic flux path and the bypass magnetic flux path to the minimum magnetic force condition, magnetic flux leakage between both magnetic flux paths may be made small, and the magnetic force disturbing the movable magnetic pole part displacement can be maintained small. But there are many factors which fluctuate the magnetic resistance of magnetic flux paths. That is, sizes of parts may vary within tolerances in mass production stage, when magnetic flux leakage between magnetic flux paths cannot be disregarded, a displacement position of the movable magnetic pole part may influence the magnetic resistance thereof, and magnetic permeability of the magnetic material of which constitutes magnetic flux path is sensitive to temperature, then the magnetic resistance of magnetic flux paths may fluctuate. In this embodiment, the magnetic resistance of the main magnetic flux path and the bypass magnetic flux path is set up equally each other by adjusting length of the gap 1*e* in the bypass magnetic flux path, the magnetic force which disturbs displacement of the magnetic pole unit is made small, and then magnetic flux amount control is carried out. In the gap length adjusting means, optimum length of the gap 1*e* is acquired in learning way during operation of the rotating electric machine system, and this embodiment becomes possible to adapt magnetic resistance change of the main magnetic flux path by various causes.

The composition and the method which adjust the length of the gap 1*e* in learning way in order to adjust the resistance of the bypass magnetic flux path are explained using FIG. 1. The number 1*r* represents the torque sensor. Although torque sensors based on various principles exist, but a strain gauge is small and suitable for the torque sensor 1*r*. After the actuator 1*h* made the magnetic pole unit displace in circumferential direction in order to change the magnetic flux amount, the actuator 1*h* maintains its location. When the adjusting screw in is rotated by the actuator 1*p*, the movable base magnetic pole 1*m* is moved to back and forth direction along an axis, and length of the air gap 1*e* is changed. If a difference is in the magnetic resistance of the main magnetic flux path and the bypass magnetic flux path, the magnetic pole unit will receive the magnetic force to displace in the direction which increases the opposite area between the field magnet 1*a* and the magnetic pole of the magnetic flux path with smaller magnetic resistance. The actuator 1*h* maintains the circumferential direction location, so the control rod 1*g* will be twisted, and it is possible to detect the above-mentioned magnetic force by the torque sensor 1*r*.

Since the air gap 1*e* length change by the actuator 1*p* does not have direct influence on operation of the rotating electric machine, a control device changes the air gap 1*e* length by the actuator 1*p* during the normal operation, supervises the output of the torque sensor 1*r*, and maintains the air gap 1*e* length in that the magnetic force becomes smallness. This is close to the minimum magnetic force condition, and the magnetic force to disturb the displacement is suppressed small. Therefore, magnetic flux amount control is possible in actuator of the small output.

Figure 6:
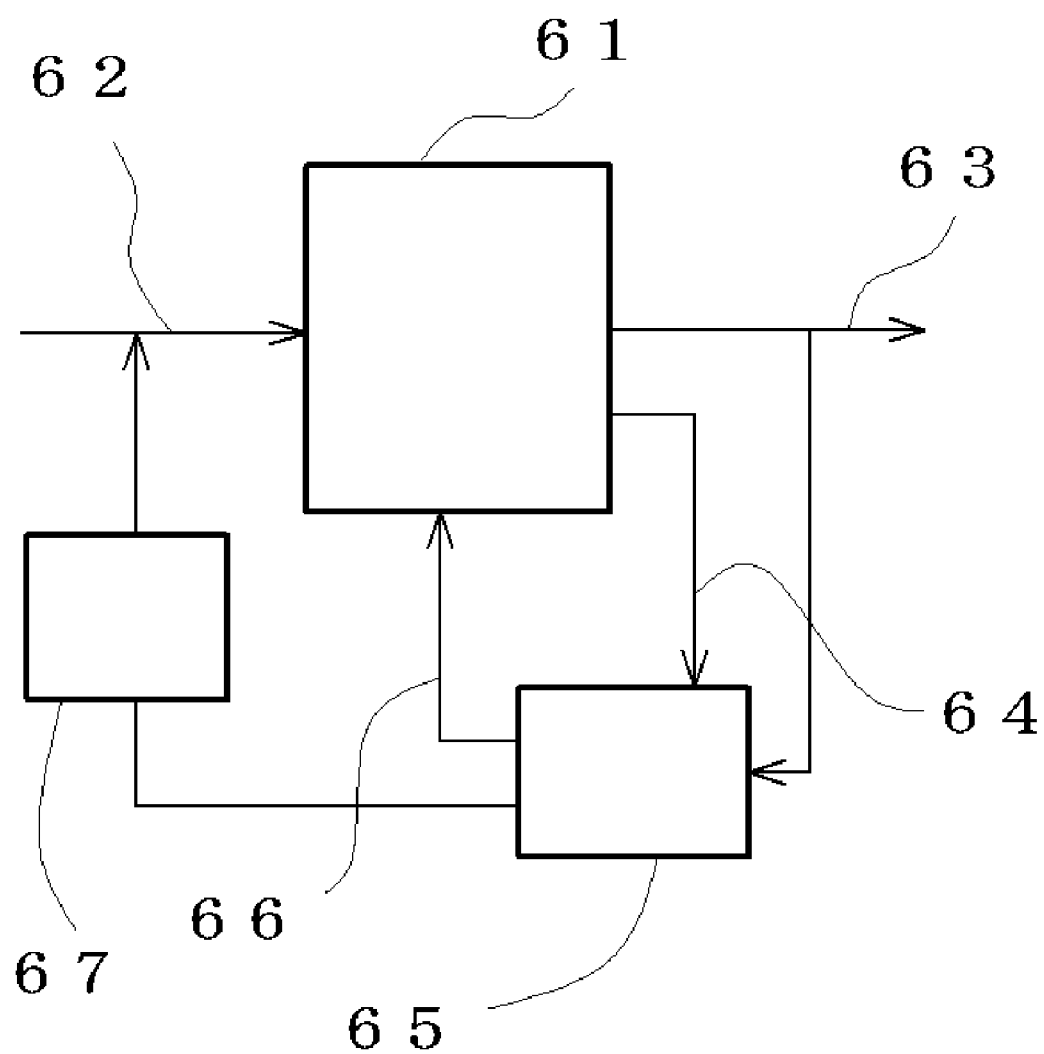
FIG. 6 is a block diagram of a rotating electric machine system for performing field-weakening control.

As described above, in the rotating electric machine apparatus shown in FIGS. 1 to 5, it has been explained that by relatively displacing the magnetic pole unit with respect to the field magnet 1*a*, an amount of the magnetic flux flowing through the armature can be controlled, and furthermore, the means and the method for displacing the magnetic pole unit with respect to the field magnet 1*a* have been explained. The first embodiment is a system for optimizing the output by controlling the magnetic flux amount, and the control method as the rotating electric machine system will be explained by using FIG. 6. FIG. 6 shows a block diagram of the rotating electric machine system for controlling the magnetic flux amount. In FIG. 6, the rotating electric machine apparatus 61 has an input 62 and an output 63, and a control device 65 controls the magnetic flux amount of the rotating electric machine apparatus 61 through a control signal 66 referring to an output 63 of the rotating electric machine apparatus 61 and a state signal 64 including positions of the magnetic pole unit. The number 67 represents a driving circuitry of the armature coils 16. If the rotating electric machine apparatus 61 is used as an electric generator, the input 62 is a rotational force and the output 63 is the electric power. If the rotating electric machine apparatus 61 is used as an electric motor, the input 62 is a driving current supplied to the armature coils 16 from the driving circuitry 67 and the output 63 is a rotational torque or a rotational speed.

A rotating electric machine system in which the rotating electric machine apparatus is used as an electric motor and by which the field-weakening control is performed to optimize the rotational force control will be explained. When the rotational speed that is the output 63 becomes larger than a predetermined value and an amount of the magnetic flux flowing through the armature is made to be smaller, the control device 65 displaces the magnetic pole unit clockwise in FIGS. 3A, 3B, 4A, and 4B through the actuator 1*h* and the control rod 1*g* by the control signal 66, and thereby, the opposed area between the main magnetic pole 1*b* and the field magnet 1*a* is made to be smaller. When the rotational speed becomes smaller than a predetermined value and an amount of the magnetic flux flowing through the armature is made to be larger, the control device 65 displaces the magnetic pole unit counterclockwise through the actuator 1*h* and the control rod 1*g* by the control signal 66, and thereby, the opposed area between the main magnetic pole 1*b* and the field magnet 1*a* is made to be larger.

A constant-voltage power generation system in which the rotating electric machine apparatus is used as an electric generator and by which the field-weakening control is performed to control the power generation voltage to be a predetermined voltage will be explained. When the power generation voltage that is the output 63 becomes larger than a predetermined value and an amount of the magnetic flux flowing through the armature is made to be smaller, the control device 65 displaces the magnetic pole unit clockwise in FIGS. 3A, 3B, 4A, and 4B through the actuator 1*h* and the control rod 1*g* by the control signal 66, and thereby, the opposed area between the main magnetic pole 1*b* and the field magnet 1*a* is made to be smaller. When the power generation voltage becomes smaller than a predetermined value and an amount of the magnetic flux flowing through the armature is made to be larger, the control device 65 displaces the magnetic pole unit counterclockwise through the actuator 1*h* and the control rod 1*g* by the control signal 66, and thereby, the opposed area between the main magnetic pole 1*b* and the field magnet 1*a* is made to be larger.

In the magnetic resistance adjusting means adopted in this embodiment, when controlling successively so that magnetic resistances of the main magnetic flux path and the bypass magnetic flux path may be set to the minimum magnetic force condition, power required for the movable magnetic pole part displacement can be always kept small, and also magnetic flux leakage between both magnetic flux paths may be made small without interrupting operation of the rotating electric machine system for field control.

Establishing magnetic resistances of the main magnetic flux path and the bypass magnetic flux path equally mostly each other, then the magnetic force disturbing the displacement can be suppressed small and the magnetic flux amount control can be carried out precisely. The meaning that is "equally mostly" is to establish both magnetic resistances so that the magnetic force may be suppressed below the output of the actuator used for the displacement.

When the magnetic resistance of each magnetic flux path can be dedicated in tolerance level from a design value, the magnetic resistance adjustment of the bypass magnetic flux path after the assembly of the rotating electric machine adopted can be made unnecessary. Moreover, when the magnetic resistance of the magnetic flux path under operation does not shift from an initial state greatly, it is possible to omit the learning process adopted by this embodiment. The magnetic resistance compensation method of the magnetic flux path can be partially adopted according to the specification or the operating condition of the rotating electric machine system for the optimal system.

The rotating electric machine system according to a second embodiment of the present invention will be explained by using FIGS. 7 to 10. The second embodiment is a rotating electric machine system in which two rotors each having a magnetic salient pole and a non-magnetic portion one after the other are disposed in parallel, and in which a magnetic excitation part is disposed at a housing side. Moreover, the second embodiment supplies predetermined current to an armature coil for accelerating or decelerating a rotor at a time of the magnetic flux amount control, adjusts a magnetic resistance of a main magnetic flux path effectively, and makes magnetic force assist for displacing a movable magnetic pole part.

Figure 7:
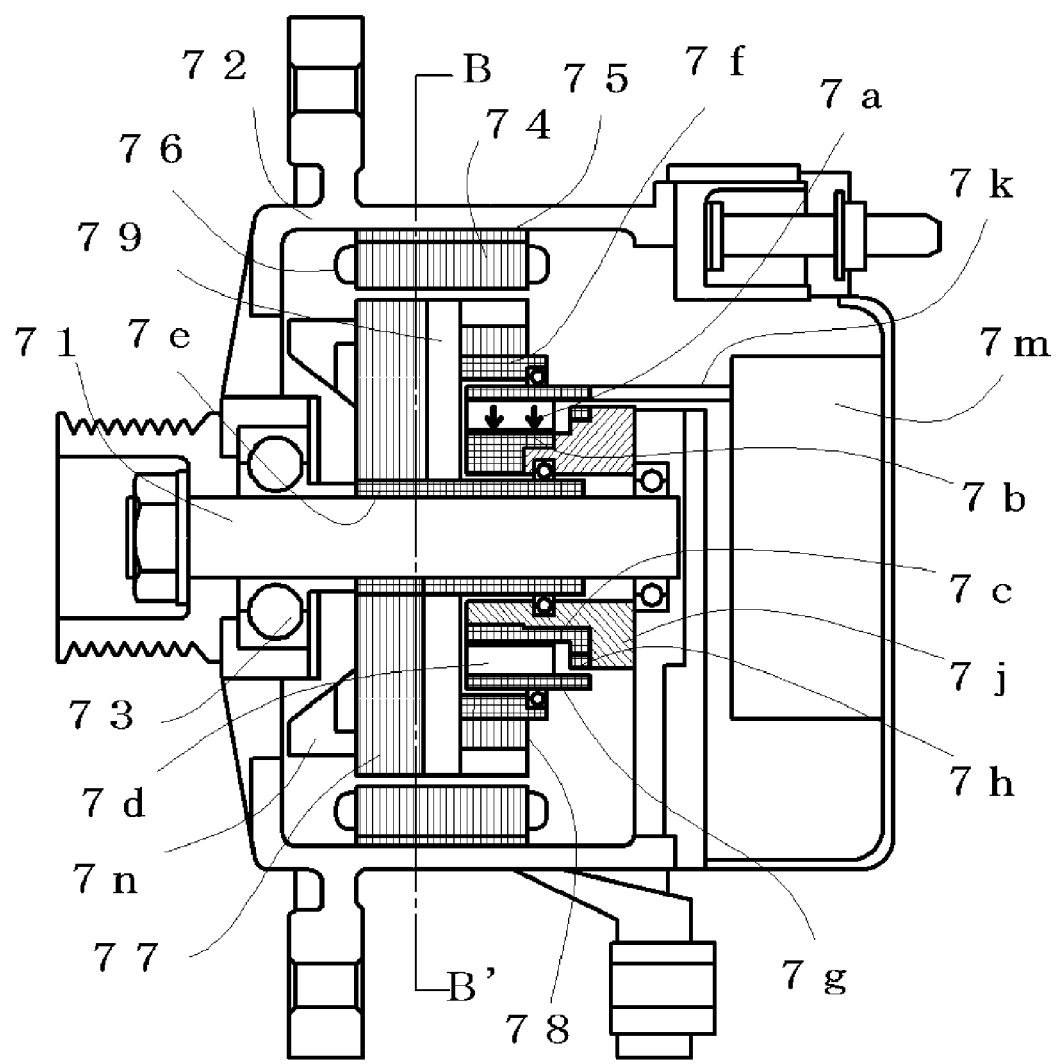
FIG. 7 is a longitudinal sectional view of a rotating electric machine apparatus according to a second embodiment of the present invention.

FIG. 7 illustrates embodiment applied this invention to the rotating electric machine apparatus having a radial gap structure, a rotational shaft 71 is supported rotatably by a housing 72 through bearings 73. An armature includes a cylindrical magnetic yoke 75 fixed to the housing 72, a plurality of magnetic teeth 74 extending radially from the cylindrical magnetic yoke 75, and armature coils 76 wound around the magnetic teeth 74. Each of the rotors has a simple structure in which the magnetic salient poles and the non-magnetic portions are lined one after the other in the circumferential direction, and surface magnetic pole parts 77 and 78 of two rotors are disposed side by side in the axial direction. The number 79 represents a non-magnetic disc.

A magnetic excitation part magnetizing the magnetic salient poles in the surface magnetic pole parts 77, 78 of the two rotors to be different polarities from each other is disposed at the housing 72 side, and the main part thereof includes a field magnet 7a, a main magnetic pole 7b, and a bypass magnetic pole 7c. The main magnetic pole 7b and the bypass magnetic pole 7c are fixed to a magnetic excitation part support 7j, and the magnetic excitation part support 7j is fixed to the housing 72. The field magnet 7a is fixed to a field magnet support 7g. The field magnet 7a and the field magnet support 7g correspond to a movable magnetic pole part, and are supported so as to be possible to slide on the main magnetic pole 7b and the bypass magnetic pole 7c in the circumferential direction, and are connected to an actuator 7m through a control rod 7k. Arrows in field magnet 7a show the magnetization direction, and the number 7n represents a cooling fan fixed to the rotor.

Figure 8:
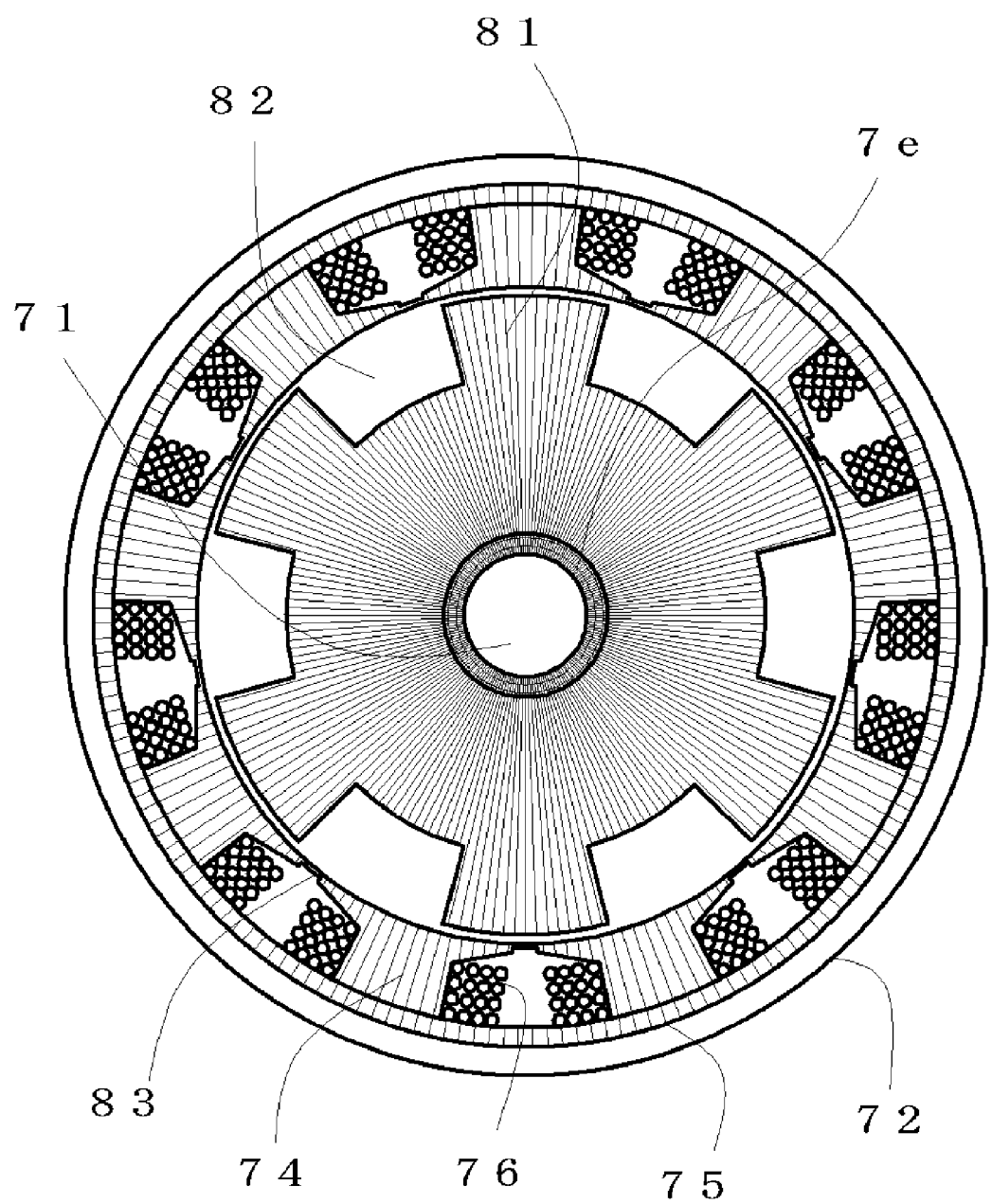
FIG. 8 is a sectional view showing an armature and a rotor of the rotating electric machine apparatus shown in FIG. 7.

FIG. 8 illustrates a sectional view of the armature and the rotor along the B-B' in FIG. 7, and some component parts are appended with numbers for explaining the mutual relations. The armature includes the cylindrical magnetic yoke 75 fixed to the housing 72, a plurality of magnetic teeth 74 extending radially from the cylindrical magnetic yoke 75 and having non-magnetic portions in the circumferential direction, and the armature coils 76 wound around the magnetic teeth 74. The present embodiment includes nine armature coils 76, and three phases thereof are connected. In the edges of the magnetic teeth 74 of the armature, saturable magnetic junctions 83 that are short in the radial direction are provided between the contiguous edges of the magnetic teeth 74. The magnetic teeth 74 and the saturable magnetic junctions 83 are punched out of a silicon steel plate by a predetermined die and stacked and wound with the armature coils 76, and then, combined with the cylindrical magnetic yoke 75, and thereby the armature is produced.

The saturable magnetic junctions 83 improve the support strength of the magnetic teeth 74 integrally with the magnetic teeth 74, and suppress unnecessary vibration of the magnetic teeth 74. The radial length of each of the saturable magnetic junctions 83 is set to be short, and thereby, the shape thereof that is easy to be magnetically saturated. Therefore, the junctions 83 are easy to be saturated with the magnetic flux generated by the armature coils 76 or the magnetic flux from the field magnet, and in such a case, the shorted amount of the magnetic flux generated by the armature coils 76 and the magnetic flux is made to be small. When a current is supplied to the armature coils 76, the saturable magnetic junctions 83 are magnetically saturated and then begin to leak the magnetic flux, along with time passing. The border of the effective non-magnetic portions appearing in the saturable magnetic junctions 83 that are magnetically saturated is not clear, and therefore, the distribution of the leaking magnetic flux becomes mild, and also in this point, the saturable magnetic junctions 83 contribute to the suppression of vibration with moderating time change of the force applied to the magnetic teeth 74.

In FIG. 8, the rotor has a structure having the magnetic salient poles 81 and the non-magnetic portions 82 one after the other in the circumferential direction and is composed by punching out a silicon steel plate by a predetermined die and stacking the punched-out plates. The surface magnetic pole parts 77, 78 of the two rotors have the same structures and are disposed so that the magnetic salient poles 81 of the surface magnetic pole part 77 and non-magnetic portions 82 of the surface magnetic pole part 78 correspond axially. The non-magnetic portions 82 between the magnetic salient poles 81 are composed simply as air gap. However, when windage loss works against the energy efficiency or acoustic noise generates at high-speed rotation, non-magnetic resin or the like having large specific resistance can be disposed in the air gap.

Figure 9:
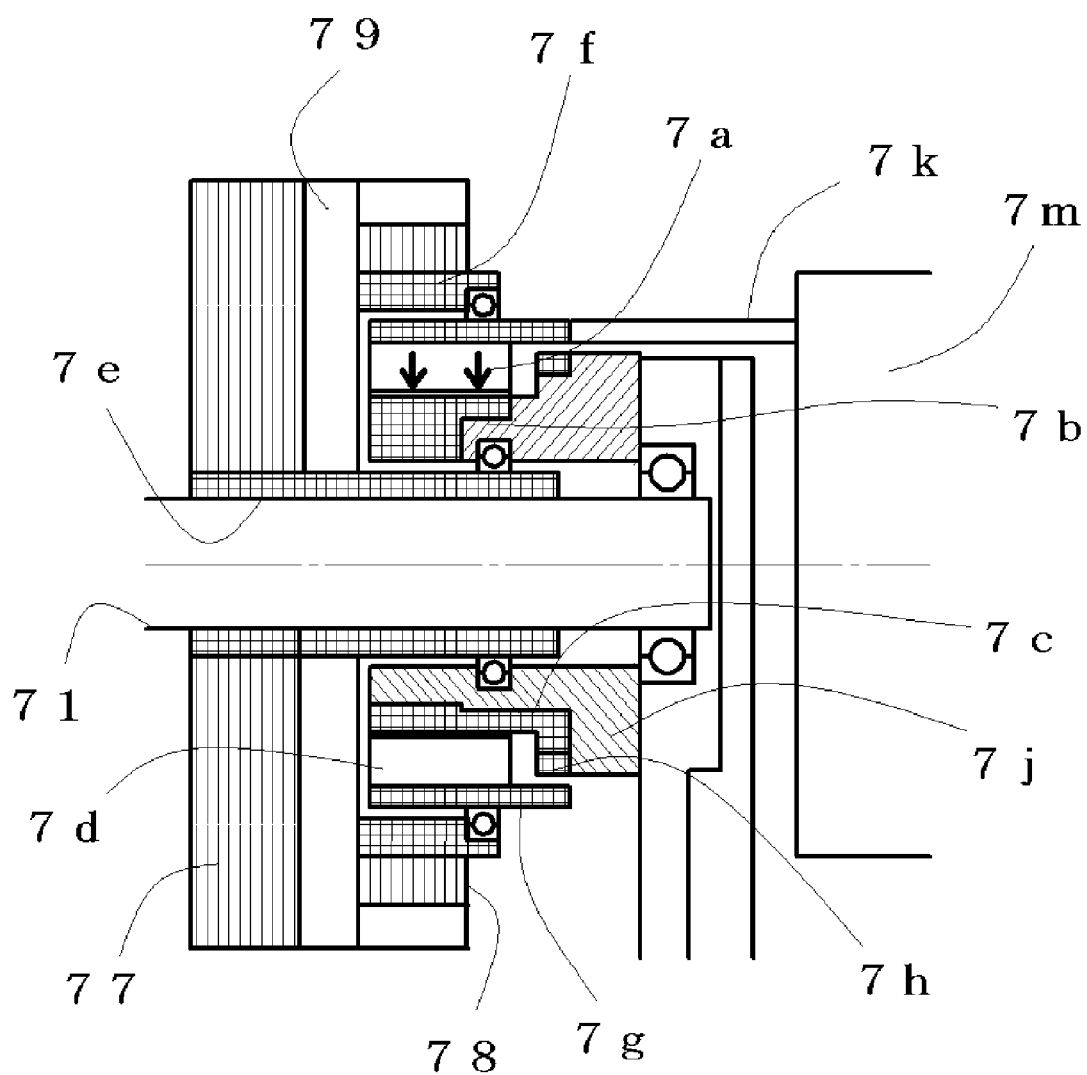
FIG. 9 is a longitudinal sectional view showing the rotor and a magnetic excitation part of the rotating electric machine apparatus shown in FIG. 7.
Figure 10:
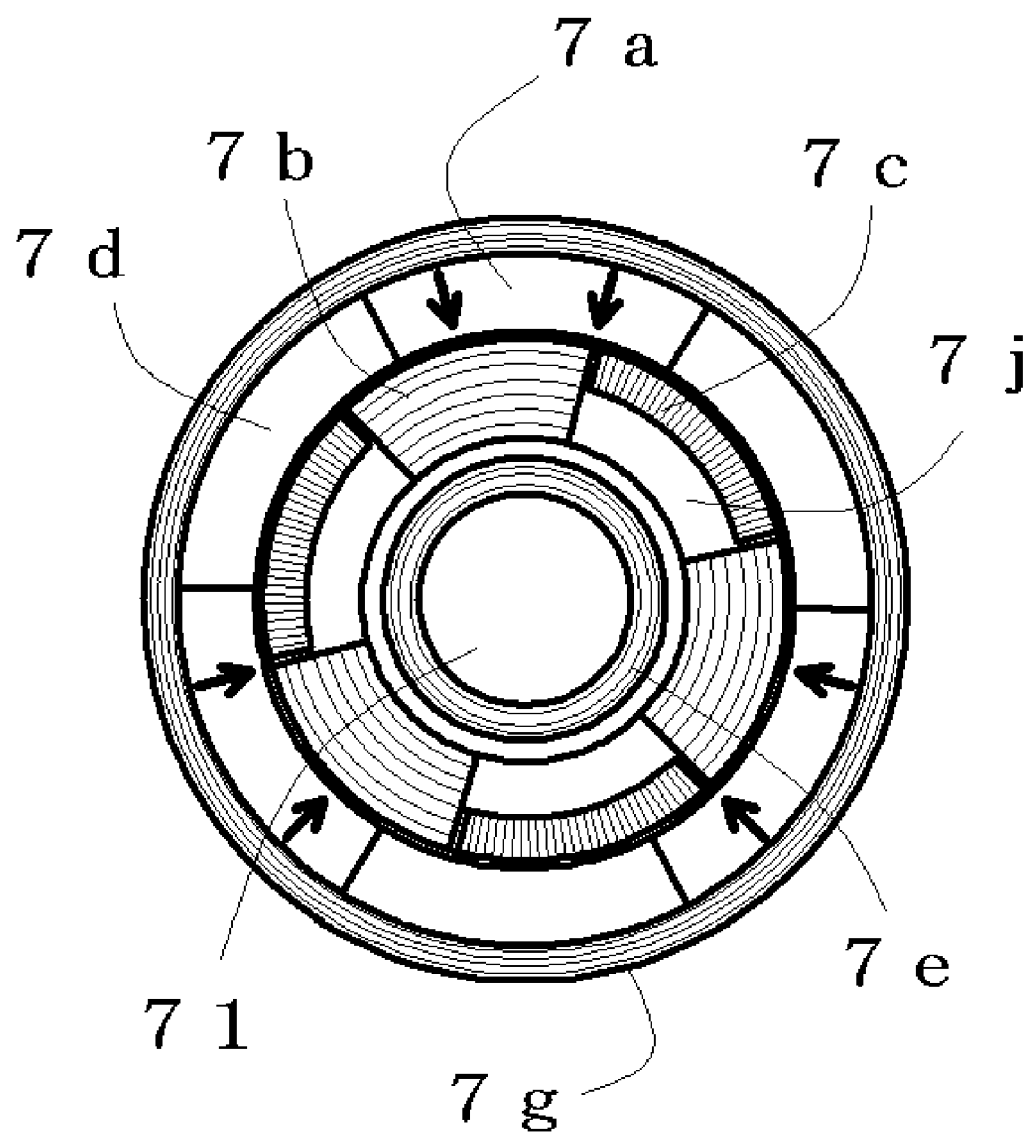
FIG. 10 is a sectional view showing the magnetic excitation part of the rotating electric machine apparatus shown in FIG. 7.

FIG. 9 illustrates magnified longitudinal sectional view of the rotor and the magnetic excitation part illustrated in FIG. 7, and FIG. 10 illustrates the sectional view of the magnetic excitation part. The constitution of the magnetic excitation part and operating principle of the magnetic flux amount control are explained using FIGS. 7, 9, and 10. The main part of the magnetic excitation part includes the field magnet 7a, the main magnetic pole 7b, and the bypass magnetic pole 7c. There are three of the field magnets 7a with magnetization of radial direction, and the field magnets 7a and the non-magnetic portions 7d are disposed one after the other in the circumferential direction, and are fixed to the inner side of the field magnet support 7g. The pair of the main magnetic pole 7b and the bypass magnetic pole 7c are disposed to face each of the field magnets 7a, are fixed to the magnetic excitation part support 7j. The bypass magnetic pole 7c is further connected to a circular magnetic core 7h, and the circular magnetic core 7h is disposed to face the field magnet support 7g through a gap.

A cylindrical magnetic core 7e fixed on the rotational shaft 71 connects with the surface magnetic pole part 77, and the cylindrical magnetic core 7e faces the main magnetic pole 7b through a minute gap. A cylindrical magnetic core 7f fixed to the surface magnetic pole part 78 faces the field magnet support 7g through a minute gap. The main magnetic pole 7b, the bypass magnetic pole 7c, the field magnet support 7g, the circular magnetic core 7h, the cylindrical magnetic cores 7e and 7f constitute from isotropic iron so that alternating magnetic flux is hard to flow, and the magnetic excitation part is constituted compactly.

The magnetic excitation part in the present embodiment and the first embodiment are similar in their composition. Different points are the magnetization direction of the field magnet 7a, and the direction that the field magnet 7a faces the main magnetic pole 7b and the bypass magnetic pole 7c. This embodiment has the constitution that the field magnet 7a is able to slide on the main magnetic pole 7b and the bypass magnetic pole 7c in the circumferential direction, and the field magnet 7a is displaced by the actuator 7m. The actuator 7m connects with the field magnet 7a and the field magnet support 7g by three control rods 7k through the windows prepared in the housing 72, and makes them to displace in circumferential direction so as to change opposing area between the field magnet 7a and the main magnetic pole 7b.

A main magnetic flux path and a bypass magnetic flux path are connected to the field magnet 7a in parallel. The main magnetic flux path is a flux path in which a magnetic flux circulates through the main magnetic pole 7b, the cylindrical core 7e, the magnetic salient pole 81 of the surface magnetic pole part 77, the magnetic teeth 74, the magnetic salient pole 81 of the surface magnetic pole part 78, the cylindrical core 7f, and the field magnet support 7g. The bypass magnetic flux path is a flux path in which a magnetic flux circulates through the bypass magnetic pole 7c, the circular magnetic core 7h, and the field magnet support 7g. Magnetic flux is shunted in the main magnetic flux path and the bypass magnetic flux path according to the field magnet 7a displacement in a circumferential direction, and magnetic flux amount flowing in the main magnetic flux path is controlled.

In this embodiment, setting up almost equally the magnetic resistance of the main magnetic flux path and the magnetic resistance of the bypass magnetic flux path each other, power required for the field magnet 7a displacement is maintained to be small. Length and opposing area of the non-magnetic gap area between the circular magnetic core 7h and the field magnet support 7g are adjusted so that the magnetic resistance of the bypass magnetic flux path becomes almost equal to the magnetic resistance of the main magnetic flux path.

In the present embodiment, a stepping motor is used as the actuator 7m, and the field magnet 7a is displaced through the control rod 7k. When the stepping motor is not driven, the position of the field magnet 7a is maintained, and entire energy consumption for the magnetic field control is small.

Although a magnetic resistance of each magnetic flux path may be fluctuated by various factors, a magnetic flux amount control is intermittently performed during normal operation of the rotating electric machine in this embodiment. In case that the electric motor is driven in accelerating manner, the magnetic flux is pulled in the magnetic teeth, and then the amount of the magnetic flux in it becomes larger. In the inverse case, the magnetic flux is purged from the magnetic teeth, and then the amount of the magnetic flux in it becomes smaller. Therefore the magnetic resistance of the main magnetic flux path becomes smaller and larger, respectively, when the current which drives the rotor in acceleration and the slowdown direction is supplied to the armature coil. The armature coil current which makes equal each other magnetic resistance of the main magnetic flux path and the bypass magnetic flux path (the minimum magnetic force condition) serves as a minimum magnetic force current, the displacement control is carried out as follows. That is, when increasing the magnetic flux amount flowing through the main magnetic flux path, the movable magnetic pole part is displaced in the direction where the opposite area with the main magnetic pole and the field magnet is increased while the electric current which shifted predetermined quantity from the minimum magnetic force current in the direction to accelerate the rotor is supplied to the armature coil. When decreasing the magnetic flux amount flowing through the main magnetic flux path, the movable magnetic pole part is displaced in the direction where the opposite area with the main magnetic pole and the field magnet is reduced while the electric current which shifted predetermined quantity from the minimum magnetic force current in the direction to decelerate the rotor is supplied to the armature coil. This is the composition of generating the magnetic force which assists the displacement of the movable magnetic pole part by the current supplied to the armature coil, field control is made easy without needing an excessive actuator for the displacement of the movable magnetic pole part.

The minimum magnetic force current is acquired from map data according to the operational status of the rotating electric machine apparatus. The parameters which make the magnetic resistance of the main magnetic flux path and the bypass magnetic flux path fluctuate during operation of the rotating electric machine apparatus are mainly temperature, displacement position of the movable magnetic pole part, rotating speed, etc. The relation of the parameter indicating these operation conditions and the fluctuation amount from initial setting of the minimum magnetic force current can be presumed based on statistical data by the rotating electric machine apparatus of identical design. The map data between the parameters which show the minimum magnetic force current and operation conditions is created and set up after the assembly of the rotating electric machine apparatus.

As described above, in the rotating electric machine apparatus shown in FIGS. 7 to 10, it has been explained that by relatively displacing the field magnet 7a with respect to the main magnetic pole 7b and the bypass magnetic pole 7c, an amount of the magnetic flux flowing through the armature can be controlled, and furthermore, the means and the method for displacing the field magnet 7a with respect to the main magnetic pole 7b and the bypass magnetic pole 7c have been explained. The second embodiment is a system for optimizing the output by controlling the magnetic flux amount, and the control method as the rotating electric machine system will be explained by using FIG. 6.

A rotating electric machine system in which the rotating electric machine apparatus is used as an electric motor and by which the field-weakening control is performed to optimize the rotational force control will be explained. When the rotational speed that is the output 63 becomes larger than a predetermined value and an amount of the magnetic flux flowing through the armature is made to be smaller, the control device 65 supplies the electric current which shifted predetermined quantity from the minimum magnetic force current in the direction to decelerate the rotor to the armature coil 76, and makes the actuator 7*m* displace the control rod 7*k* in the direction of a clockwise rotation in FIG. 10 by the control signal 66, and thereby, the opposed area between the main magnetic pole 7*b* and the field magnet 7*a* is made to be smaller. When the rotational speed that is the output 63 becomes smaller than a predetermined value and an amount of the magnetic flux flowing through the armature is made to be larger, the control device 65 supplies the electric current which shifted predetermined quantity from the minimum magnetic force current in the direction to accelerate the rotor to the armature coil 76, and makes the actuator 7*m* displace the control rod 7*k* in the direction of a counterclockwise rotation in FIG. 10 by the control signal 66, and thereby, the opposed area between the main magnetic pole 7*b* and the field magnet 7*a* is made to be larger.

A constant-voltage power generation system in which the rotating electric machine apparatus is used as an electric generator and by which the field-weakening control is performed to control the power generation voltage to be a predetermined voltage will be explained. When the power generation voltage that is the output 63 becomes larger than a predetermined value and an amount of the magnetic flux flowing through the armature is made to be smaller, the control device 65 supplies the electric current which shifted predetermined quantity from the minimum magnetic force current in the direction to decelerate the rotor to the armature coil 76, and makes the actuator 7*m* displace the control rod 7*k* in the direction of a clockwise rotation in FIG. 10 by the control signal 66, and thereby, the opposed area between the main magnetic pole 7*b* and the field magnet 7*a* is made to be smaller. When the power generation voltage that is the output 63 becomes smaller than a predetermined value and an amount of the magnetic flux flowing through the armature is made to be larger, the control device 65 supplies the electric current which shifted predetermined quantity from the minimum magnetic force current in the direction to accelerate the rotor to the armature coil 76, and makes the actuator 7*m* displace the control rod 7*k* in the direction of a counterclockwise rotation in FIG. 10 by the control signal 66, and thereby, the opposed area between the main magnetic pole 7*b* and the field magnet 7*a* is made to be larger.

The example which carries out the displacement control of the movable magnetic pole part exploiting the magnetic force which appears because the magnetic resistance of the main magnetic flux path and the bypass magnetic flux path deviates from the minimum magnetic force condition was shown. Since the compensation means of the magnetic resistance of the main magnetic flux path adopted in the present embodiment are accompanied by rotor acceleration or slowdown, when the magnetic flux amount control continues over a long time, operation of the rotating electric machine may be affected. But the influence on operation of the rotating electric machine can be held small by setting the magnetic resistance of the main magnetic flux path and the bypass magnetic flux path to the minimum magnetic force condition beforehand at rest. And a change in the rotating speed and change control of the magnetic flux amount are performed successively by a usual operational status, so it will not be a big problem. Moreover, in changing the magnetic flux amount more than a predetermined level, big trouble does not appear by taking in the technique of the sampling servo that carries out intermittently or is carried out to control of the magnetic flux amount at predetermined intervals.

The rotating electric machine system according to a third embodiment of the present invention will be explained by using FIGS. 11 to 15. The third embodiment is a rotating electric machine system in which a rotor having magnetic salient poles and non-magnetic portions one after the other is disposed, and a magnetic excitation part is disposed in a rotor. Moreover, the third embodiment supplies the minimum magnetic force current to an armature coil at a time of the magnetic flux amount control, drives the rotor in acceleration or deceleration, makes equal each other effectively magnetic resistance of the main magnetic flux path and the bypass magnetic flux path, and acquires the minimum magnetic force current in learning way.

Figure 11:
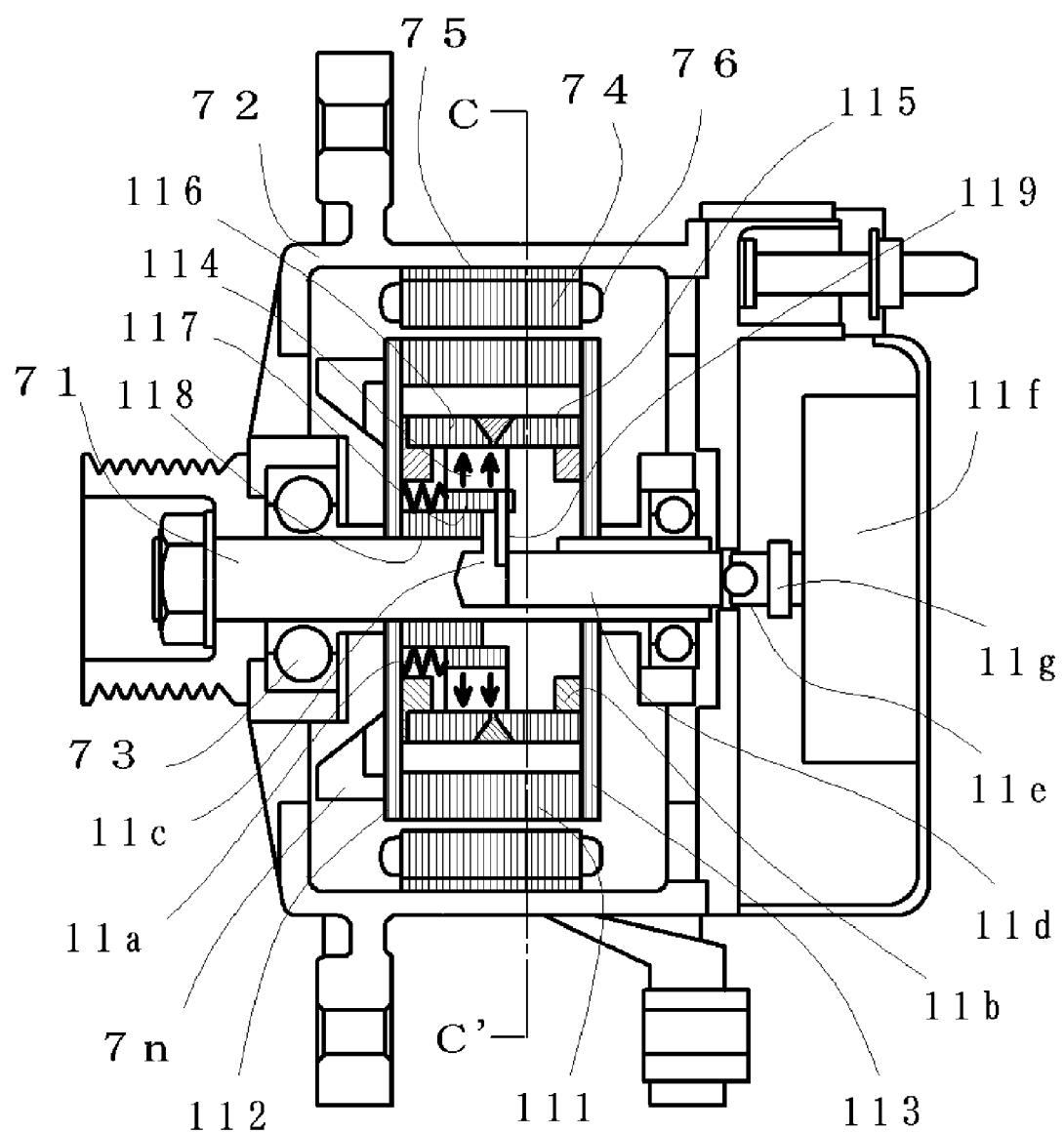
FIG. 11 is a longitudinal sectional view of a rotating electric machine apparatus according to a third embodiment of the present invention.

FIG. 11 illustrates embodiment applied this invention to the rotating electric machine apparatus having a radial gap structure, the rotational shaft 71 is supported rotatably by the housing 72 through bearings 73. The composition of the armature is same as the second embodiment indicated in FIG. 7, so the explanation thereof is omitted. The rotor has a surface magnetic pole part 111 in which the magnetic salient poles and the non-magnetic portions are lined one after the other in the circumferential direction, and the adjacent magnetic salient poles are extended each other to different axial directions, and extended magnetic salient pole parts serve as a first extension part 112 and a second extension part 113 according to the extended axial direction.

The magnetic excitation part is disposed at inside of the surface magnetic pole part 111, and is connected to the first extension part 112 and the second extension part 113, and magnetizes the adjacent magnetic salient poles to be different polarities from each other, and the main part thereof includes a field magnet 114, a main magnetic pole 115, a bypass magnetic pole 116, and a base magnetic part 118. The field magnet 114 is fixed to a magnetic excitation part support 117, and they are disposed between the main magnetic pole 115, the bypass magnetic pole 116 and the base magnetic part 118, and are composed to be slid in an axial direction as a movable magnetic pole part. Above parts which compose the magnetic excitation part are cylindrical shape made of magnetic material.

A displacement control means for controlling displacement of the field magnet 114 and the magnetic excitation part support 117 includes a spring 11*a*, a control rod 11*d* which is contained in the hollow of the rotational shaft 71, a push rod 11*e*, and an actuator 11*f*. Each of pins 119 fixed to the magnetic excitation part support 117 is made to engage with the control rod 11*d* through a slit 11*c*. A cylindrical nonmagnetic material 11*b* is arranged as the means to regulate displacement range of the field magnet 114. The number 11*g* represents a load cell.

Figure 12:
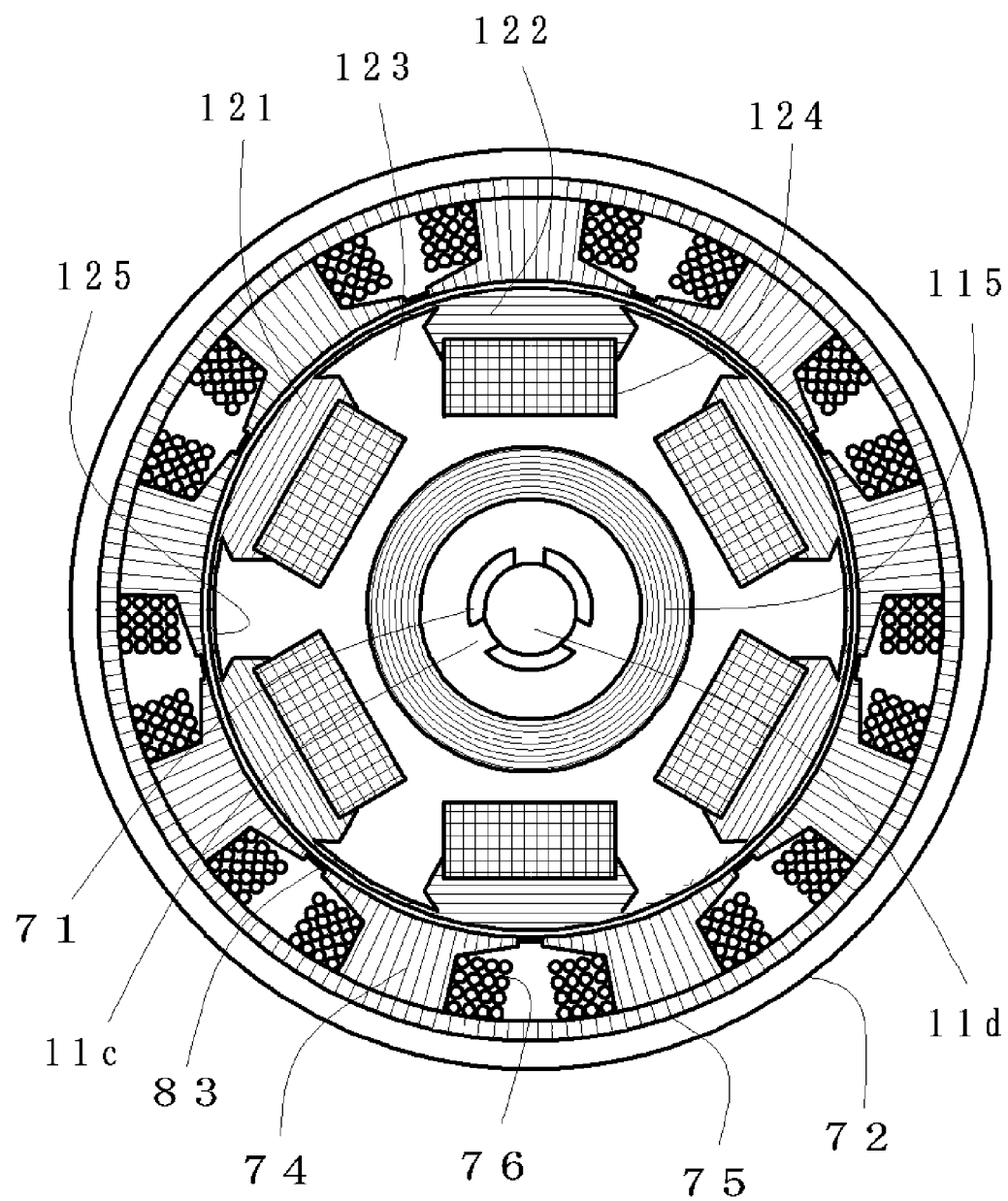
FIG. 12 is a sectional view showing an armature and a rotor of the rotating electric machine apparatus shown in FIG. 11.

FIG. 12 illustrates a sectional view of the armature and the rotor along the C-C' in FIG. 11, and some component parts are appended with numbers for explaining the mutual relations. The disposition of the armature is the same with the second embodiment and therefore the explanation thereof will be omitted.

In FIG. 12, the rotor has a structure having the magnetic salient poles and the non-magnetic portions one after the other in the circumferential direction, and the adjacent magnetic salient poles are represented by numbers 121, 122, and the non-magnetic portions are represented by number 123. Number 124 illustrates a magnetic-flux channel portion. In this embodiment, cross sectional area of the magnetic salient poles 121, 122 is not so large, then the magnetic-flux channel portion 124 that has wide cross sectional area exploiting the inside empty space is disposed. Therefore the enough amount of magnetic flux can flow in the magnetic-flux channel portion 124. The magnetic salient poles 121, 122 that are conjugated by small width saturable magnetic junctions 125 are composed by punching out a silicon steel plate by a predetermined die and stacking the punched-out plates. The non-magnetic portion 123 between the magnetic salient poles 121, 122 is composed in non-magnetic resin or the like having large specific resistance.

In the present embodiment, the magnetic flux channel portion 124 with a large cross-section area constituted from iron with big saturation magnetic flux density is arranged to the magnetic salient pole of a side further than the armature using a rotor empty space. In the magnetic material of stacked silicon steel plates, the magnetic resistance becomes higher in the stacking direction, the magnetic flux channel portion 124 can transfer large amount of the magnetic flux along the rotational shaft 71.

Figure 13:
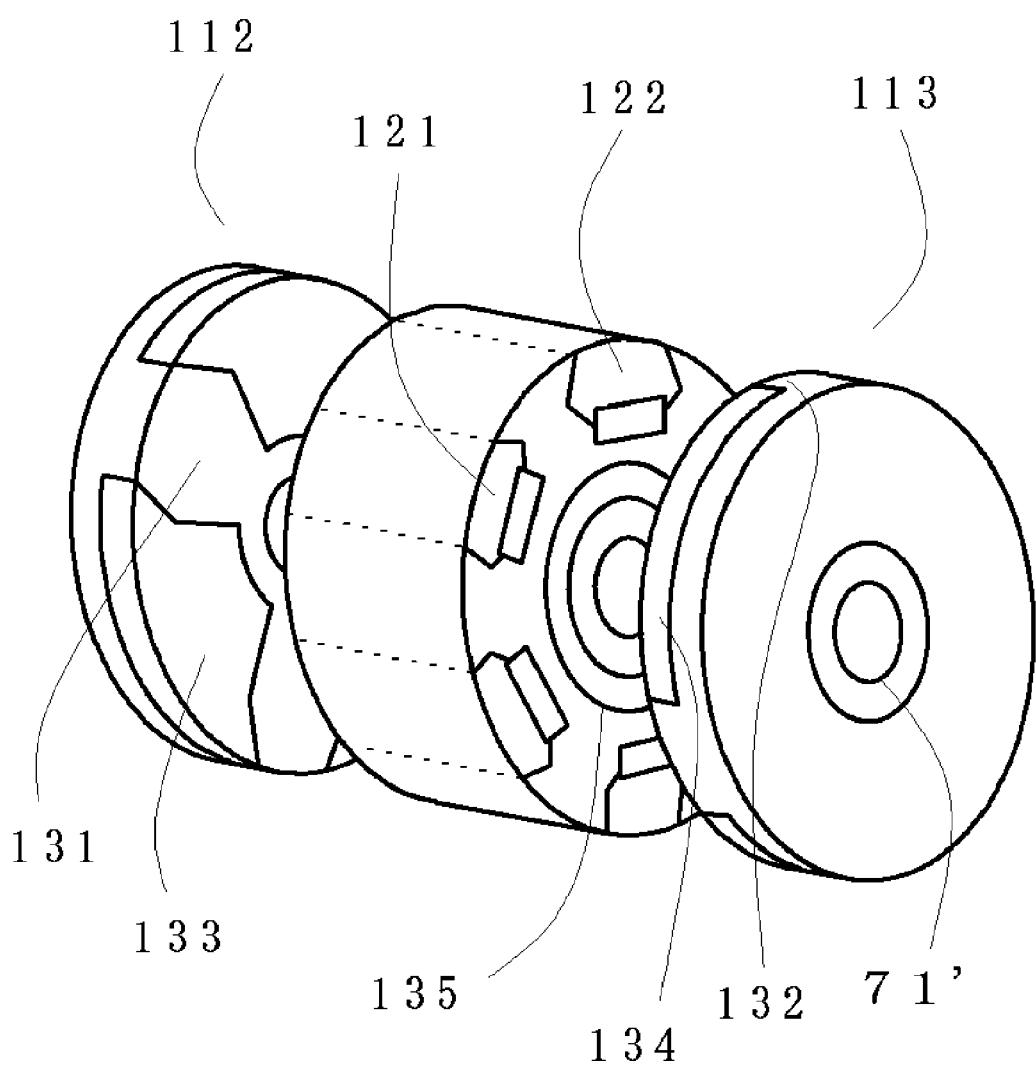
FIG. 13 is an exploded perspective view showing the rotor, a first extension part and a second extension part of the rotating electric machine apparatus shown in FIG. 11.

FIG. 13 is an exploded perspective view showing the rotor. In order to make an understanding easy, a main part including the magnetic salient poles 121, 122 and the first extension part 112 and the second extension part 113 are separately illustrated. The number 71' represents a hole for the rotational shaft 71. The first extension part 112 has a magnetic salient part 131 that corresponds to the magnetic salient pole 121, and is press molding of the soft iron. A non magnetic portion 133 is made from non-magnetic stainless steel. The second extension part 113 has a magnetic salient part 132 that corresponds to the magnetic salient pole 122, and is press molding of the soft iron. A non magnetic portion 134 is made from non-magnetic stainless steel. The number 135 represents a part of the magnetic excitation part.

A longitudinal sectional view of the composition of the magnetic excitation part is indicated in FIG. 11. The main part thereof is cylindrical shape, and the main magnetic pole 115 and the bypass magnetic pole 116 are lined in an axial direction, the main magnetic pole 115 is connected to the second extension part 113, and the bypass magnetic pole 116 is magnetically connected to the first extension part 112 through a micro non-magnetic gap. The base magnetic part 118 is connected to the first extension part 112. The field magnet 114 is fixed on the magnetic excitation part support 117, and is arranged possible to slide between the main magnetic pole 115, the bypass magnetic pole 116, and the base magnetic part 118. The magnetization direction of the field magnet 114 is radial direction, and arrows thereof show the magnetization direction.

The main magnetic flux path includes the main magnetic pole 115, the second extension part 113, the magnetic salient pole 122, the magnetic teeth 74, the magnetic salient pole 121, the first extension part 112, the base magnetic part 118, and the magnetic excitation part support 117. The bypass magnetic flux path includes the bypass magnetic pole 116, the first extension part 112, the base magnetic part 118, and the magnetic excitation part support 117. Gap length of the non-magnetic gap between the bypass magnetic pole 116 and the first extension part 112 is adjusted so that an average value of the magnetic resistance of the main magnetic flux path and the magnetic resistance of the bypass magnetic flux path are approximately equal each other. According to an axial displacement of the field magnet 114, an area of the field magnet 114 opposed to the main magnetic pole 115 and an area of the field magnet 114 opposed to the bypass magnetic pole 116 can be changed with maintaining a sum of the areas to be constant. Thereby, an amount of magnetic flux flowing through the main magnetic flux path can be changed, and therefore, a magnetic force disturbing the displacement can be avoided theoretically from being generated as explained in the first and the second embodiments.

Although the length of the main magnetic pole 115 and the bypass magnetic pole 116 is larger than the length of the field magnet 114, it is regulated so that the field magnet 114 may always counter with the main magnetic pole 115 and the bypass magnetic pole 116 with the cylindrical non-magnetic material 11b. A sum of an area of the field magnet 114 opposed to the main magnetic pole 115 and an area of the field magnet 114 opposed to the bypass magnetic pole 116 is fixed, each above area is changed according to the displacement, and magnetic flux amount shunted in the main flux path is mostly proportional to amount of the displacement.

Figure 14:
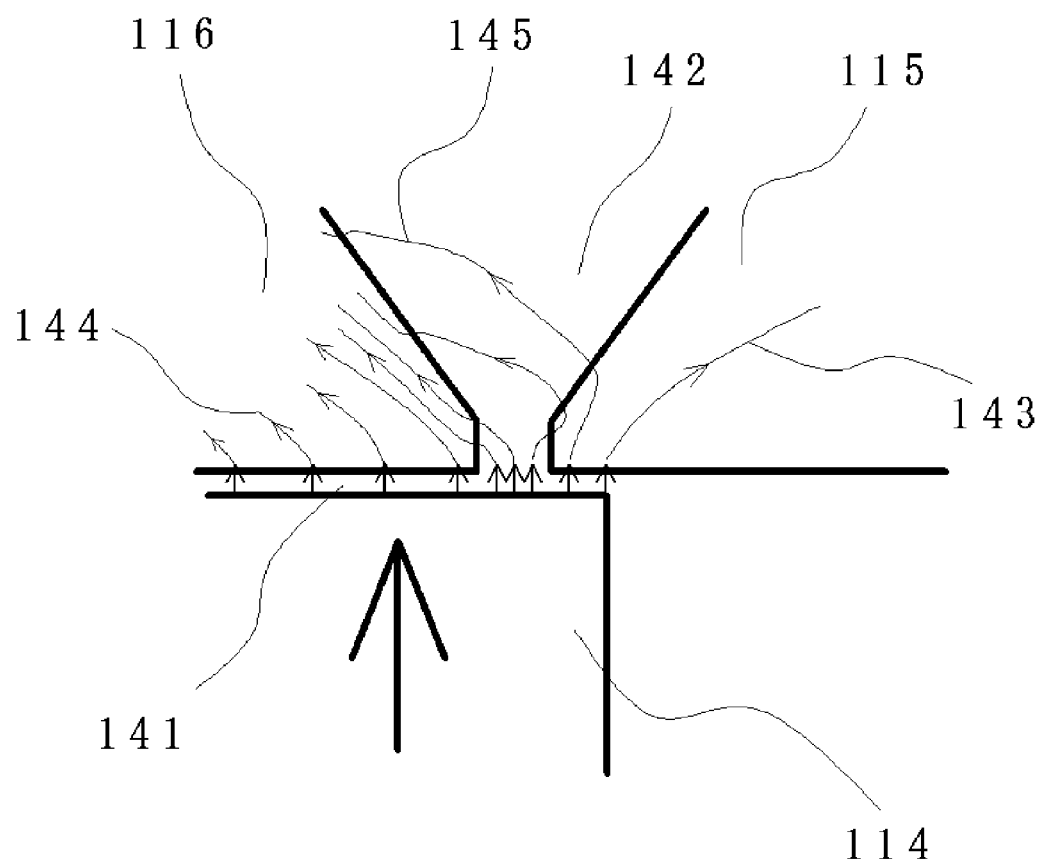
FIG. 14 is a magnified longitudinal sectional view showing the field magnet neighborhood of the rotating electric machine apparatus shown in FIG. 11.

Magnetic flux from the field magnet 114 approximately flows like a laminar flow into the main magnetic pole 115 and the bypass magnetic pole 116, and therefor an amount of the magnetic flux shunted to the main magnetic pole 115 is almost proportional to an area of the field magnet 114 opposed to the main magnetic pole 115. FIG. 14 is a magnified view showing the portion which the field magnet 114 faces the main magnetic pole 115 and the bypass magnetic pole 116 shown in FIG. 11, and indicates magnetic flux distribution of the field magnet 114 neighborhoods in model way in the case that magnetic resistance of the bypass magnetic flux path is smaller than magnetic resistance of the main magnetic flux path. In the figure, arrows show the direction where magnetic flux flows assuming that the magnetic flux flows from an N pole of field magnet 114. In a minute gap 141 surrounded by the field magnet 114, the main magnetic pole 115 and the bypass magnetic pole 116, magnetic flux flows perpendicular to those boundary surfaces like a laminar flow. The number 143 represents magnetic flux which flows into the main magnetic pole 115 and flows through the main magnetic flux path, and the number 144 represents magnetic flux which flows into the bypass magnetic pole 115 and flows through the bypass magnetic flux path. The number 145 represents magnetic flux which flows into the main magnetic pole 115, flows through a gap portion 142 between the main magnetic pole 115 and the bypass magnetic pole 116, and flows into the bypass magnetic pole 116. Thus, when the difference between magnetic resistance of the main magnetic flux path and magnetic resistance of the bypass magnetic flux path is not so small, magnetic flux leaks from the main magnetic flux path to the bypass magnetic flux path, therefor an amount of the magnetic flux flowing through the main magnetic flux path is not always proportional to an area of the field magnet 114 opposed to the main magnetic pole 115.

In this embodiment, the main magnetic flux path and the bypass magnetic flux path are constituted so that magnetic resistance between the main magnetic flux path and the bypass magnetic flux path may become bigger than the difference between magnetic resistance of the main magnetic flux path and magnetic resistance of the bypass magnetic flux path in an average operating condition. The distance between the main magnetic flux path and the bypass magnetic flux path is the smallest between the main magnetic pole 115 and the bypass magnetic pole 116, and the magnetic resistance between the main magnetic flux path and the bypass magnetic flux path is mostly established by setting the form size between the main magnetic pole 115 and the bypass magnetic pole 116. The shape of the gap portion 142 is established so that a gap length may become bigger at the location away from the field magnet 114 as shown in FIGS. 11 and 14, sizes are set up so that magnetic resistance between the main magnetic pole 115 and the bypass magnetic pole 116 may become bigger than the difference between magnetic resistance of the main magnetic flux path and magnetic resistance of the bypass magnetic flux path in an average operating condition. The magnetic flux which is leaked in a short circuit way between the main magnetic pole 115 and the bypass magnetic pole 116 shown by the number 145 decreases, the amount of magnetic flux flowing through the main magnetic flux path is precisely proportional to the area which the field magnet 114 and the main magnetic pole 115 face.

The composition of the displacement control means that displaces the field magnet 114 is explained below. Three of pins 119 fixed on the magnetic excitation part support 117 are in contact with the control rod 11*d* through three of slit 11*c* set up to rotational shaft 71. The control rod 11*d* is constituted possible to slide in an axial direction in the hollow part of the rotational shaft 71, and is in contact with the push rod 11*e* of the actuator 11*f*. The magnetic excitation part support 117 is composed to be biased to the right direction by the spring 11*a*, and biased to the left direction by the push rod 11*e* by the actuator 11*f*, and stops at the axial position in which the both forces are balanced. Therefore, the position of the field magnet 114 and the magnetic excitation part support 117 can be displaced by the actuator 11*f* in an axial direction. The stepping motor and the screw mechanism are used for the actuator 11*f* in this embodiment, the push rod 11*e* is moved right or left direction in FIG. 11 according to the stepping motor rotation. When not driving the stepping motor, the axial position of the push rod 11*e* is maintained.

Although a magnetic resistance of each magnetic flux path may be fluctuated by various factors, a magnetic flux amount control is intermittently performed during normal operation of the rotating electric machine in this embodiment as follows. When controlling the field magnet 114 displacement, the minimum magnetic force current is supplied to the armature coils 76 to accelerate or to decelerate the rotor so that magnetic resistance of the main magnetic flux path and the bypass magnetic flux path becomes equal each other effectively, and simultaneously the actuator 11*f* is driven. This embodiment also has the composition to acquire the minimum magnetic force current in learning way during operation of the rotating electric machine system, and becomes possible to adapt to the magnetic resistance change of the main magnetic flux path by various causes.

The composition and the procedure which acquire the minimum magnetic force current in learning way will be explained using FIGS. 11 and 15. The number 11*g* represents a load cell, and the load cell 11*g* detects force added to the push rod 11*e*. After the actuator 11*f* displaced the field magnet 114 in axial direction, it maintains the location. When an electric current is supplied in the armature coil 76 to accelerate or to decelerate the rotor, magnetic resistance of the main magnetic flux path seems to be changed to smaller or larger respectively. If a difference is in the magnetic resistance of the main magnetic flux path and the bypass magnetic flux path, the field magnet 114 will receive the magnetic force to displace to the direction which increases the opposite area between the field magnet 114 and the magnetic pole (the main magnetic pole 115 or the bypass magnetic pole 116) of the magnetic flux path with smaller magnetic resistance. The actuator 11*f* maintains the location, so the slide rod 11*d* and the push rod 11*e* will receive the magnetic force, and it is possible to detect the magnetic force by the load cell 11*g*.

Figure 15:
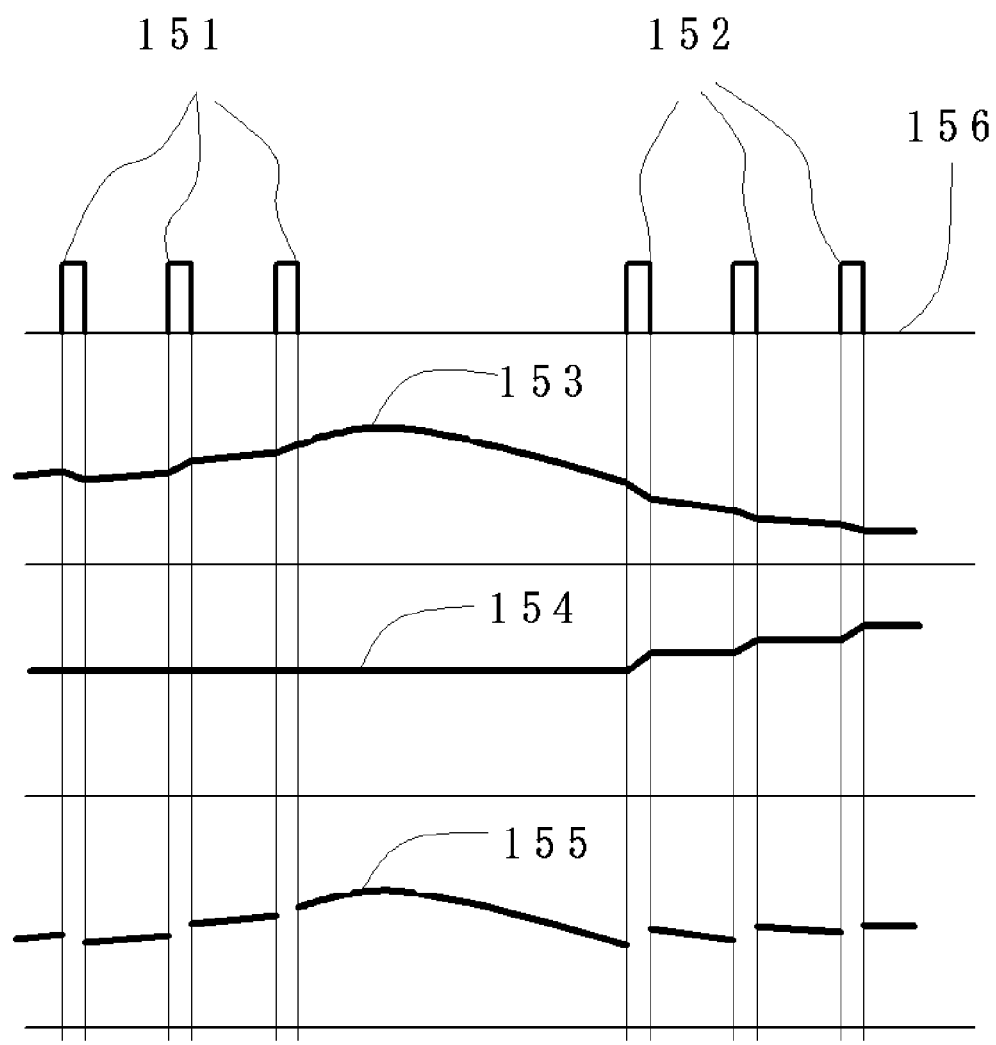
FIG. 15 is a time chart of a rotating electric machine system for performing magnetic field control.

FIG. 15 shows the time chart that controls the magnetic flux amount intermittently, and the horizontal axis 156 represents time. The number 151 represents a learning section, and the number 152 represents a magnetic flux amount control section. During time except the learning section 151 and the magnetic flux amount control section 152, the rotor is driven or generated power is taken out. In the learning section 151, the control device drives the rotor by different current conditions and watches the load cell 11*g* output in the period. The current from which the load cell 11*g* output becomes small is the minimum magnetic force current, and the control device memorizes it or set it again as the minimum magnetic force current.

The number 152 represents the magnetic flux amount control section. The minimum magnetic force current acquired by the learning process is supplied to the armature coil 76, the actuator 11*f* is controlled simultaneously, and the field magnet 114 is made to displace in the axial direction. Because magnetic resistances of the main magnetic flux path and the bypass magnetic flux path are made effectively almost equal each other, the control by the actuator 11*f* is performed smoothly. In this case, the rotor is driven even for a short time, then the rotating speed 153 changes. The rotor is decelerated during the magnetic flux amount control section 152, it is little, but the decelerated state is indicated by the rotating speed 153. The number 154 represents a magnetic flux amount in the armature, and the actuator 11*f* maintains the axial position, so the magnetic flux amount 154 does not change during the learning section 151, but the state from which the magnetic flux amount 154 changes is indicated at the magnetic flux amount control section 152. The number 155 represents power generation voltage in the case when rotating electric machine apparatus is a generator. In the learning section 151 and the magnetic flux amount control section 152, since electric power cannot be taken out, the state where the power generation voltage 155 has broken off is shown, and the state where the power generation voltage 155 is changing is shown by the around the magnetic flux amount control section 152. In this embodiment, the rotating electric machine is set up at rest so that magnetic resistance of the bypass magnetic flux path may become equal to magnetic resistance of the main magnetic flux path. Therefore the degree that the rotor is driven by the minimum magnetic force current supplied to the armature coil 76 is small.

Although the minimum magnetic force current for adjusting the magnetic resistance of the main magnetic flux path effectively is acquired during the learning section 151 in this embodiment, the method of not setting up the learning section 151 in particular is also possible. For example, when the rotating electric machine apparatus is an electric motor, the relationship between the current supplied to the armature coils during normal operation and the load cell 11*g* output is always supervised, and the current from which the load cell 11*g* output becomes smaller is made into the minimum magnetic force current.

Magnetic resistance of the main magnetic flux path is effectively changed by the current flowing through the armature coil 76, and power required for the displacement of the movable magnetic pole part can be made small. However, the magnetic resistance fluctuation in the high frequency band which responds to the current switched over according to the relative position between the magnetic salient pole 121, 122 and the magnetic teeth 74 induces vibration of the movable magnetic pole part or pulsative magnetic flux leakage between the main magnetic flux path and the bypass magnetic flux path, and is not desirable. Therefore, as for the alternating magnetic flux in the latter high frequency band, it is desirable to smooth as composition along which it is hard to pass. In this embodiment, the first extension part 112 and the second extension part 113 consist of isotropic iron, and alternating magnetic flux is made hard flow through them. And magnetic flux path from the main magnetic pole 115 to the magnetic salient poles 121, 122 has frequency dependency, the magnetic permeability, the conductivity and the dimension of the first extension part 112 and the second extension part 113 are established in order to permit magnetic resistance change in low frequency band required for the movable magnetic pole part displacement. Further, the bypass magnetic pole 116 and the main magnetic pole 115 consist of isotropic iron, and alternating magnetic flux is made hard flow through them.

As described above, in the rotating electric machine apparatus shown in FIGS. 11 to 15, it has been explained that by relatively displacing the field magnet 114 with respect to the main magnetic pole 115 and the bypass magnetic pole 116, an amount of the magnetic flux flowing through the armature can be controlled. The third embodiment is a system for optimizing the output by controlling the magnetic flux amount, and the control method as the rotating electric machine system will be explained by using FIG. 6.

A rotating electric machine system in which the rotating electric machine apparatus is used as an electric motor and by which the field-weakening control is performed to optimize the rotational force control will be explained. When the rotational speed that is the output 63 becomes larger than a predetermined value and an amount of the magnetic flux flowing through the armature is made to be smaller, the control device 65 supplies the minimum magnetic force current to the armature coil 76 through the driving circuitry 67 in the time zone of the magnetic flux amount control section 152 so that magnetic resistances of the main magnetic flux path and the bypass magnetic flux path are effectively made equal each other, and simultaneously makes the actuator 11f move the push rod 11e leftward by the control signal 66, and thereby, the opposed area between the main magnetic pole 115 and the field magnet 114 is made to be smaller. When the rotational speed becomes smaller than a predetermined value and an amount of the magnetic flux flowing through the armature is made to be larger, the control device 65 supplies the minimum magnetic force current to the armature coil 76 through the driving circuitry 67 in the time zone 152, and simultaneously makes the actuator 11f move the push rod 11e rightward by the control signal 66, and thereby, the opposed area between the main magnetic pole 115 and the field magnet 114 is made to be larger.

A constant-voltage power generation system in which the rotating electric machine apparatus is used as an electric generator and by which the field-weakening control is performed to control the power generation voltage to be a predetermined voltage will be explained. When the power generation voltage that is the output 63 becomes larger than a predetermined value and an amount of the magnetic flux flowing through the armature is made to be smaller, the control device 65 supplies the minimum magnetic force current to the armature coil 76 through the driving circuitry 67 in the time zone 152, and simultaneously makes the actuator 11f move the push rod 11e leftward by the control signal 66, and thereby, the opposed area between the main magnetic pole 115 and the field magnet 114 is made to be smaller. When the power generation voltage becomes smaller than a predetermined value and an amount of the magnetic flux flowing through the armature is made to be larger, the control device 65 supplies the minimum magnetic force current to the armature coil 76 through the driving circuitry 67 in the time zone 152, and simultaneously makes the actuator 11f move the push rod 11e rightward by the control signal 66, and thereby, the opposed area between the main magnetic pole 115 and the field magnet 114 is made to be larger.

A rotating electric machine system according to a fourth embodiment of the present invention will be explained by using FIGS. 16 to 21. The fourth embodiment is a rotating electric machine system in which magnetic salient poles and permanent magnet assemblies are arranged alternately in circumferential direction, and a magnetic excitation part is disposed in the static side. Furthermore, the fourth embodiment is the composition in which a constant current load is connected to an armature coil at a time of the magnetic flux amount control, predetermined current is sent with induction voltage, a magnetic resistance of a main magnetic flux path is adjusted effectively, and a power required for displacing a movable magnetic pole part is made small.

Figure 16:
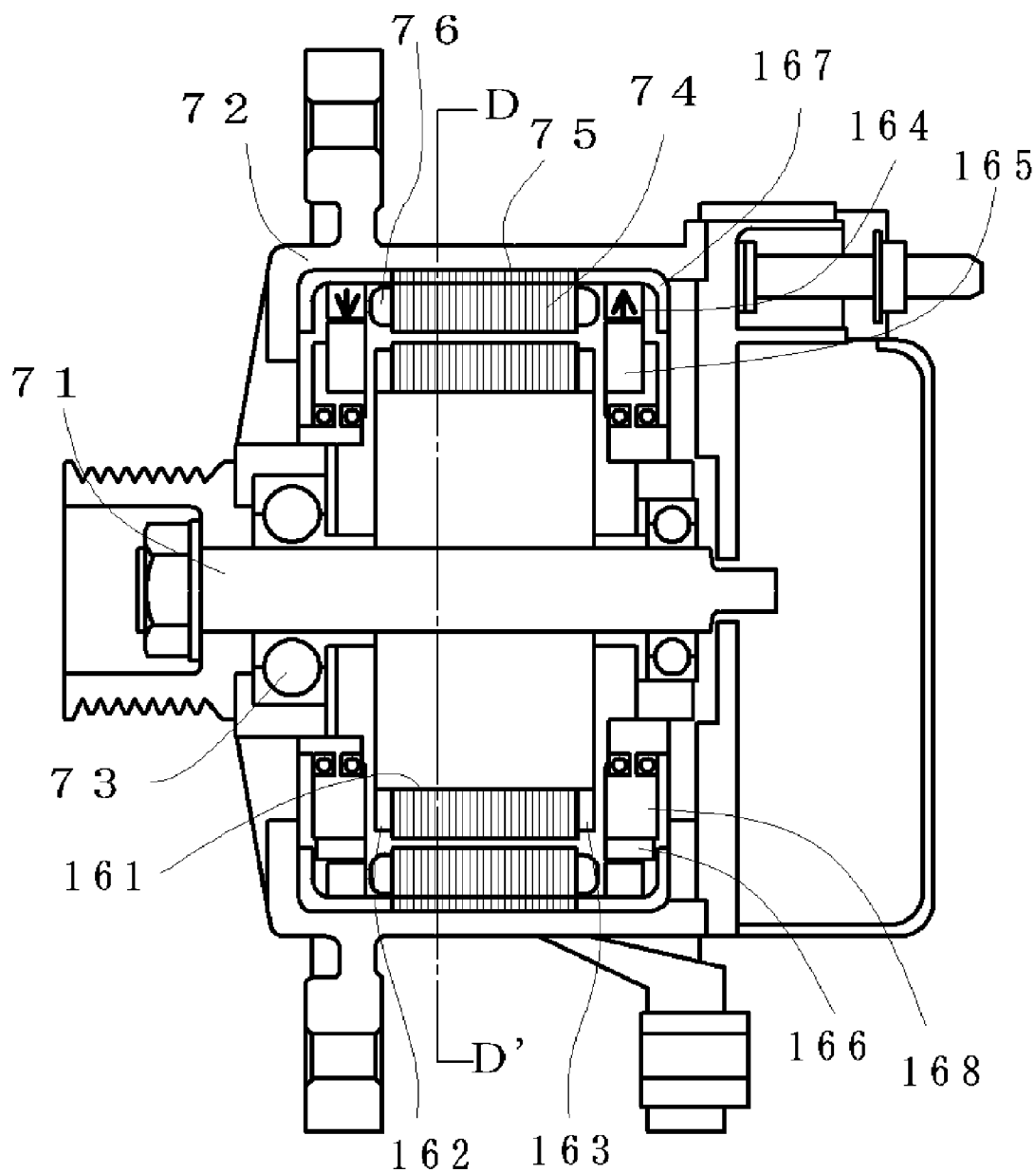
FIG. 16 is a longitudinal sectional view of a rotating electric machine apparatus according to a fourth embodiment of the present invention.

FIG. 16 illustrates embodiment applied this invention to the rotating electric machine apparatus having a radial gap structure, the rotational shaft 71 is supported rotatably by the housing 72 through bearings 73. The composition of the armature is same as the second embodiment indicated in FIG. 7, so the explanation thereof is omitted. A surface magnetic pole part 161 structure of the rotor has the disposition that the magnetic salient poles and the permanent magnet assemblies are disposed one after the other in the circumferential direction, and the adjacent magnetic salient poles are extended to different axial directions each other, and extended magnetic salient pole parts serve as a first extension part 162 and a second extension part 163 according to the extended axial direction. Two magnetic excitation parts are arranged in the housing side facing the first extension part 162 and the second extension part 163 through a gap, and supply the magnetic flux between the cylindrical magnetic yoke 75 and each of the first extension part 162 and the second extension part 163 respectively so that the adjacent magnetic salient poles are magnetized in different directions to each other.

In the figure, a main part of the magnetic excitation part opposing to the second extension part 163 includes a field magnet 164, a main magnetic pole 165, a bypass magnetic pole 166, and a base magnetic pole 167. And, the main magnetic pole 165 and the bypass magnetic pole 166 are supported by a magnetic excitation part support 168, and the magnetic excitation part support 168 is rotatably supported by the housing 72. Although, parts of the magnetic excitation part opposing to the first extension part 162 are not numbered, disposition thereof is same with the magnetic excitation part opposing to the second extension part 163, and the same number is used for a component of the same kind. However, it is arranged so that the magnetization direction of the field magnet 164 may become reverse each other of the magnetic excitation part in the first extension part 162 side or the second extension part 163 side.

Figure 17:
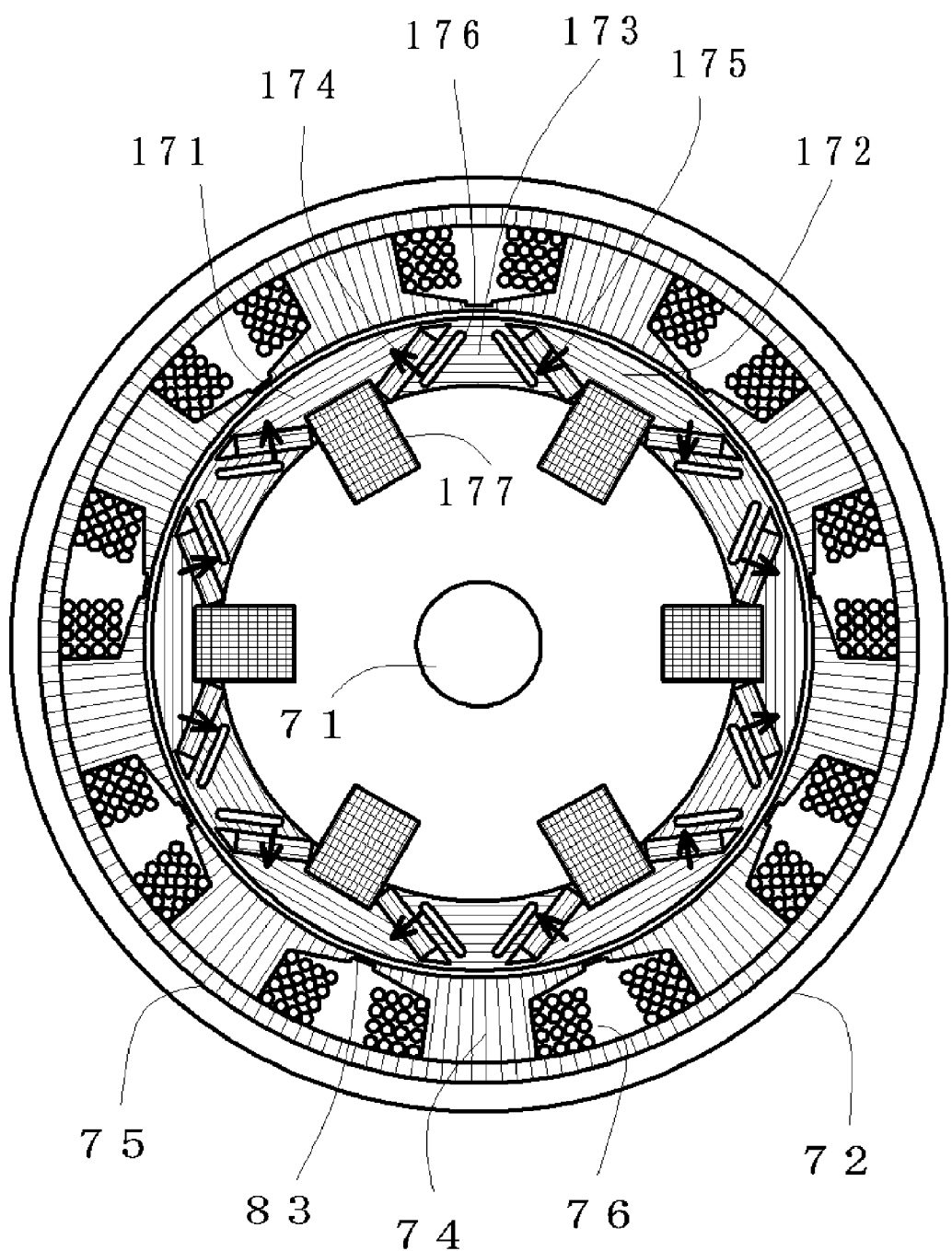
FIG. 17 is a sectional view showing an armature and a rotor of the rotating electric machine apparatus shown in FIG. 16.

FIG. 17 illustrates a sectional view of the armature and the rotor along the D-D' in FIG. 16, and some component parts are appended with numbers for explaining the mutual relations. The disposition of the armature is the same with the second embodiment and therefore the explanation thereof will be omitted.

In FIG. 17, the magnetic salient poles and the permanent magnet assemblies are disposed one after the other in the circumferential direction. A combination of an intermediate magnetic salient pole 173 and permanent magnet plates 174, 175 that have same magnetization direction and are disposed at both side of the pole 173 serves as the permanent magnet assembly, and it is magnetically equivalent to a magnet. The surface magnetic pole part 161 is characterized in that a uniform magnetic material is partitioned into the magnetic salient poles 171, 172 by the permanent magnet assemblies in the circumferential direction. And each magnetization direction of the adjacent permanent magnet assemblies is inversely arranged so that the adjacent magnetic salient poles 171, 172 are magnetized in different polarities each other. The disposition shape of the permanent magnet plates 174, 175 that are disposed at the side surface of the magnetic salient poles 171, 172 looks like V-letter, a crossing angle of the V-letter shape is arranged at suitable value for a flux barrier. Arrows appended in the permanent magnet plates 174, 175 show magnetization directions that are perpendicular to the permanent magnet plates 174, 175 face.

The number 177 represents a magnetic-flux channel portion that corresponds to the magnetic-flux channel portion 124 in the third embodiment. In this embodiment, cross sectional area of the magnetic salient poles 171, 172 is not so large, then the magnetic-flux channel portion 177 that has wide cross sectional area exploiting the inside empty space is disposed. Therefore, enough of an amount of magnetic flux can flow in the magnetic-flux channel portion 177. The number 176 represents the non-magnetic portion disposed in the intermediate magnetic salient pole 173 so that a magnetic resistance between the permanent magnet plates 174, 175 becomes large. The magnetic salient poles 171, 172 and the intermediate magnetic salient pole 173 are composed by punching out a silicon steel plate by a predetermined die and then stacking the punched plates. Then permanent magnet plates are inserted into slots corresponding to the permanent magnet plates 174, 175, and iron blocks are also inserted into slots corresponding to the magnetic-flux channel portion 177.

Figure 18:
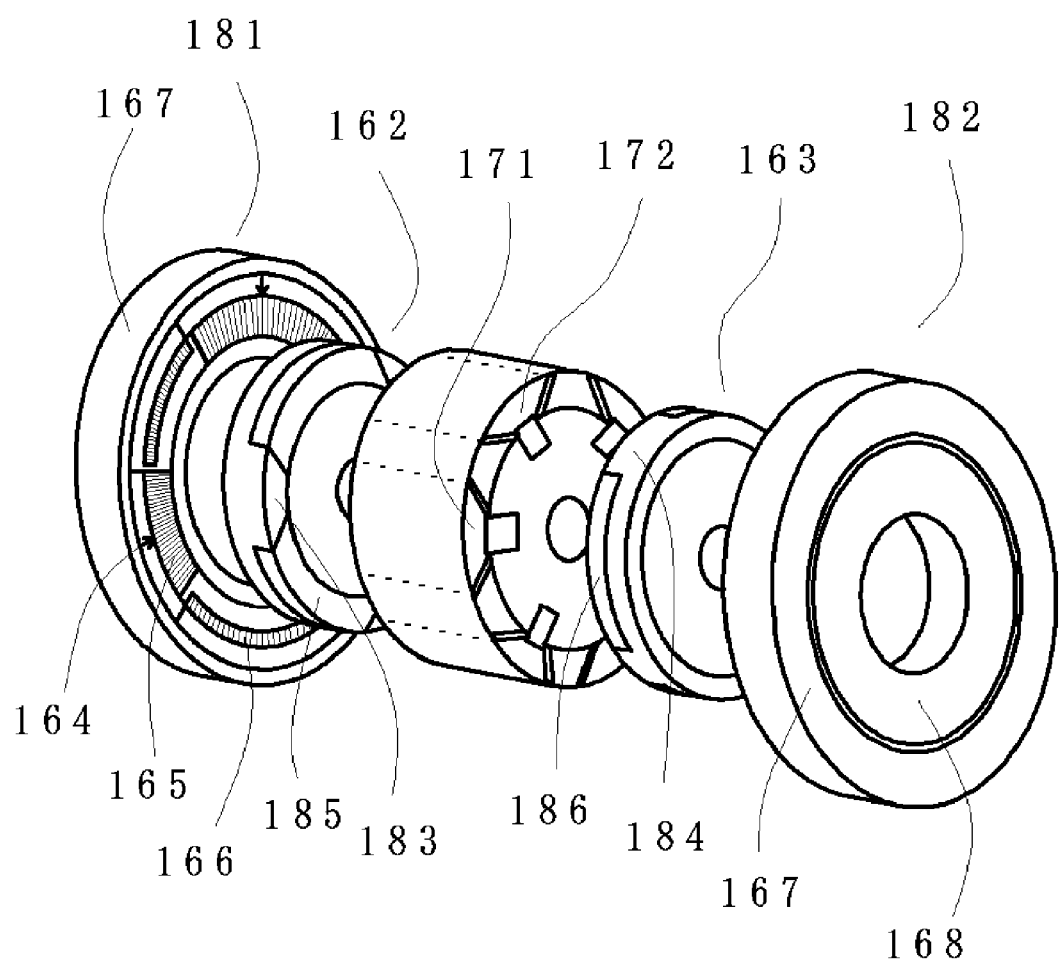
FIG. 18 is an exploded perspective view showing the rotor, a first extension part, a second extension part and a magnetic excitation part of the rotating electric machine apparatus shown in FIG. 16.

FIG. 18 is an explosive perspective view showing the rotor and the magnetic excitation part. A main part including the magnetic salient poles 171, 172 and the first extension part 162 and the second extension part 163 are separately illustrated for understanding easily. The first extension part 162 has a magnetic salient part 183 that corresponds to the magnetic salient pole 171, and is press molding of the soft iron. A non-magnetic portion 185 is made from non-magnetic stainless steel. The second extension part 163 has a magnetic salient part 184 that corresponds to the magnetic salient pole 172, and is press molding of the soft iron. A non-magnetic portion 186 is made from non-magnetic stainless steel.

The magnetic excitation parts 181, 182 are opposing to the first extension part 162 and the second extension part 163 through air gap respectively. Each main magnetic pole 165 of the magnetic excitation parts 181, 182 is magnetically connected to the magnetic salient part 183 in the first extension part 162 and the magnetic salient part 184 in the second extension part 163 respectively. And each base magnetic pole 167 of them is magnetically connected to both ends of the cylindrical magnetic yoke 75 (not shown in FIG. 18) respectively. Each magnetic excitation part support 168 in the magnetic excitation parts 181, 182 is controlled to displace circumferentially so that relative position between (the main magnetic pole 165 and the bypass magnetic pole 166) and the field magnet 164 is changed.

Figure 19:
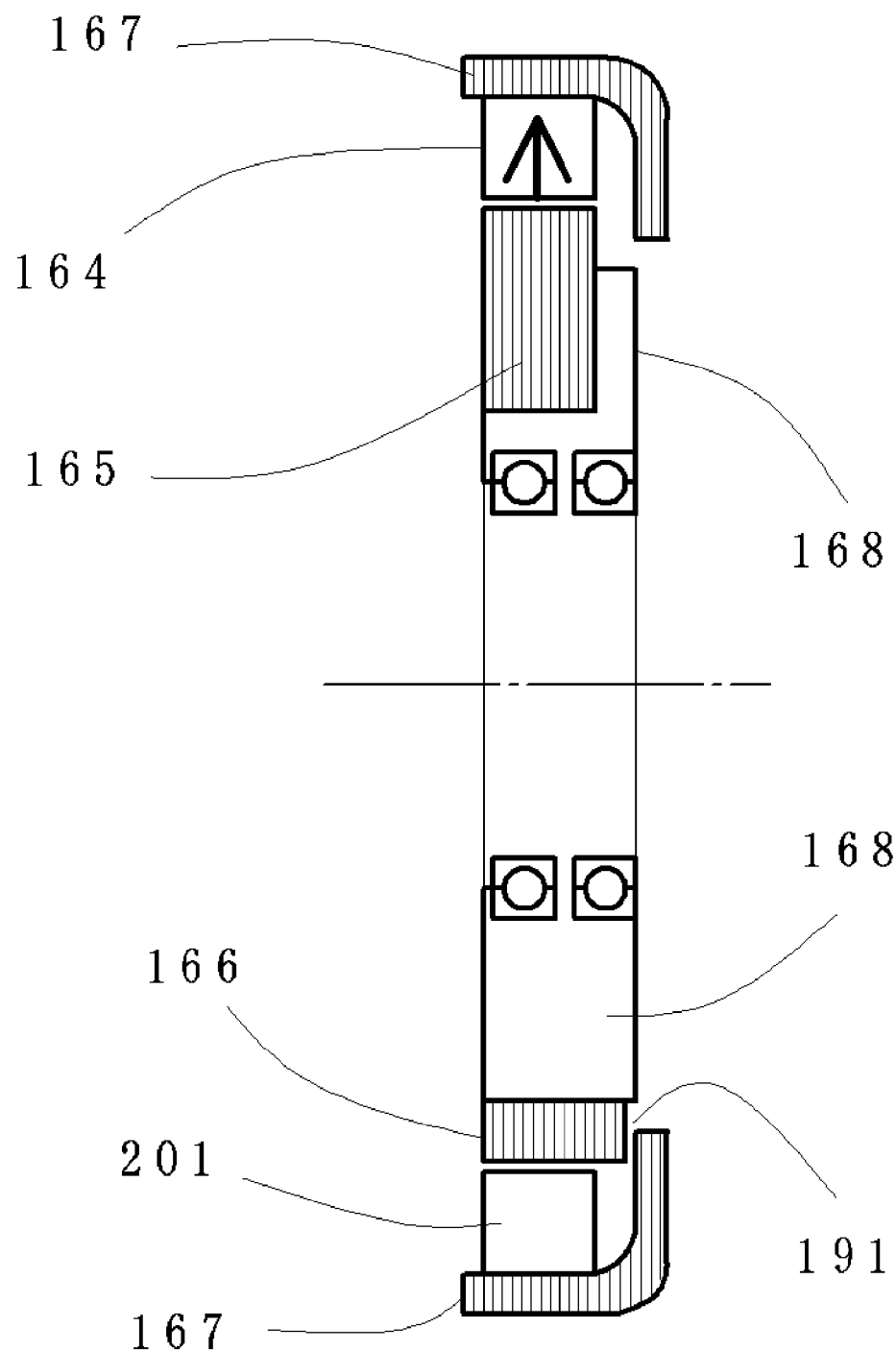
FIG. 19 is a longitudinal sectional view showing the magnetic excitation part of the rotating electric machine apparatus shown in FIG. 16.
Figure 20:
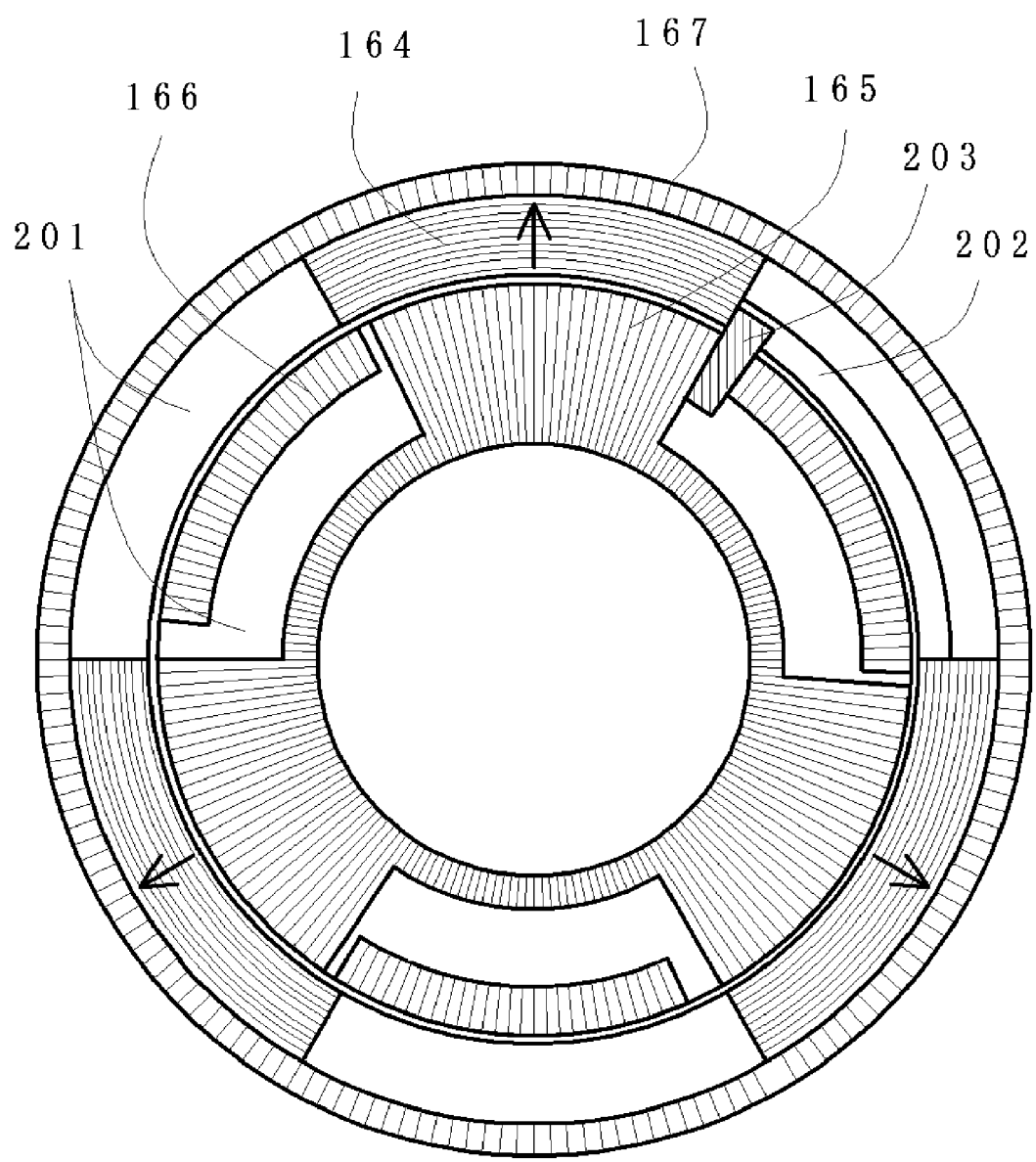
FIG. 20 is a sectional view showing the magnetic excitation part of the rotating electric machine apparatus shown in FIG. 16.

The disposition of the magnetic excitation part will be explained by using FIGS. 19 and 20. FIG. 19 is a magnified longitudinal sectional view showing the magnetic excitation part 182, and FIG. 20 is a magnified plan view showing the magnetic excitation part 182 from the rotor side. In FIGS. 19 and 20, three field magnets 164 are fixed in the direction of a circumference at equal intervals at the inner side of the base magnetic pole 167, and the main magnetic pole 165 and the bypass magnetic pole 166 are arranged along with the direction of a circumference opposing to each field magnet 164 in a radial direction. The field magnet 164 is always opposing to the main magnetic pole 165 and the bypass magnetic pole 166, and the sum of the respective opposed areas of the main magnetic pole 165 and the bypass magnetic pole 166 is constant, and respective above area is changed according to the displacement of a magnetic pole unit (the main magnetic pole 165 and the bypass magnetic pole 166). The number 201 represents the non-magnetic portion.

The main magnetic pole 165 is magnetically connected to the magnetic salient part 184 of the second extension part 163 through air gap, the bypass magnetic pole 166 is magnetically connected to the base magnetic pole 167 through a micro air gap 191. In the magnetic excitation part 182 of this embodiment, the magnetic flux flowing from the field magnet 164 to the main magnetic pole 166 forms a main magnetic flux path circulating to the base magnetic pole 167 through the magnetic salient part 184, the magnetic salient poles 172, the magnetic teeth 74, and the cylindrical magnetic yoke 75. The magnetic flux flowing into the bypass magnetic pole 166 forms a bypass magnetic flux path circulating to the base magnetic pole 167 through the micro air gap 191. Magnetic resistances of the main magnetic flux path is smaller than that of the bypass magnetic flux path by adjusting an opposing area and the gap length of the micro air gap 191.

The magnetic salient poles 171, 172 are magnetized by the permanent magnet plates 174, 175, then the magnetic salient pole 171 is an N-pole, and the magnetic salient pole 172 is an S-pole. In this embodiment, the magnetic excitation parts are disposed so that the polarity in which each of the magnetic excitation part, the permanent magnet plate magnetizes the magnetic salient pole is same. In the magnetic excitation part 181, the field magnet 164 magnetizes the main magnetic pole 165 in an N-pole, and the main magnetic pole 165 magnetizes the magnetic salient pole 171 in an N-pole. And also in the magnetic excitation part 182, the field magnet 164 magnetizes the main magnetic pole 165 in an S-pole, and the main magnetic pole 165 magnetizes the magnetic salient pole 172 in an S-pole.

Thus, the permanent magnet plates 174, 175 and the magnetic excitation part 181 magnetize the magnetic salient poles 171 respectively in the same polarity. The role of the permanent magnet plates 174, 175 which constitutes the permanent magnet assemblies is a magnetic flux barrier for forming the domain of big magnetic resistance in the direction of a circumference while generating the magnetic flux. In this embodiment, the purpose of the magnetic excitation parts 181, 182 is to supply the magnetic flux and to control it. Therefore, the magnetic flux from the permanent magnet plates 174, 175 is the existence acting as an obstacle from a view point of magnetic flux control. The non-magnetic portion 176 prepared in the intermediate magnetic salient pole 173 is disposed so that a magnetic resistance between the permanent magnet plates 174, 175 becomes large.

In FIG. 20, an air gap 202 and a salient part 203 disposed in the non-magnetic portion 201 provide displacement regulating means for binding the main magnetic pole 165 and the bypass magnetic pole 166 into the displacement in the predetermined range. The salient part 203 is fixed to the side of the main magnetic pole 165 and the bypass magnetic pole 166, and the displacement of the salient part 203 is limited between the adjacent field magnets 164. The state indicated in FIG. 20 is a reference position, and the salient part 203 touches the field magnet 164 side. Angular length of the salient part 203 is set up so that the magnetic pole unit cannot rotate from the reference position beyond an angular length of the main magnetic pole 165 in clockwise direction.

Figure 21:
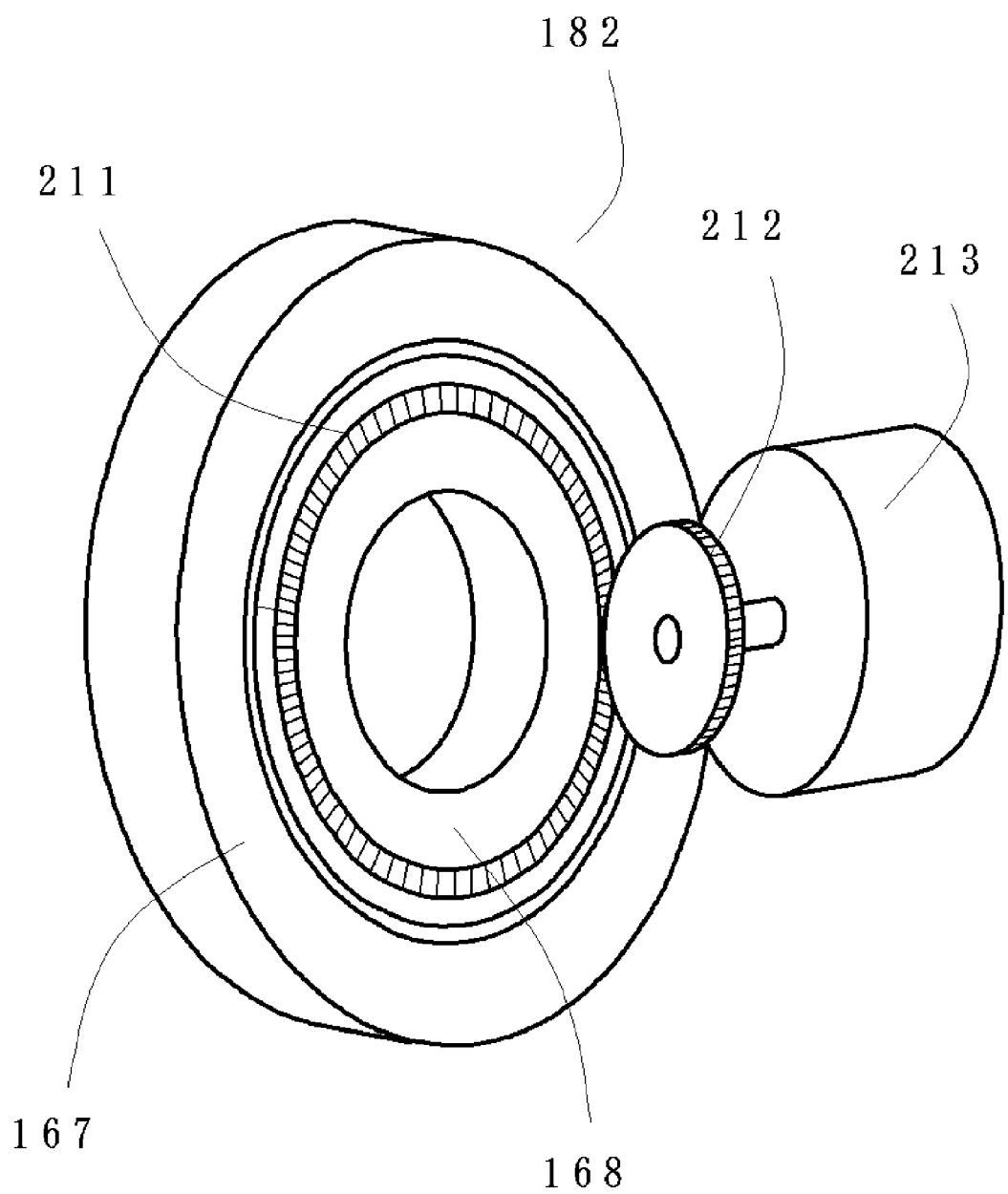
FIG. 21 is a perspective view showing a displacement control means of the rotating electric machine apparatus shown in FIG. 16.

FIG. 21 is a perspective view showing the displacement control means to displace the magnetic pole unit (the main magnetic pole 165 and the bypass magnetic pole 166) with respect to the field magnet 164. In the figure, a gear 211 is disposed at an end of the magnetic excitation part support 168 and then a stepping motor 213 with a gear 212 is disposed so that the gear 212 is bitten with the gear 211. The stepping motor 213 and the gears 211, 212 keep position of the magnetic pole unit, and displace it with respect to the field magnets 164, and control the amount of the magnetic flux between the magnetic salient poles 172 and the magnetic teeth 74. The magnetic excitation part 181 also has the same displacement control means.

The present embodiment connects the predetermined constant current loads (not shown in Figures) to the armature coils 76 for effectively adjusting the magnetic resistance of the main magnetic flux path at the time of the magnetic flux amount control. When a rotating electric machine apparatus is used as a dynamo, if predetermined impedance load is connected to the armature coils 76, voltage is induced by interlinked magnetic flux with armature coils 76 and current of the direction which reduces the interlinked magnetic flux change flows according to the impedance of the load. Thereby, the magnetic resistance of the main magnetic flux path becomes larger effectively. Magnetic resistance of the main magnetic flux path is designed smaller than magnetic resistance of the bypass magnetic flux path. After assembling the rotating electric machine, each constant current load that enables the magnetic resistance of the main magnetic flux path to be effectively equal to the magnetic resistance of the bypass magnetic flux path is detected and memorized in a control device. When the magnetic flux amount flowing through the main magnetic flux path is to be changed, the predetermined constant current load is connected to armature coils 76 and then the magnetic force preventing the displacement of the magnetic pole unit with respect to the field magnets 164 becomes small.

There are various methods to realize the constant current load, and there is load which has a constant current circuit controlled so that predetermined current flows through the armature coils with the induction voltage, or the predetermined impedance defined for every rotational speed. The constant current circuit (not shown in the figures) is used in this embodiment.

As described above, in the rotating electric machine apparatus shown in FIGS. 16 to 21, it has been explained that by relatively displacing the magnetic pole unit with respect to the field magnet 164, an amount of the magnetic flux flowing through the armature can be controlled, and furthermore, the means and the method for the displacement have been explained. The fourth embodiment is a system for optimizing the output by controlling the magnetic flux amount, and the control method as the rotating electric machine system will be explained by using FIG. 6.

A rotating electric machine system in which the rotating electric machine apparatus is used as an electric motor and by which the field-weakening control is performed to optimize the rotational force control will be explained. The constant current load is means to adjust magnetic resistance of the main magnetic flux path in the direction which becomes larger effectively with the rotor slowdown, and field control is performed at the following steps. When the rotational speed that is the output 63 becomes larger than a predetermined value and an amount of the magnetic flux flowing through the armature is made to be smaller, the control device 65 connects the predetermined constant current circuit (not shown in the figures) which sends predetermined current to the armature coils 76 by the induced voltage so that magnetic resistance of the main magnetic flux path and magnetic resistance of the bypass magnetic flux path become effectively equal each other, and displaces the magnetic pole unit clockwise in FIG. 20 through the stepping motor 213 in the magnetic excitation parts 181, 182, and thereby, the opposed area between the main magnetic pole 165 and the field magnet 164 is made to be smaller. When the rotational speed that is the output 63 becomes smaller than a predetermined value and an amount of the magnetic flux flowing through the armature is made to be larger, the control device 65 displaces the magnetic pole unit counterclockwise in FIG. 20 through the stepping motor 213 in the magnetic excitation parts 181, 182, and thereby, the opposed area between the main magnetic pole 165 and the field magnet 164 is made to be larger.

A constant-voltage power generation system in which the rotating electric machine apparatus is used as an electric generator and by which the field-weakening control is performed to control the power generation voltage to be a predetermined voltage will be explained. The constant current load is means to adjust magnetic resistance of the main magnetic flux path in the direction which becomes larger effectively with the rotor slowdown, and field control is performed at the following steps. When the power generation voltage that is the output 63 becomes larger than a predetermined value and an amount of the magnetic flux flowing through the armature made to be smaller, the control device 65 connects the predetermined constant current circuit (not shown in the figures) which sends predetermined current to the armature coils 76 by the induced voltage, and displaces the magnetic pole unit clockwise in FIG. 20 through the stepping motor 213 in the magnetic excitation parts 181, 182, and thereby, the opposed area between the main magnetic pole 165 and the field magnet 164 is made to be smaller. When the power generation voltage that is the output 63 becomes smaller than a predetermined value and an amount of the magnetic flux flowing through the armature is made to be larger, the control device 65 displaces the magnetic pole unit counterclockwise in FIG. 20 through the stepping motor 213 in the magnetic excitation parts 181, 182, and thereby, the opposed area between the main magnetic pole 165 and the field magnet 164 is made to be larger.

When making the magnetic flux amount increase in the above control, the constant current load is not connected to the armature coil, and the magnetic force generated because of smaller magnetic resistance of the main magnetic flux path than magnetic resistance of the bypass magnetic flux path is exploited for an assist to the movable magnetic pole part displacement.

Since the adjusting means of the magnetic resistance of the main magnetic flux path adopted in the present embodiment are accompanied by rotor slowdown, when the magnetic flux amount control continues over a long time, operation of rotating electric machine may be affected. But a change in the rotating speed and change control of the magnetic flux amount are performed successively by a usual operational status, so it will not be a big problem. Moreover, when magnetic resistance change of the main magnetic flux path is greatly expected by aging changes or temperature change, the composition which acquires the compensation conditions of the magnetic resistance of the main magnetic flux path in learning way or from map data is adopted.

Map data is created as follows. The parameters which fluctuate the magnetic resistance of the main magnetic flux path and the bypass magnetic flux path during operation of the rotating electric machine apparatus are mainly temperature, displacement position of the movable magnetic pole part, rotating speed, etc. The relation of the parameter indicating these operation conditions and the fluctuation amount from initial setting of the constant current load can be presumed based on statistical data by the rotating electric machine apparatus of identical design. The map data between the parameters which show the constant current load and operation conditions is created and set up after the assembly of the rotating electric machine apparatus.

The rotating electric machine system according to a fifth embodiment of the present invention will be explained by using FIGS. 22 to 26. The fifth embodiment is a rotating electric machine system having a radial gap structure. A magnetic excitation part is arranged at the housing side which neighbors the rotor end, and a magnetic resistance adjusting coil is disposed in a bypass magnetic flux path.

Figure 22:
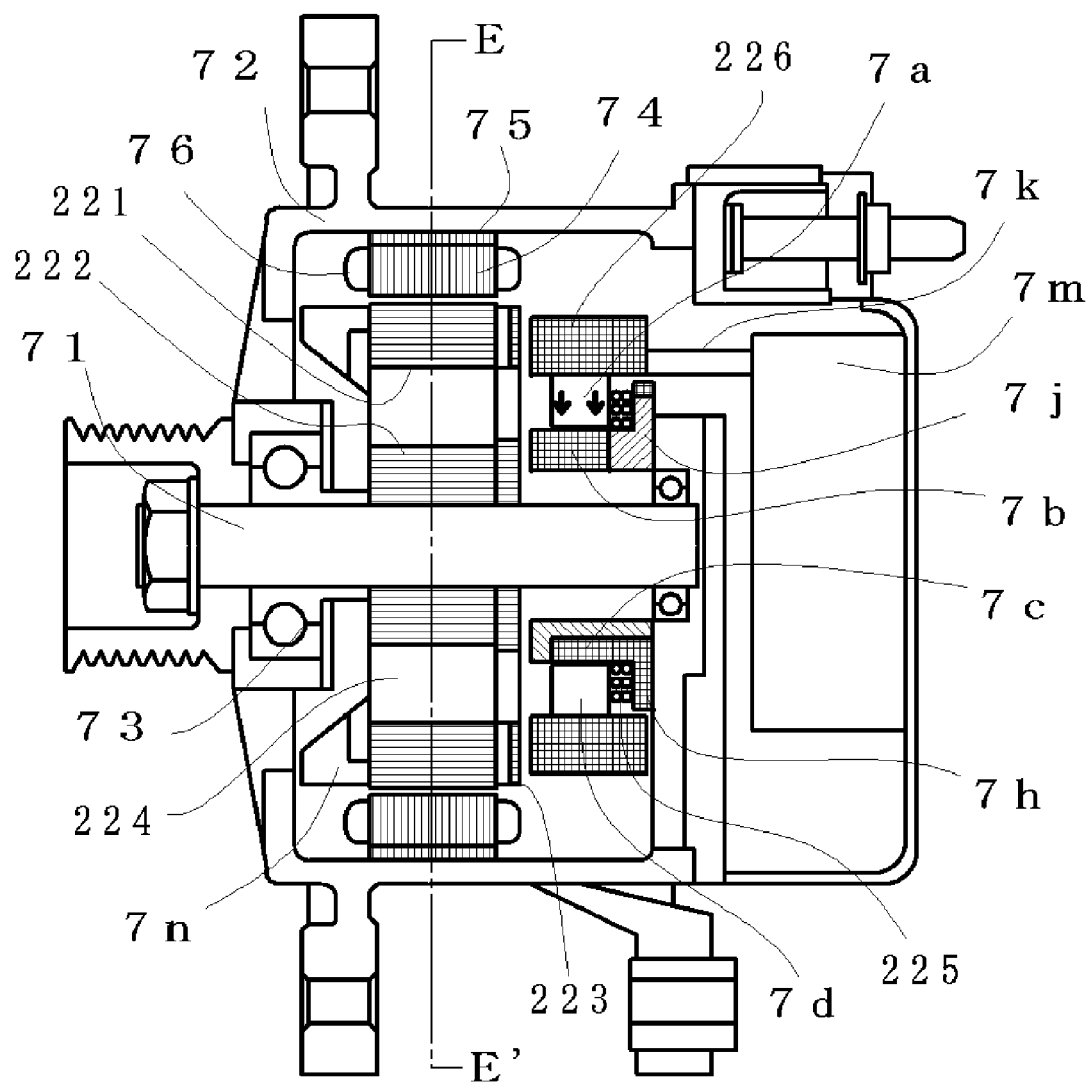
FIG. 22 is a longitudinal sectional view of a rotating electric machine apparatus according to a fifth embodiment of the present invention.

FIG. 22 illustrates embodiment applied this invention to the rotating electric machine apparatus having a radial gap structure, the rotational shaft 71 is supported rotatably by the housing 72 through bearings 73. The composition of the armature is same as the second embodiment indicated in FIG. 7, so the explanation thereof is omitted. The rotor has a surface magnetic pole part 221 in which a magnetic salient pole and a permanent magnet are lined one after the other in the circumferential direction, and are disposed so that the adjacent magnetic salient pole is extended to the inner side of the radial direction and the axial right alternately, and extended magnetic salient pole parts serve as a first extension part 222 and a second extension part 223 according to the extended direction. The magnetic excitation part is arranged at the housing side on the right-hand side of the rotor and is opposing to the first extension part 222 and the second extension part 223 through air gap. The magnetic excitation part supplies magnetic flux to the first extension part 222 and the second extension part 223, and magnetizes an adjacent magnetic salient pole to the different polarities mutually.

In the figure, the composition of the principal part of the magnetic excitation part is the almost same composition as the second embodiment indicated in FIG. 7, and includes the field magnet 7a, the main magnetic pole 7b, and the bypass magnetic pole 7c. The main magnetic pole 7b and the bypass magnetic pole 7c are fixed to the magnetic excitation part support 7j, and the magnetic excitation part support 7j is fixed to the housing 72. The field magnet 7a and a base magnetic pole 226 are a movable magnetic pole part, and are supported so as to be possible to slide on a magnetic pole unit composed of the main magnetic pole 7b and the bypass magnetic pole 7c in the circumferential direction, and are connected to the actuator 7m through the control rod 7k. The number 224 represents a cavity where cooling air flows, the number 7h represents the circular magnetic core, and the number 225 represents a magnetic resistance adjusting coil for adjusting magnetic resistance of the bypass magnetic flux path.

Figure 23:
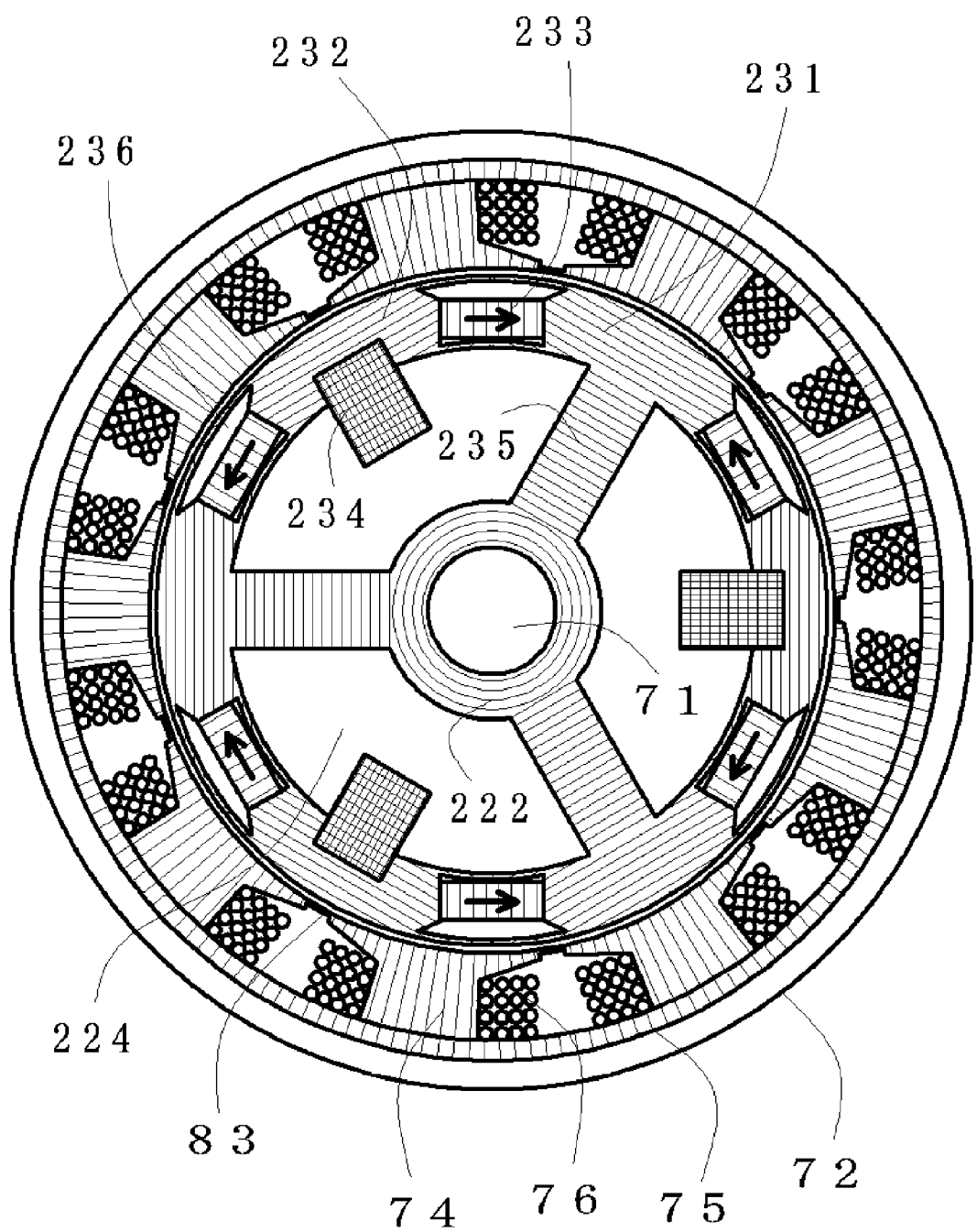
FIG. 23 is a sectional view showing an armature and a rotor of the rotating electric machine apparatus shown in FIG. 22.

FIG. 23 illustrates a sectional view of the armature and the rotor along the E-E' in FIG. 22, and some component parts are appended with numbers for explaining the mutual relations. The disposition of the armature is the same with the second embodiment and therefore the explanation thereof will be omitted.

In FIG. 23, the rotor has a structure in which the magnetic salient pole and the permanent magnet are disposed one after the other in the circumferential direction. The surface magnetic pole part is characterized in that a uniform magnetic material is partitioned into the magnetic salient poles 231, 232 by the permanent magnet 233 in the circumferential direction. Adjacent magnetic salient poles 231, 232 are extended alternately to the inside diameter direction and to the axial right direction. The portion which extended and gathered in the inside diameter direction as represented by the number 235 serves as the first extension portion 222 and the extended portion to the axial right direction serves as the second extension portion 223. The number 236 represents a non-magnetic portion. And each magnetization direction of the adjacent permanent magnet 233 is inversely arranged so that the adjacent magnetic salient poles 231, 232 are magnetized in different polarities each other. Arrows appended in the permanent magnet 233 indicate magnetization direction.

The permanent magnet 233 supplies magnetic flux to magnetic salient poles 231, 232, and serves as a magnetic flux barrier which forms the domain where magnetic resistance is large in the circumferential direction. The number 234 shows a magnetic-flux channel portion that corresponds to the magnetic-flux channel portion 124 in the third embodiment. The magnetic salient poles 231, 232 are composed by punching out a silicon steel plate by a predetermined die and then stacking the punched plates. Then permanent magnets are inserted into slots corresponding to the permanent magnets 233, and iron blocks are also inserted into slots corresponding to the magnetic-flux channel portion 234. The non-magnetic portion 236 is composed in non-magnetic resin or the like having large specific resistance.

Figure 24:
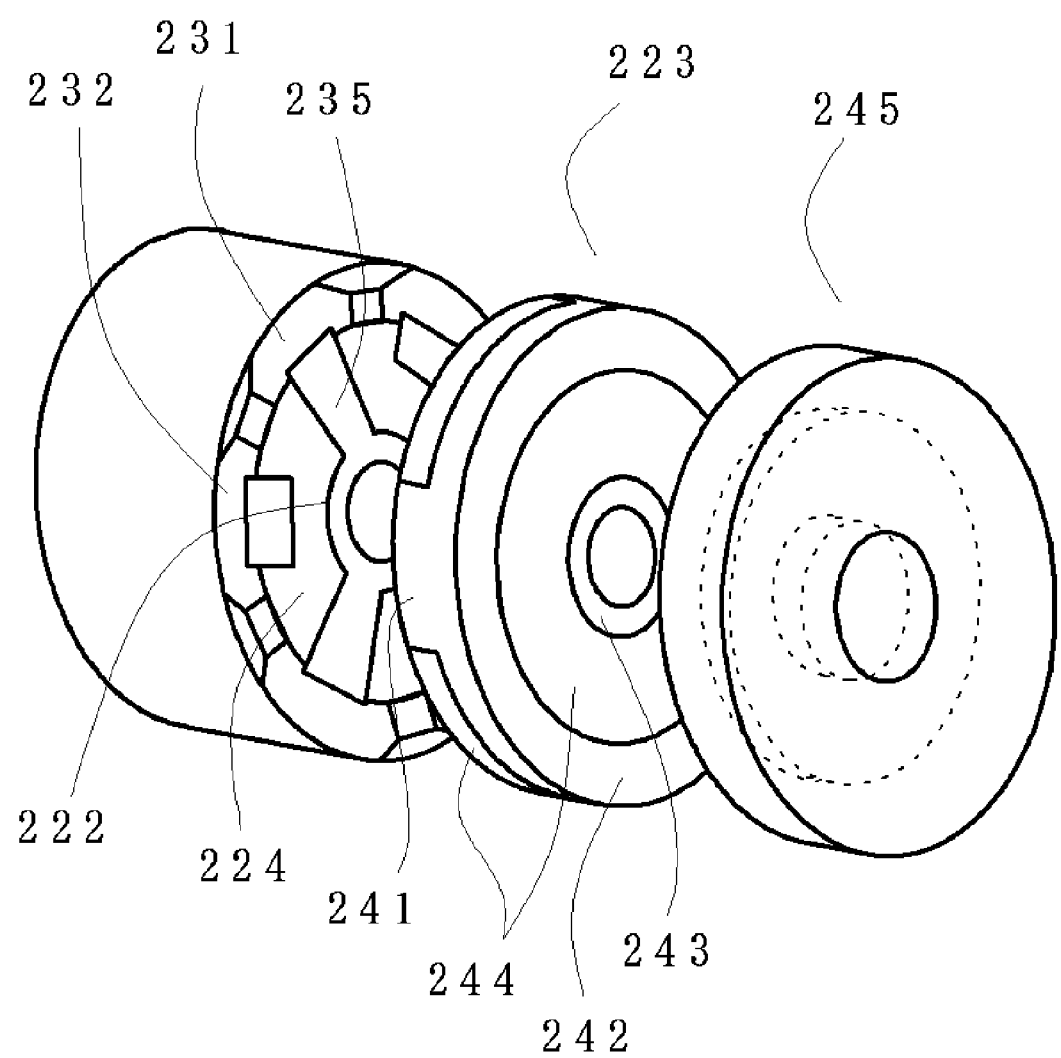
FIG. 24 is an exploded perspective view showing the rotor, a first extension part, a second extension part and a magnetic excitation part of the rotating electric machine apparatus shown in FIG. 22.

FIG. 24 is an explosive perspective view showing the rotor and the magnetic excitation part. A main part including the magnetic salient poles 231, 232 and the second extension part 223 are separately illustrated for understanding easily. And also the magnetic excitation part 245 which counters the second extension part 223 through a gap, and is arranged at the housing 72 side is indicated. The second extension part 223 has a magnetic salient part 241 that corresponds to the magnetic salient pole 232, and is press molding of the soft iron. A non-magnetic portion 244 is made from non-magnetic stainless steel. The annular magnetic core portion 242 uniting with magnetic salient part 241 is opposite to the base magnetic pole 226 in magnetic excitation part 245 through a minute gap, and the cylindrical magnetic core 243 combined with the first extension part 222 is opposite to the main magnetic pole 7b through a minute gap.

Figure 25:
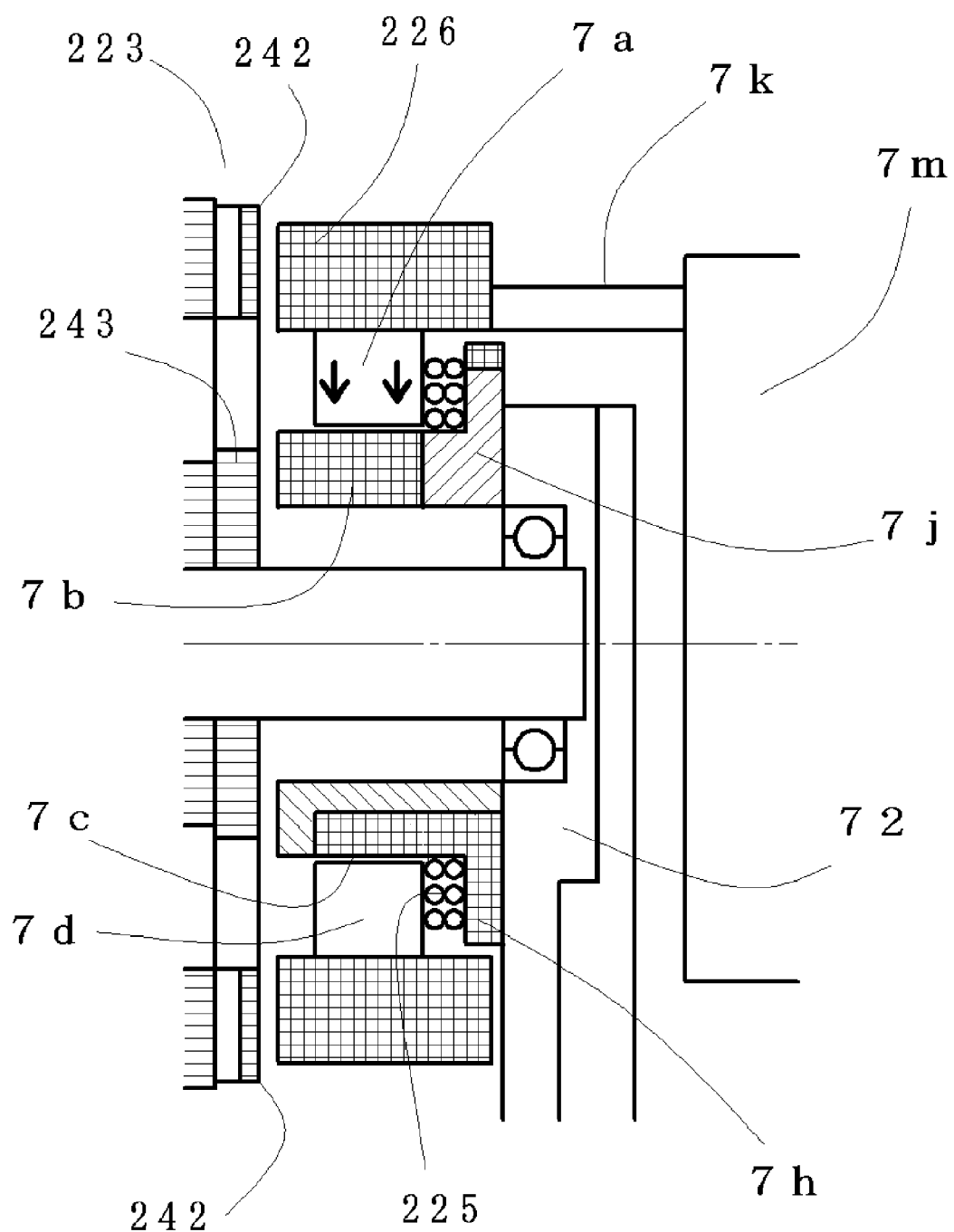
FIG. 25 is a longitudinal sectional view showing the rotor and the magnetic excitation part of the rotating electric machine apparatus shown in FIG. 22.
Figure 26:
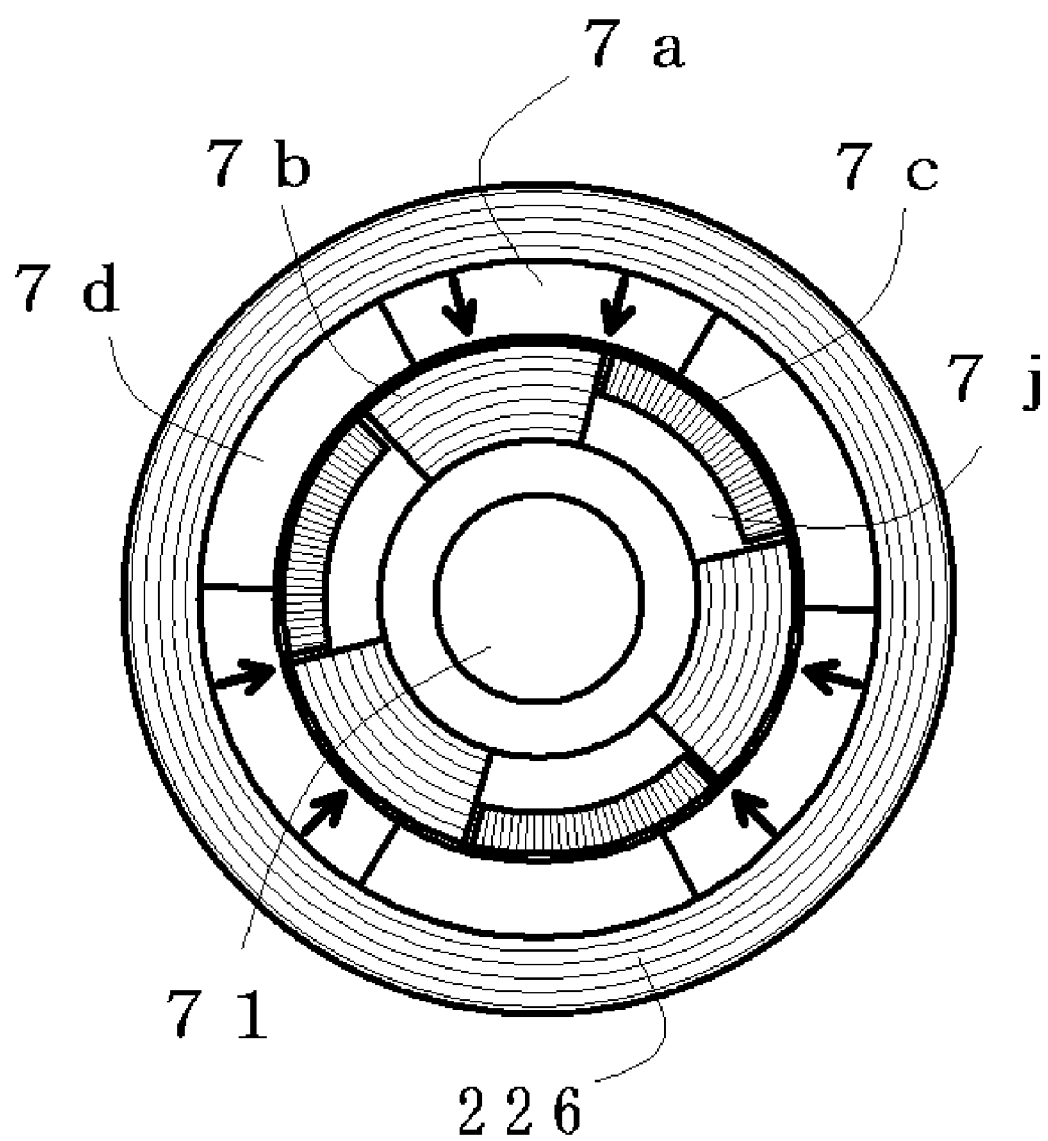
FIG. 26 is a sectional view showing the magnetic excitation part of the rotating electric machine apparatus shown in FIG. 22.

FIG. 25 is magnified longitudinal sectional view of the rotor and the magnetic excitation part shown in FIG. 22, and FIG. 26 is the sectional view of the magnetic excitation part. The constitution of the magnetic excitation part and operating principle of the field control are explained using FIGS. 22, 25, and 26. The main part of the magnetic excitation part includes the field magnet 7a, the magnetic pole unit (the main magnetic pole 7b, and the bypass magnetic pole 7c). There are three of the field magnets 7a with magnetization of radial direction, and the field magnets 7a and the non-magnetic portions 7d are disposed one after the other in the circumferential direction, and are fixed to the inner side of the base magnetic pole 226 with cylindrical shape. The pair of the main magnetic pole 7b and the bypass magnetic pole 7c are disposed to face each of the field magnets 7a, is arranged and fixed to the magnetic excitation part support 7j. The bypass magnetic pole 7c is further connected to a circular magnetic core 7h, and the circular magnetic core 7h is disposed to face the base magnetic pole 226 through a gap. Furthermore, the main magnetic pole 7b is opposite to the cylindrical magnetic core 243, and the base magnetic pole 226 is opposite to the annular magnetic core portion 242. Since alternating magnetic flux does not flow into the main magnetic pole 7b, the bypass magnetic pole 7c, the base magnetic pole 226, and the circular magnetic core 7h, they constitute from iron with large saturation magnetic flux density, and the magnetic excitation part is constituted compactly.

The magnetic salient poles 231, 232 are magnetized by the permanent magnet 233, then the magnetic salient pole 231 is an N-pole, and the magnetic salient pole 232 is an S-pole. In this embodiment, the magnetic excitation part is disposed so that the polarity in which each of the magnetic excitation part, the permanent magnet magnetizes the magnetic salient pole is same. In the magnetic excitation part, the field magnet 7a magnetizes the main magnetic pole 7b in an N-pole, and the main magnetic pole 7b magnetizes the first extension part 222 and the magnetic salient pole 231 in an N-pole. And also the field magnet 7a magnetizes the magnetic salient pole 232 in an S-pole through the second extension part 223.

This embodiment has the constitution that the field magnet 7a is able to slide on the magnetic pole unit in the circumferential direction, and the field magnet 7a is displaced by the actuator 7m as the second embodiment. The actuator 7m connects with the field magnet 7a and the base magnetic pole 226 by three control rod 7k through the windows prepared in the housing 72, and makes them to displace in circumferential direction so as to change opposing area between the field magnet 7a and the main magnetic pole 7b.

A main magnetic flux path and a bypass magnetic flux path are connected to the field magnet 7a in parallel. The main magnetic flux path is a flux path in which a magnetic flux circulates through the main magnetic pole 7b, the cylindrical magnetic core 243, the first extension part 222, the magnetic salient pole 231, the magnetic teeth 74, the magnetic salient pole 232, the second extension part 223, the magnetic salient part 241, the annular magnetic core portion 242, and the base magnetic pole 226. The bypass magnetic flux path is a flux path in which a magnetic flux circulates through the bypass magnetic pole 7c, the circular magnetic core 7h, and the base magnetic pole 226. Magnetic flux is shunted in the main magnetic flux path and the bypass magnetic flux path according to the field magnet 7a displacement in a circumferential direction, and magnetic flux amount flowing through the main magnetic flux path is controlled.

In this embodiment, Length and opposing area of the non-magnetic gap area between the circular magnetic core 7h and the base magnetic pole 226 are adjusted so that magnetic resistance of both the above magnetic flux paths is set up almost equally each other, therefor the magnetic force disturbing the field magnet 7a displacement is maintained to be small.

In the present embodiment, a stepping motor is used as the actuator 7m, and the field magnet 7a is displaced through the control rod 7k. When the stepping motor is not driven, a position of the field magnet 7a is maintained, and entire energy consumption for the magnetic field control is small.

A magnetic resistance of each magnetic flux path may be fluctuated by various factors. In this embodiment, a predetermined current is supplied to the magnetic resistance adjusting coil 225 wound around the bypass magnetic flux path at the time of the displacement control of the field magnet 7a, magnetic resistance of the bypass magnetic flux path is adjusted effectively, and the magnetic force disturbing the displacement is made small. After assembling the rotating electric machine, current that enables the magnetic force disturbing the displacement to be minimum is detected and memorized in a control device as the predetermined current. In case of the magnetic flux amount change, the predetermined current is supplied to the magnetic resistance adjusting coil 225 for effectively adjusting magnetic resistance of the bypass magnetic flux path and then the magnetic force preventing the displacement of the field magnet 7a becomes small.

As described above, in the rotating electric machine apparatus shown in FIGS. 22 to 26, it has been explained that by relatively displacing the field magnet 7a with respect to the magnetic pole unit, an amount of the magnetic flux flowing through the armature can be controlled, and furthermore, the means and the method for the displacement have been explained. The fifth embodiment is a system for optimizing the output by controlling the magnetic flux amount, and the control method as the rotating electric machine system will be explained by using FIG. 6.

A rotating electric machine system in which the rotating electric machine apparatus is used as an electric motor and by which the field-weakening control is performed to optimize the rotational force control will be explained. When the rotational speed that is the output 63 becomes larger than a predetermined value and an amount of the magnetic flux flowing through the armature is made to be smaller, the control device 65 supplies the predetermined current to the magnetic resistance adjusting coil 225 so that magnetic resistance of the main magnetic flux path and magnetic resistance of the bypass magnetic flux path become effectively equal each other, and makes the actuator 7m displace the control rod 7k in the direction of a clockwise rotation in FIG. 26 by the control signal 66, and thereby, the opposed area between the main magnetic pole 7b and the field magnet 7a is made to be smaller. When the rotational speed that is the output 63 becomes smaller than a predetermined value and an amount of the magnetic flux flowing through the armature is made to be larger, the control device 65 supplies the predetermined current to the magnetic resistance adjusting coil 225, and makes the actuator 7m displace the control rod 7k in the direction of a counterclockwise rotation in FIG. 26 by the control signal 66, and thereby, the opposed area between the main magnetic pole 7b and the field magnet 7a is made to be larger.

A constant-voltage power generation system in which the rotating electric machine apparatus is used as an electric generator and by which the field-weakening control is performed to control the power generation voltage to be a predetermined voltage will be explained. When the power generation voltage that is the output 63 becomes larger than a predetermined value and an amount of the magnetic flux flowing through the armature is made to be smaller, the control device 65 supplies the predetermined current to the magnetic resistance adjusting coil 225 so that magnetic resistance of the main magnetic flux path and magnetic resistance of the bypass magnetic flux path become effectively equal each other, and makes the actuator 7m displace the control rod 7k in the direction of a clockwise rotation in FIG. 26 by the control signal 66, and thereby, the opposed area between the main magnetic pole 7b and the field magnet 7a is made to be smaller. When the power generation voltage that is the output 63 becomes smaller than a predetermined value and an amount of the magnetic flux flowing through the armature is made to be larger, the control device 65 supplies the predetermined current to the magnetic resistance adjusting coil 225, and makes the actuator 7m displace the control rod 7k in the direction of a counterclockwise rotation in FIG. 26 by the control signal 66, and thereby, the opposed area between the main magnetic pole 7b and the field magnet 7a is made to be larger.

In the magnetic resistance adjusting means by this embodiment, although it is necessary to supply current to the magnetic resistance adjusting coil, since it is limited at the time of magnetic flux amount control, energy loss is suppressed low. The means to supply current to the armature coil and adjust magnetic resistance of the main magnetic flux path affects revolution of the rotor, but the magnetic resistance adjusting means with the magnetic resistance adjusting coil has the advantage which does not affect revolution of the rotor. In this embodiment, the predetermined current is set up beforehand by inspection after manufacture. But acquiring the predetermined current in learning way or from map data, and coping with various change factors are also possible.

Although magnetic resistance of the main magnetic flux path and the bypass magnetic flux path is set to the minimum magnetic force condition and power required for the displacement is made small in this embodiment, it is also possible to reduce the power still more. That is, magnetic resistance thereof is shifted from the minimum magnetic force condition so that magnetic force may appear in the direction which the movable magnetic pole part is made to displace, and the actuator for the displacement control means is made to assist at the time of displacement control. Since magnetic resistance adjustment with the magnetic resistance adjusting coil has an quick response, the direction change of the above-mentioned magnetic force is easy according to the displacement control direction of the movable magnetic pole part.

A rotating electric machine system according to a sixth embodiment of the present invention will be explained by using FIGS. 27 to 30. The sixth embodiment is a rotating electric machine system having a unipolar rotor with an axial gap structure. A magnetic excitation part is disposed in a rotor, and controls the magnetic flux amount by a governor mechanism.

Figure 27:
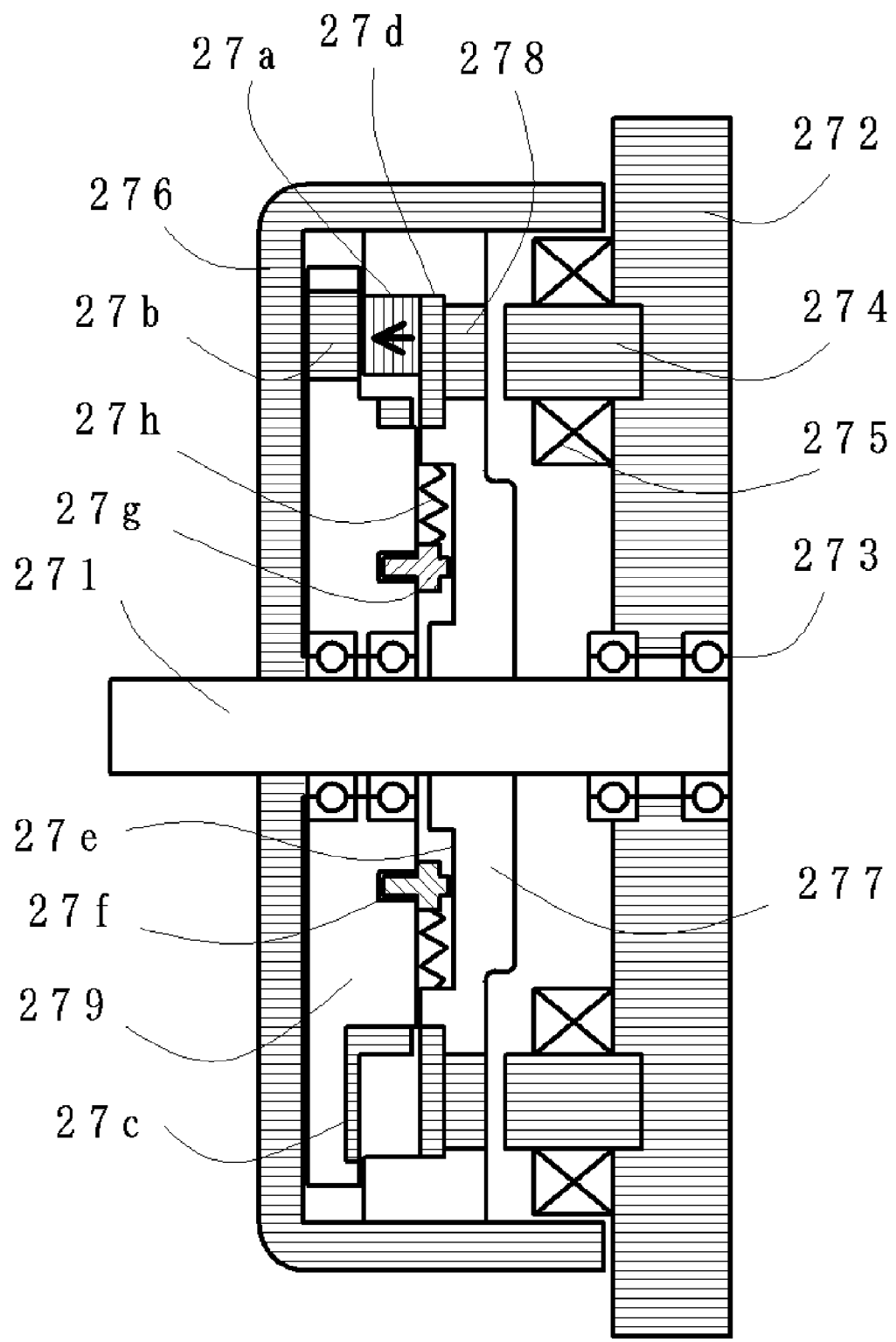
FIG. 27 is a longitudinal sectional view of a rotating electric machine apparatus according to a sixth embodiment of the present invention.

FIG. 27 illustrates embodiment applied this invention to the rotating electric machine apparatus with an axial gap structure, and a rotating shaft 271 is supported rotatably through bearings 273 by an iron substrate 272. An armature is fixed to the iron substrate 272, and includes a plurality of magnetic teeth 274 extending in the axial directions from the substrate 272 and armature coils 275 wound around the magnetic teeth 274. Nine armature coils 275 are included and connected so as to have three phases.

The rotor has a surface magnetic pole part 277 and a displacement magnetic pole part 279 and a cup 276. The surface magnetic pole part 277 and the cup 276 are fixed to the rotating shaft 271. The displacement magnetic pole part 279 is supported rotatably through bearings by the rotating shaft 271 opposing by the surface magnetic pole part 277 and the cup 276 through a micro gap. The surface magnetic pole part 277 includes circle-shaped base magnetic pole 27d arranged on a large electrical resistance resin board and the magnetic salient poles 278 are disposed on the base magnetic plate 27d of the magnetic teeth 274 side and a field magnet 27a is arranged on the other side of the base magnetic plate 27d from the magnetic teeth 274. The base magnetic plate 27d is composed by stacking circular silicon steel plates so that alternating magnetic flux can pass through.

The displacement magnetic pole part 279 includes a main magnetic pole 27b and a bypass magnetic pole 27c arranged on a non-magnetic stainless steel base. The cup 276 is made of iron, and outer periphery of the cup 276 is opposing to the substrate 272 so that the magnetic flux can propagate from the main magnetic pole 27b to the substrate 272 through the cup 276. The displacement magnetic pole part 279 rotates with the rotating shaft 271, the cup 276, and the surface magnetic pole part 277, and changes the relative position of the circumferential direction with respect to the rotating shaft 271, the cup 276, and the surface magnetic pole part 277 according to the rotating speed by centrifugal force. A radial guide groove 27e and a spring 27h arranged at the surface magnetic pole part 277, and an arc-shaped guide groove 27f and a weight 27g arranged at the displacement magnetic pole part 279 are a part of above mentioned displacement means. Details are explained later using FIGS. 29A, 29B, 30A, and 30B.

Figure 28A:
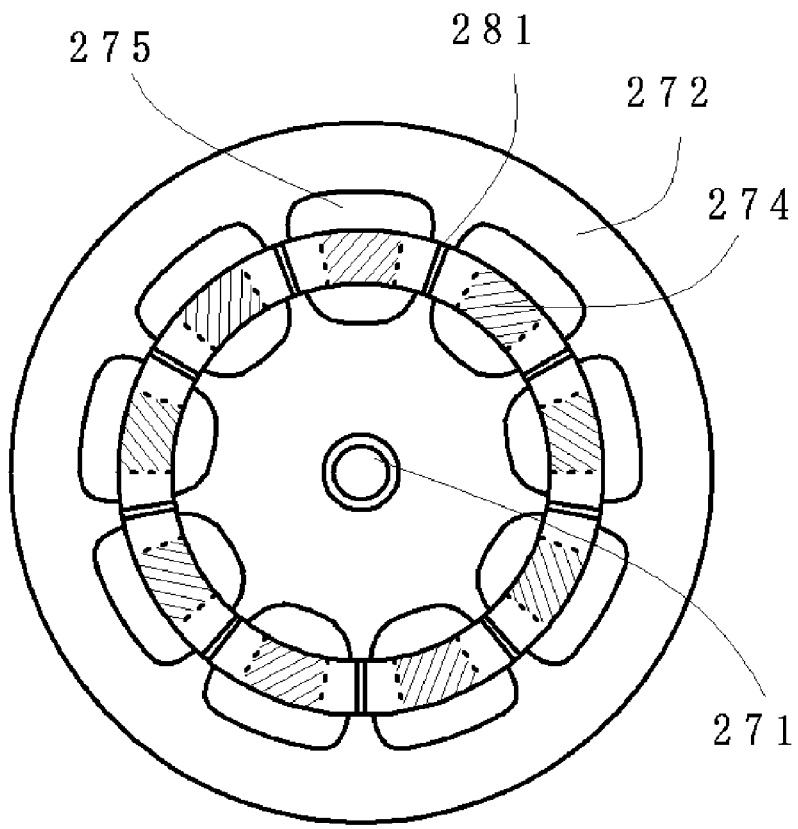
FIG. 28A is a plan view showing an armature seen from a surface magnetic pole part side.

FIG. 28A is a plan view showing the armature from the surface magnetic pole part 277 side, and some of the component parts are appended with numbers for explaining the reciprocal relation. The magnetic teeth 274 are T character-like structures, and while the portion by which the hatch was carried out is fixed by the iron substrate 272, the armature coils 275 are wound around. At an opposing surface to the surface magnetic pole part 277, the adjacent magnetic teeth 274 are facing each other through a micro gap 281. In this embodiment, nine armature coils 275 are included and connected so as to have three phases. The iron substrate 272 forms a part of the main magnetic flux path with the magnetic teeth 274.

Figure 28B:
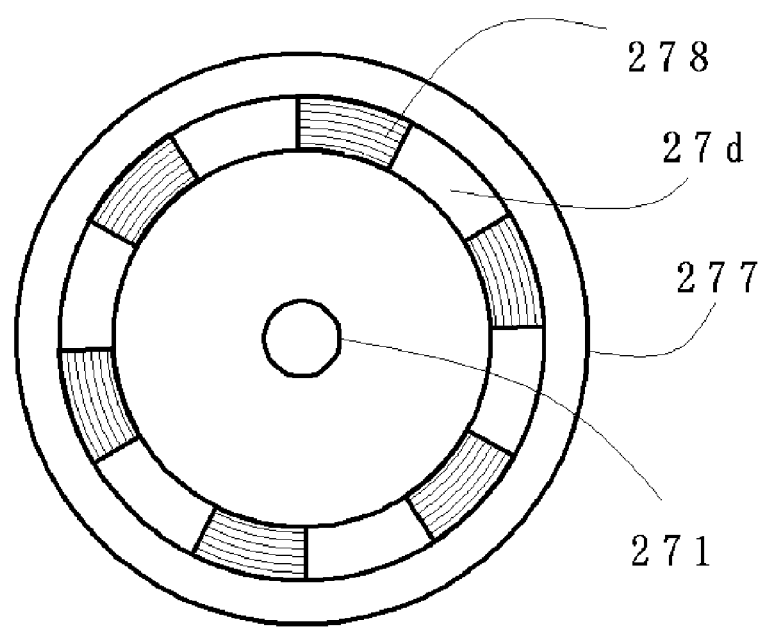
FIG. 28B is a plan view showing the surface magnetic pole part opposing magnetic teeth of the rotating electric machine apparatus shown in FIG. 27.
Figure 29A:
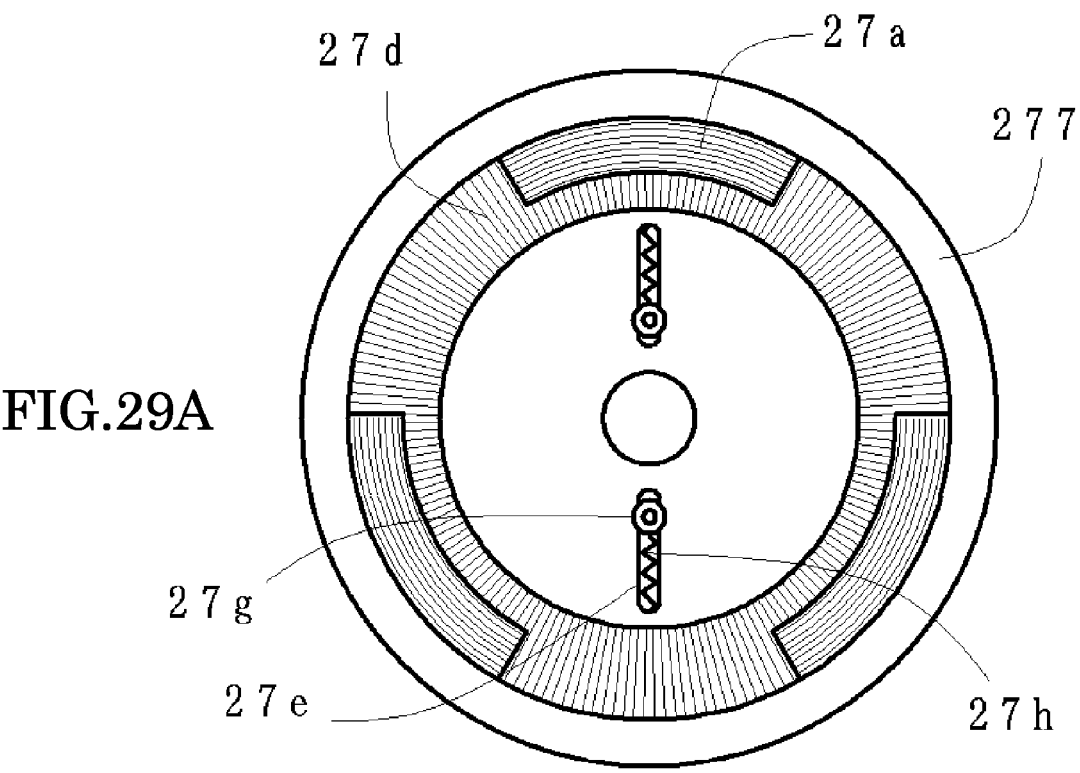
FIG. 29A is a plan view showing the surface magnetic pole part seen from a displacement magnetic pole part side.
Figure 29B:
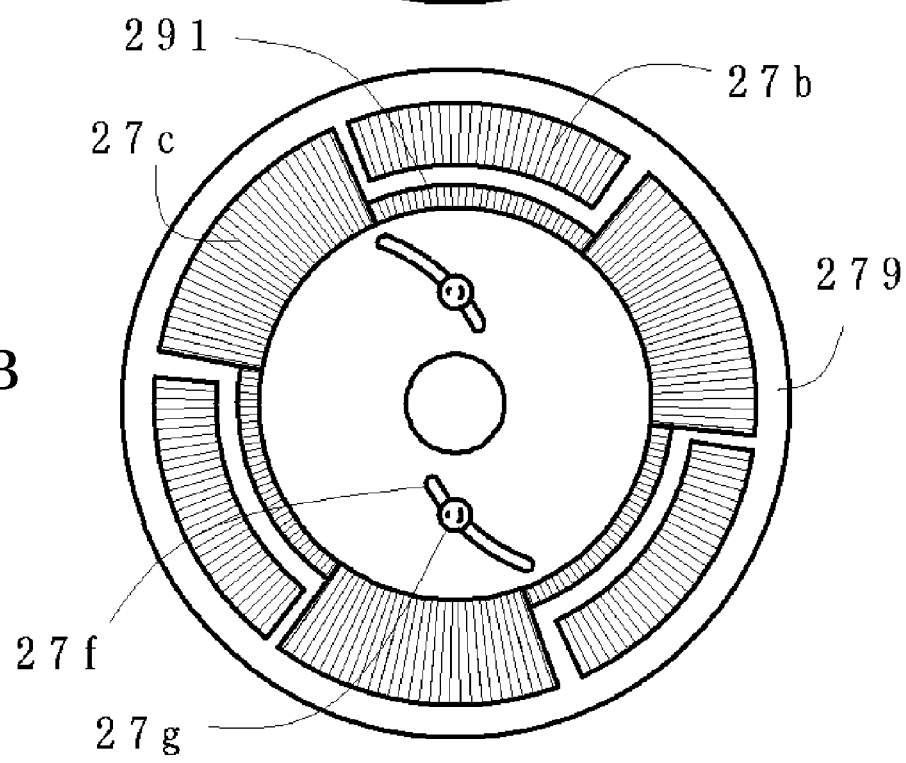
FIG. 29B is a plan view showing the displacement magnetic pole part seen from a cup side of the rotating electric machine apparatus shown in FIG. 27.

FIG. 28B is a plan view showing the surface magnetic pole part 277 from the magnetic teeth 274 side. Six magnetic salient poles 278 are arranged at equal intervals on the circle-like base magnetic plate 27d of the surface magnetic pole part 277. The magnetic excitation part includes the surface magnetic pole part 277 and the displacement magnetic pole part 279. FIG. 29A is a plan view showing the surface magnetic pole part 277 from the displacement magnetic pole part 279 side. Three field magnet 27a are arranged at equal intervals on the circle-like base magnetic plate 27d of the surface magnetic pole part 277. FIG. 29B is a plan view showing the displacement magnetic pole part 279 from the cup 276 side. The main magnetic pole 27b and the bypass magnetic pole 27c are opposite to the field magnet 27a through a micro gap, and the bypass magnetic pole 27c connects with a bypass magnetic material 291, and the bypass magnetic material 291 is opposing to the base magnetic plate 27d through a micro gap. The axial length of the main magnetic pole 27b is longer than the bypass magnetic pole 27c, and is magnetically combined with the cup 276 through a minute gap.

In FIGS. 29A and 29B, the governor mechanism that displaces the displacement magnetic pole part 279 with respect to the cup 276 and the surface magnetic pole part 277 according to rotational speed is shown. The weight 27g is disposed in the radial guide groove 27e and the arc-shaped guide groove 27f, and is biased to move toward inner direction by the spring 27h disposed in the radial guide groove 27e. Although the arc-shaped guide groove 27f is arranged at the surface magnetic pole part 277 side of the displacement magnetic pole part 279, in order to make it intelligible, the solid line shows them with 27g of weight in FIG. 29B.

The standard position of the weight 27g is a position in the standstill which centrifugal force does not work, and the weight 27g is located in the innermost radius. When the rotational speed increases, the centrifugal force and the spring 27h will push one another, and the weight 27g moves to the balancing diameter position. The arc-shaped guide groove 27f receives the power of the circumferential direction and makes the displacement magnetic pole part 279 displace relatively to the surface magnetic pole part 277 and the cup 276 by its process. Then FIG. 29B indicates the example which the weight 27g moved to the perimeter side slightly from the standard position. Furthermore, displacement of the displacement magnetic pole part 279 increases according to the rotational speed and becomes biggest by a point to a termination of the guide groove 27e of radial direction or the arc-shaped guide groove 27f, and the size of the guide groove 27e or the arc-shaped guide groove 27f is made into the regulation means of the displacement of the displacement magnetic pole part 279.

Figure 30A:
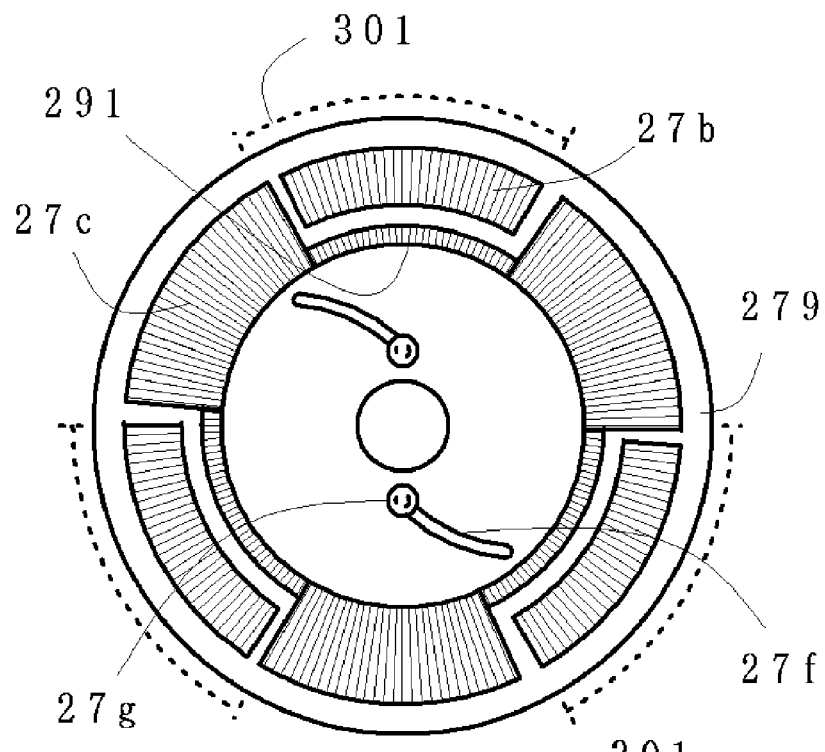
FIG. 30A is a plan view showing the main magnetic pole and the bypass magnetic pole in a reference position.
Figure 30B:
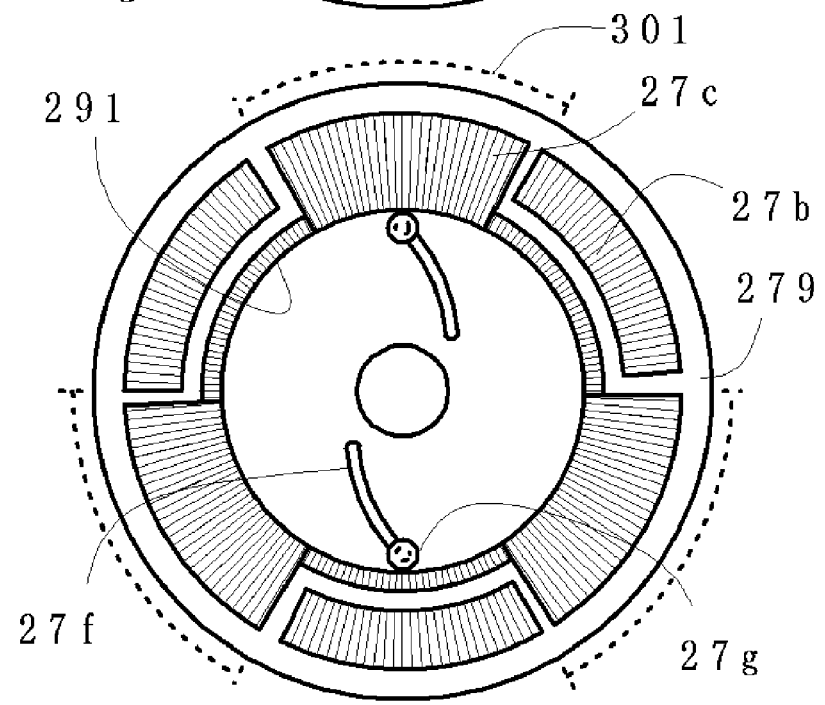
FIG. 30B is a plan view showing the main magnetic pole and the bypass magnetic pole which carried out the maximum displacement in the rotating electric machine apparatus shown in FIG. 27.

FIG. 30A illustrates the main magnetic pole 27b and the bypass magnetic pole 27c in the standard position, and FIG. 30B illustrates the main magnetic pole 27b and the bypass magnetic pole 27c which carried out the maximum displacement. The principle which controls the amount of magnetic flux between the magnetic salient pole 278 and the magnetic teeth 274 using from FIGS. 27 to 30B will be explained. The main magnetic flux path and the bypass magnetic flux path are connected to the field magnet 27a in parallel. The main magnetic flux path is the magnetic flux path where the magnetic flux from the one pole of the field magnet 27a returns to the other pole thereof through the main magnetic pole 27b, the cup 276, the substrate 272, the magnetic teeth 274, the magnetic salient pole 278, and the base magnetic pole part 27*d*. The bypass magnetic flux path is the magnetic flux path where the magnetic flux from the one pole of the field magnet 27*a* returns to the other pole thereof through the bypass magnetic pole 27*c*, the bypass magnetic material 291, and the base magnetic pole part 27*d*. In this embodiment, the opposing area in the gap and a gap length between the bypass magnetic material 291 and the base magnetic pole part 27*d* are being adjusted so that magnetic resistance of the bypass magnetic flux path may be set up almost equally to the magnetic resistance of the main magnetic flux path on the average operating condition of the rotating electric machine.

An area of the field magnet 27*a* opposed to the main magnetic pole 27*b* and an area of the field magnet 27*a* opposed to the bypass magnetic pole 27*c* change according to relative displacement of the main magnetic pole 27*b* and the bypass magnetic pole 27*c*, and a sum of the area of each above is maintained to be constant. The magnetic flux from the field magnet 27*a* is shunted toward the main magnetic pole 27*b* and the bypass magnetic pole 27*c* according to the above opposing area ratio. In this embodiment, magnetic resistance of the main magnetic flux path and the bypass magnetic flux path are equal mostly each other in the average operating condition of the rotating electric machine apparatus, and thereby, magnetic force disturbing the displacement may be made small.

In FIGS. 30A and 30B, the dotted line 301 illustrates the circumferential position of the field magnet 27*a*. When being stationary, centrifugal force does not operate on the weight 27*g*, so it is forced by the spring 27*h* into the standard location of the innermost radius, and the opposite area with the main magnetic pole 27*b* and the field magnet 27*a* is biggest, and the biggest amount of magnetic flux is flowing through the space between the magnetic salient poles 278 and the magnetic teeth 274. Then rotational speed is high as indicated in FIG. 30B, the centrifugal force which acts on weight 27*g* wins the force of the spring 27*h* and makes the weight 27*g* move to the most part of outskirts in the guide groove 27*f* or the guide groove 27*e*, and the relative displacement of the main magnetic pole 27*b* and the bypass magnetic pole 27*c* with respect to the field magnet 27*a* becomes maximum, and the opposite area with the main magnetic pole 27*b* and the field magnet 27*a* becomes minimum, and amount of the magnetic flux which flows between the magnetic salient poles 278 and the magnetic teeth 274 is made into the minimum.

In this embodiment, it was explained that the main magnetic pole 27*b* and the bypass magnetic pole 27*c* are displaced with respect to the field magnet 27*a* according to rotational speed, and the amount of magnetic flux which interlinks with the armature coils 275 can be controlled. Since magnetic force disturbing the displacement is made small on the occasion of the displacement of the main magnetic pole 27*b* and the bypass magnetic pole 27*c*, smooth control is possible. The relationship between rotational speed and the displacement depends on the specification of the weight 27*g* and the spring 27*h* and the shape of the guide groove 27*f*, etc. Although this embodiment has demerit which lacks correctness for control of the interlinking magnetic flux amount with the armature coils 275, this has merit in making a special control device unnecessary by a simple mechanism.

Figure 31:
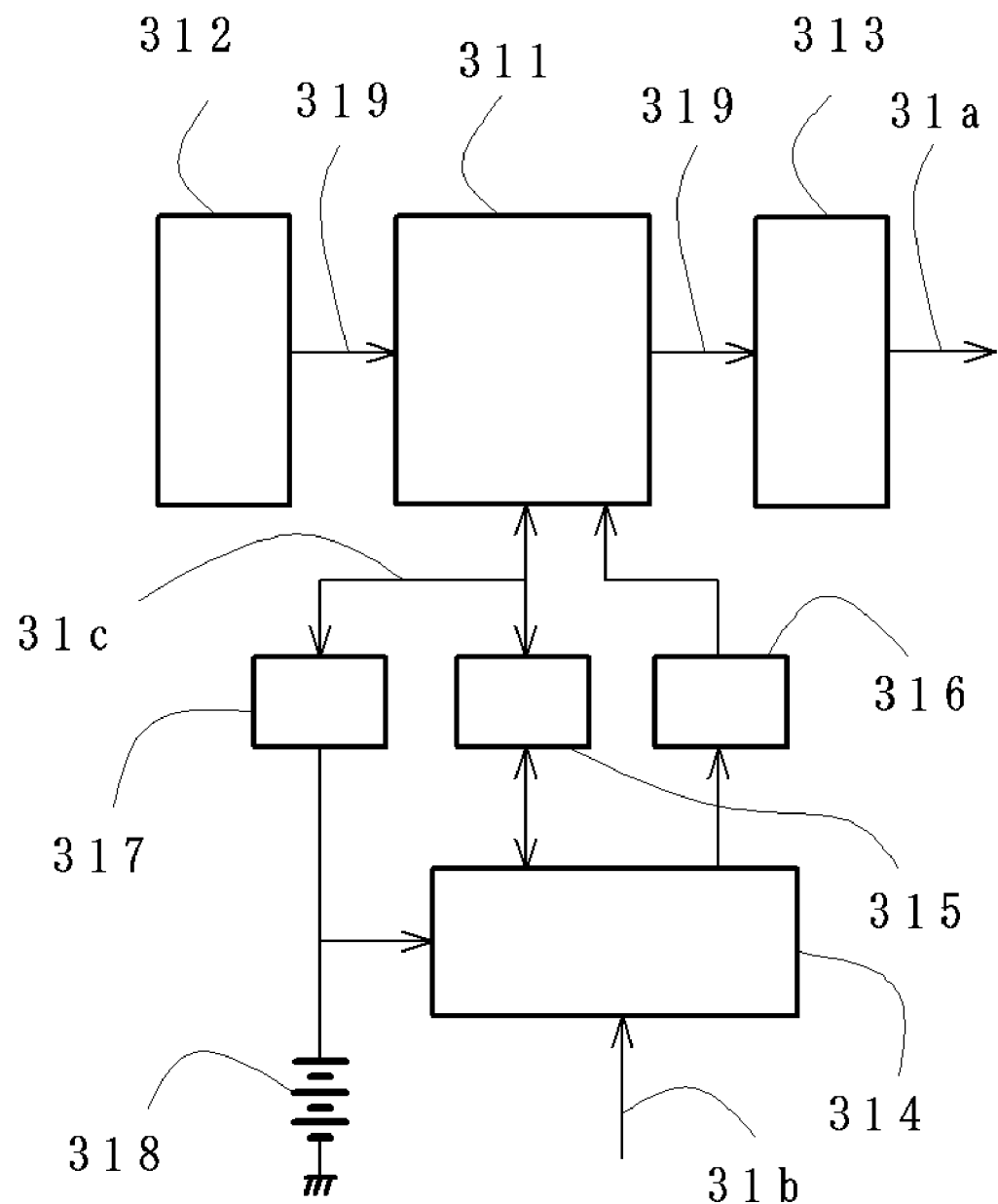
FIG. 31 is a block diagram of a rotating electric machine system for performing field-weakening control according to a seventh embodiment of the present invention.

A rotating electric machine system according to a seventh embodiment of the present invention will be explained by using FIG. 31. The seventh embodiment is a rotating electric machine system which used the rotating electric machine system of the third embodiment as a dynamo and an electric motor of a hybrid car.

In the figure, a number 311 represents the rotating electric machine apparatus shown in the third embodiment, and a rotary shaft 319 of the rotating electric machine apparatus 311 is combined so that torque may be transferred from engine 312 of a hybrid car and by a belt, and torque of rotary shaft 319 is transferred to drive shaft 31*a* through transmission 313. The control device 314 receives the instructions 31*b* from a higher rank control device, drives the rotating electric machine apparatus 311 as an electric motor through the drive circuit 315, and controls the magnetic flux amount in the rotating electric machine 311 through the field control circuit 316. Furthermore, the control device 314 receives the instructions 31*b* from the higher rank control device, rectifies the electric power which appears in the output line 31*c* of the armature coils 76 through the rectifier circuits 317, and charges a battery 318. The control device 314 drives the rotating electric machine apparatus 311 as an electric motor through the drive circuit 315 by directions of instruction 31*b*, and a revolution of engine 312 is assisted or, a revolution makes rotary shaft 319 drive independently, and contribute to the driving force of the hybrid car through transmission 313 and the driving shaft 31*a*.

When magnet torque needs to be strengthened in the low rotating speed region just after starting, the control device 314 supplies the minimum magnetic force current to the armature coil 76 through the drive circuit 315 in the time zone of the magnetic flux amount control section 152 so that magnetic resistances of the main magnetic flux path and the bypass magnetic flux path are effectively made equal each other, and simultaneously displaces the pushrod 11*e* for right direction by the actuator 11*f*, and makes the opposing area of the main magnetic pole 115 and the field magnet 114 larger so that the amount of the magnetic flux flowing between the magnetic teeth 74 and the magnetic salient poles 121, 122 becomes larger. When magnet torque needs to be weakened in the high rotating speed region, the control device 314 supplies the minimum magnetic force current to the armature coil 76 through the drive circuit 315 in the time zone of the magnetic flux amount control section 152, and simultaneously displaces the pushrod 11*e* for left direction by the actuator 11*f*, and makes the opposing area of the main magnetic pole 115 and the field magnet 114 smaller so that the amount of the magnetic flux flowing between the magnetic teeth 74 and the magnetic salient poles 121, 122 becomes smaller.

When the hybrid car can be driven only on the torque of an engine 312, the generated electric power which appears in the output line 31*c* of the armature coils 76 is changed into DC current through the rectifier circuits 317, and makes the battery 318 charge by the instruction 31*b*. In that case, the control device 314 supplies the minimum magnetic force current to the armature coil 76 through the drive circuit 315 in the time zone of the field control section 152 so that magnetic resistances of the main magnetic flux path and the bypass magnetic flux path are effectively made equal each other, and simultaneously controls the actuator 11*f* through the field control circuits 316 to become the optimal voltage that charges the battery 318. Since the rotating electric machine apparatus is used as a constant voltage dynamo, when charging the battery 318, the converter which changes power generation voltage is unnecessary. Furthermore, the expensive converter can be made unnecessary by controlling on the optimal power generation voltage for each battery, even when the battery 318 includes two or more sorts of batteries with different in its voltage.

The present embodiment functions effectively also as an energy recovery system at the time of braking of the hybrid car. When directions of regenerative braking are received through the instructions 31b, the control device 314 supplies the minimum magnetic force current to the armature coil 76 through the drive circuit 315 in the time zone of the magnetic flux amount control section 152 so that magnetic resistances of the main magnetic flux path and the bypass magnetic flux path are effectively made equal each other, and simultaneously displaces the push rod 11e rightward through the field control circuits 316, and makes the opposing area between the main magnetic pole 115 and the field magnet 114 larger, and then the amount of magnetic flux flowing between the magnetic teeth 74 and the magnetic salient poles 121, 122 larger, and generated electric power is made to charge to the battery 318. In having two or more batteries 318, the control device 314 controls the actuator 11f through the field control circuits 316, and controls the magnetic flux flowing between the magnetic teeth 74 and the magnetic salient poles 121, 122 so that the power generation voltage which suits the charge voltage of the battery 318 which has charge remaining power most is obtained. Since the rotating electric machine apparatus 311 is the physique employed as the electric motor for drive, so enough braking force can be generated as a generator for regenerative braking.

Although the seventh embodiment is the rotating electric machine system which is employed as a generator and a motor of a hybrid car, it is also possible to consider as the rotating electric machine system in an electric vehicle. In that case, the engine 312 of a hybrid car is removed in the above-mentioned embodiment, and energy recovery system in the braking time and driving system are composed only by the rotating electric machine system according to an embodiment of the present invention.

As described above, the rotating electric machine system according to embodiments of the present invention has been explained with reference to the embodiments. These embodiments are mere examples for realizing the theme or the purpose of the present invention and do not limit the scope of the invention. For example, although structures where an armature had magnetic teeth in the above-mentioned embodiments were shown. In the rotating electric machine of the conventional axial gap composition, the constructional example which does not arrange magnetic teeth also exists. Moreover, the armature composition example which arranges the printed armature coil on the cylindrical magnetic yoke and does not have magnetic teeth also exists in radial gap structure. This invention can be applied irrespective of the existence of magnetic teeth, and can adopt the optimal armature composition in accordance with the specification of rotating electric machine system. It is natural that a system for realizing the theme or the purpose of the present invention can be accomplished by combining the above-described embodiments or by combining some of the embodiments, and so forth.

INDUSTRIAL APPLICABILITY

The rotating electric machine system has a magnetic excitation part by which every magnetic salient pole group to be magnetized in same polarity is collectively magnetized. The magnetic excitation part is composed so that the magnetic flux flowing through the armature is controlled by mechanical displacement, and the power required for the displacement may be made small. Thereby, the rotating electric machine system and the magnetic flux amount control method in which magnetic field control is easy are provided. The rotating electric machine system according to an embodiment of the present invention can be utilized as a high-power electric motor similarly to a conventional rotating electric machine, and additionally, enlarges the range of the practicable rotational speed, and furthermore, improves the function of the power generation, and also can control the power-generation function.

By applying the present invention as an electric generator and electric motor system for automobile application, the rotational speed range is able to be larger than the conventional one, and additionally, energy recovery in braking is enabled to improve the comprehensive energy consumption. Furthermore, as the constant-voltage electric generator system, the power-generation voltage can be controlled to be constant in the wider rotational speed range, and therefore, the constant-voltage control circuit is not required, and furthermore, it becomes possible that a converter is not required for various types of battery charges in which voltages are different, and the entire system cost can be reduced.

It should be noted that the exemplary embodiments depicted and described herein set forth the preferred embodiments of the present invention, and are not meant to limit the scope of the claims hereto in any way. Numerous modifications and variations of the present invention are possible in light of the above teachings. It is therefore to be understood that, within the scope of the appended claims, the invention may be practiced otherwise than as specifically described herein.

What is claimed is:

1. A rotating electric machine system comprising:
an armature having an armature coil;
a surface magnetic pole having a plurality of magnetic salient poles arranged in a circumferential direction opposing the armature, said surface magnetic pole and the armature being concentric with each other with respect to an axis of rotation and being capable of rotating relatively to each other; and
a magnetic excitation part for magnetizing collectively every group of the magnetic salient poles to be magnetized in a same polarity, the magnetic excitation part including a field magnet, a main magnetic pole and a bypass magnetic pole, and the field magnet having a first magnet pole which represents one of N pole and S pole of the field magnet and a second magnet pole which represents the other pole of the field magnet, the first magnet pole facing the main magnetic pole and the bypass magnetic pole;
wherein the first magnet pole, the main magnetic pole, the magnetic salient pole, the armature, the bypass magnetic pole and the second magnet pole are arranged to form a main magnetic flux path in which a magnetic flux flowing from the first magnet pole to the main magnetic pole returns to the second magnet pole through the magnetic salient poles and the armature, and a bypass magnetic flux path in which the magnetic flux flowing from the first magnet pole to the bypass magnetic pole returns to the second magnet pole mainly in the magnetic excitation part, the main magnetic flux path and the bypass magnetic flux path being connected to the field magnet in parallel;
either one of the field magnet and the unit of the main magnetic pole and the bypass magnetic pole is composed as a movable magnetic pole part capable of being relatively displaced to the other one so as to change the area where the first magnet pole faces the main magnetic pole, and the area where the first magnet pole faces the bypass magnetic pole, with a sum of the areas being kept substantially constant; and
an amount of the magnetic flux flowing through the armature is controlled by displacing the movable magnetic pole part according to an output of the rotating electric machine system so that the output is optimized.

2. The rotating electric machine system according to claim 1,
wherein a magnetic resistance of the bypass magnetic flux path and a magnetic resistance of the main magnetic flux path are set almost equal each other as a minimum magnetic force condition.

3. The rotating electric machine system according to claim 1,
wherein a magnetic resistance between the bypass magnetic flux path and the main magnetic flux path is established larger than a difference between a magnetic resistance of the bypass magnetic flux path and a magnetic resistance of the main magnetic flux path.

4. The rotating electric machine system according to claim 1, further comprising a magnetic resistance adjusting means to adjust a magnetic resistance of the main magnetic flux path or the bypass magnetic flux path,
wherein a magnetic resistance of the main magnetic flux path or the bypass magnetic flux path is adjusted so that a power required for displacing the movable magnetic pole part may be made into smallness.

5. The rotating electric machine system according to claim 4,
wherein a magnetic resistance of the bypass magnetic flux path and a magnetic resistance of the main magnetic flux path are adjusted to the minimum magnetic force condition by the magnetic resistance adjustment means at a time of changing a magnetic flux amount flowing through the armature.

6. The rotating electric machine system according to claim 4,
wherein when increasing a magnetic flux amount flowing through the armature, the magnetic resistance adjustment means adjusts a magnetic resistance of the main magnetic flux path to be smaller or the bypass magnetic flux path thereof to be larger from the minimum magnetic force condition,
when decreasing the magnetic flux amount flowing through the armature, the magnetic resistance adjustment means adjusts a magnetic resistance of the main magnetic flux path to be larger or the bypass magnetic flux path thereof to be smaller from the minimum magnetic force condition, and
the movable magnetic pole part is made to displace simultaneously.

7. The rotating electric machine system according to claim 4, further comprising:
a magnetic force detecting means to detect a magnetic force added to the movable magnetic pole part for a magnetic resistance of the main magnetic flux path and magnetic resistance of the bypass magnetic flux path deviating from the minimum magnetic force condition; and
a control device for supervising a relation between the magnetic force and intermittently changed a parameter of the magnetic resistance adjusting means or a relation between the magnetic force and a parameter of the magnetic resistance adjusting means during normal operation, setting up said parameter making the magnetic force smaller as the minimum magnetic force condition.

8. The rotating electric machine system according to claim 4,
wherein a gap length adjusting means to adjust a gap length in an air gap disposed in the bypass magnetic flux path is provided for the magnetic resistance adjusting means, and
a magnetic resistance of the bypass magnetic flux path is adjusted so that a power required for displacing the movable magnetic pole part may be made into smallness.

9. The rotating electric machine system according to claim 4,
wherein a magnetic resistance adjusting coil wound around the bypass magnetic flux path is provided for the magnetic resistance adjusting means, and
a magnetic resistance of the bypass magnetic flux path is adjusted by supplying a predetermined current to the magnetic resistance adjusting coil so that a power required for displacing the movable magnetic pole part may be made into smallness.

10. The rotating electric machine system according to claim 4,
wherein means to supply a predetermined current to the armature coil for driving a rotor in acceleration or deceleration direction is provided for the magnetic resistance adjusting means, and
a magnetic resistance of the main magnetic flux path is adjusted effectively by supplying the predetermined current to the armature coil at a time of displacing the movable magnetic pole part so that a power required for displacing the movable magnetic pole part may be made into smallness.

11. The rotating electric machine system according to claim 4,
wherein a predetermined constant current load is provided for the magnetic resistance adjusting means, and
the predetermined constant current load is connected to the armature coil at a time of displacing the movable magnetic pole part, a predetermined current is made to flow in the armature coil by an induced voltage, and a magnetic resistance of the main magnetic flux path is adjusted effectively so that a power required for displacing the movable magnetic pole part may be made into smallness.

12. The rotating electric machine system according to claim 1,
wherein a part of a magnetic flux path from the field magnet to the magnetic salient pole is made of a magnetic material having larger conductivity on the average than the magnetic salient pole.

13. The rotating electric machine system according to claim 1,
wherein in the magnetic excitation part, the field magnet and a non-magnetic portion are disposed one after another in a circumferential direction,
the main magnetic pole and the bypass magnetic pole are composed to line side by side in a circumferential direction oppositely to the first magnet pole, and
the field magnet and a unit of the main magnetic pole and the bypass magnetic pole are composed so as to be capable of being relatively displaced in a circumferential direction.

14. The rotating electric machine system according to claim 1,
wherein the main magnetic pole and the bypass magnetic pole are composed to line in an axial direction oppositely to the first magnet pole of the field magnet, and the field magnet and a unit of the main magnetic pole and the bypass magnetic pole are composed so as to be capable of being relatively displaced in an axial direction.

15. The rotating electric machine system according to claim 1, further comprising a displacement regulating means for keeping a position of the movable magnetic pole part within a range that an area of the first magnet pole of the field magnet opposed to the main magnetic pole and an area of the first magnet pole opposed to the bypass magnetic pole are changed while a sum of the area of each above is maintained to be constant.

16. The rotating electric machine system according to claim 1,
wherein the armature further includes a magnetic yoke disposed around an axis,
the surface magnetic pole part is disposed in a rotor side and has the magnetic salient pole and a non-magnetic portion disposed one after another in a circumferential direction, and
the magnetic excitation part is disposed so as to magnetize the magnetic salient pole in a same polarity.

17. The rotating electric machine system according to claim 1,
wherein the surface magnetic pole part and the armature are opposed in a radial direction,
each rotor has the surface magnetic pole part having the magnetic salient pole and a non-magnetic portion disposed one after another in a circumferential direction,
two rotors are disposed axially so that the magnetic salient pole of one rotor corresponds to the non-magnetic portion of the other rotor, and
the magnetic excitation part is disposed so as to magnetize the magnetic salient pole of the two rotors to be different polarity from each other.

18. The rotating electric machine system according to claim 1,
wherein the surface magnetic pole part has the magnetic salient pole and a non-magnetic portion disposed one after another in a circumferential direction, and
the magnetic excitation part is disposed so as to magnetize the contiguous magnetic salient pole to be different polarity from each other.

19. The rotating electric machine system according to claim 1,
wherein the surface magnetic pole part has the magnetic salient pole and a permanent magnet with approximately circumferential direction magnetization disposed one after another in a circumferential direction,
a magnetization direction of the contiguous permanent magnet is arranged inversely to each other so that the contiguous magnetic salient pole is magnetized in different polarity from each other, and
the magnetic excitation part is disposed so that the magnetic excitation part and the permanent magnet magnetize the magnetic salient pole to a same polarity.

20. The rotating electric machine system according to claim 1,
wherein a permanent magnet assembly having permanent magnet plates with same approximately circumferential direction magnetization on both sides of a magnetic material is an equivalent permanent magnet,
the surface magnetic pole part has the magnetic salient pole and the permanent magnet assembly with approximately circumferential direction magnetization disposed one after another in a circumferential direction,
a magnetization direction of the contiguous permanent magnet assembly is arranged inversely to each other so that the contiguous magnetic salient pole is magnetized in different polarity from each other, and
the magnetic excitation part is disposed so that the magnetic excitation part and the permanent magnet assembly magnetize the magnetic salient pole to a same polarity.

21. The rotating electric machine system according to claim 1,
wherein the surface magnetic pole part and the armature are opposed in a radial direction,
the surface magnetic pole part is disposed in a rotor side and is composed so that contiguous magnetic salient poles are extended to different directions from each other along a axial direction and extended portions are served as a first extension part and a second extension part according to an extended axial direction, and
the magnetic excitation part is disposed in the rotor and magnetizes contiguous magnetic salient poles to be different polarities from each other through the first extension part and the second extension part.

22. The rotating electric machine system according to claim 1, further comprising a magnetic yoke disposed in the armature,
wherein the surface magnetic pole part and the armature are opposed in a radial direction,
the surface magnetic pole part is disposed in a rotor side and is composed so that contiguous magnetic salient poles are extended to different directions from each other along a axial direction and extended portions are served as a first extension part and a second extension part according to an extended axial direction, and
two magnetic excitation parts are disposed on a stationary side opposing to both ends of a rotor respectively through an air gap, and supply a magnetic flux between the first extension part and the magnetic yoke, and between the second extension part and the magnetic yoke respectively so that contiguous magnetic salient poles are magnetized to be different polarities from each other.

23. The rotating electric machine system according to claim 1,
wherein the surface magnetic pole part and the armature are opposed in a radial direction,
the surface magnetic pole part is disposed in a rotor side and is composed so that contiguous magnetic salient poles are extended to an axial direction and a radial direction from each other and extended portions are served as a first extension part and a second extension part according to the extended direction, and
the magnetic excitation part are disposed on a stationary side of an end of a rotor through an air gap, and supplies a magnetic flux between the first extension part and the second extension part so that contiguous magnetic salient poles are magnetized to be different polarities from each other.

24. The rotating electric machine system according to claim 1, further comprising a mechanism to maintain a displacement position of the movable magnetic pole part,
wherein an amount of the magnetic flux flowing through the armature is controlled intermittently.

25. The rotating electric machine system according to claim 1, further comprising a control device,
wherein a rotational force is an input,
the control device makes the movable magnetic pole part displace so as to set an opposed area between the first magnet pole and the main magnetic pole to be smaller when a power generation voltage induced in an armature coil is larger than a predetermined value, and makes the movable magnetic pole part displace so as to set the opposed area between the first magnet pole and the main magnetic pole to be larger when the power generation voltage is smaller than the predetermined value, and the power generation voltage is controlled to be the predetermined value.

26. The rotating electric machine system according to claim 1, further comprising a control device, wherein a current supplied to an armature coil is an input, and the control device makes the movable magnetic pole part displace so as to set an opposed area between the first magnet pole and the main magnetic pole to be smaller when a rotational speed is larger than a predetermined value and an amount of a magnetic flux flowing through the armature is to be reduced, and makes the movable magnetic pole part displace so as to set an opposed area between the first magnet pole and the main magnetic pole to be larger when the rotational speed is smaller than the predetermined value and an amount of a magnetic flux flowing through the armature is to be increased, and thereby a rotational force is optimally controlled.

27. The rotating electric machine system according to claim 1, further comprising a control device, wherein a current supplied to an armature coil is an input, a rotational force is an output, when a rotational speed is to be reduced, the control device makes the movable magnetic pole part displace so that an opposed area between the first magnet pole and the main magnetic pole becomes larger, and an amount of a magnetic flux flowing through the armature becomes larger to take out a rotational energy as a power generation output.

28. A rotating electric machine system comprising:

an armature having an armature coil;

a surface magnetic pole having a plurality of magnetic salient poles arranged in a circumferential direction opposing the armature, said surface magnetic pole and the armature being concentric with each other with respect to an axis of rotation and being capable of rotating relatively to each other; and a magnetic excitation part for magnetizing collectively every group of the magnetic salient poles to be magnetized in a same polarity, the magnetic excitation part including a field magnet, a main magnetic pole and a bypass magnetic pole, and the field magnet having a first magnet pole which represents one of N pole and S pole of the field magnet and a second magnet pole which represents the other pole of the field magnet, the first magnet pole facing the main magnetic pole and the bypass magnetic pole;

wherein the first magnet pole, the main magnetic pole, the magnetic salient pole, the armature, the bypass magnetic pole and the second magnet pole are arranged to form a main magnetic flux path in which a magnetic flux flowing from the first magnet pole to the main magnetic pole returns to the second magnet pole through the magnetic salient poles and the armature, and a bypass magnetic flux path in which the magnetic flux flowing from the first magnet pole to the bypass magnetic pole returns to the second magnet pole mainly in the magnetic excitation part, the main magnetic flux path and the bypass magnetic flux path being connected to the field magnet in parallel;

a magnetic resistance of the bypass magnetic flux path and a magnetic resistance of the main magnetic flux path are set almost equal each other;

either one of the field magnet and the unit of the main magnetic pole and the bypass magnetic pole is composed as a movable magnetic pole part capable of being relatively displaced to the other one so as to change the area where the first magnet pole faces the main magnetic pole, and the area where the first magnet pole faces the bypass magnetic pole, with a sum of the areas being kept substantially constant; and an amount of the magnetic flux flowing through the armature is controlled by displacing the movable magnetic pole part according to an output of the rotating electric machine system so that the output is optimized.

29. A method for controlling an amount of a magnetic flux flowing through an armature of a rotating electric machine including the armature having an armature coil, a surface magnetic pole part having a plurality of magnetic salient poles arranged in a circumferential direction opposing the armature, and a magnetic excitation part for magnetizing collectively every group of the magnetic salient pole to be magnetized in a same polarity, the surface magnetic pole part and the armature opposing each other and concentric with respect to a rotational axis, said method comprising:

setting that one of N pole and S pole of the field magnet serves as a first magnet pole, and the other pole of the field magnet works as a second magnet pole, locating the first magnet pole to face a main magnetic pole and a bypass magnetic pole, arranging the first magnet pole, the second magnet pole, the main magnetic pole, the bypass magnetic pole, the magnetic salient pole and the armature to form a main magnetic flux path for a magnetic flux circulating from the first magnet pole to the second magnet pole through the main magnetic pole and the magnetic salient pole and the armature, and a bypass magnetic flux path for a magnetic flux circulating from the first magnet pole to the second magnet pole mainly in the magnetic excitation part through the bypass magnetic pole, the main magnetic flux path and the bypass magnetic flux path being connected to the field magnet in parallel;

composing either one of the field magnet and a unit of the main magnetic pole and the bypass magnetic pole as a movable magnetic pole part relatively displaceable to the other to change an area of the first magnet pole facing the main magnetic pole and an area of the first magnet pole facing the bypass magnetic pole while a sum of the areas is kept substantially constant according to displacement of the movable magnetic pole part; and displacing the movable magnetic pole part to control an amount of magnetic flux flowing through the armature.

30. The method of controlling an amount of the magnetic flux according to claim 29 further comprising:

setting a magnetic resistance of the bypass magnetic flux path and a magnetic resistance of the main magnetic flux path almost equal each other as a minimum magnetic force condition.

31. The method of controlling an amount of the magnetic flux according to claim 29, further comprising:

providing a magnetic resistance adjusting means to adjust a magnetic resistance of the main magnetic flux path or the bypass magnetic flux path; and adjusting a magnetic resistance of the main magnetic flux path or the bypass magnetic flux path so that a power required for displacing the movable magnetic pole part may be made into smallness.

32. The method of controlling an amount of the magnetic flux according to claim 31, further comprising:
adjusting a magnetic resistance of the main magnetic flux path and a magnetic resistance of the bypass magnetic flux path to the minimum magnetic force condition at a time of changing a magnetic flux amount flowing through the armature.

33. The method of controlling an amount of the magnetic flux according to claim 31, further comprising:
adjusting a magnetic resistance of the main magnetic flux path to be smaller or a magnetic resistance of the bypass magnetic flux path to be larger from the minimum magnetic force condition at a time of increasing a magnetic flux amount flowing through the armature;
adjusting a magnetic resistance of the main magnetic flux path to be larger or a magnetic resistance of the bypass magnetic flux path to be smaller from the minimum magnetic force condition at a time of decreasing the magnetic flux amount; and
displacing the movable magnetic pole part simultaneously.

34. The method for controlling an amount of the magnetic flux according to claim 31, further comprising:
detecting a magnetic force added to the movable magnetic pole part for a magnetic resistance of the main magnetic flux path and the bypass magnetic flux path deviating from the minimum magnetic force condition;
supervising a relation between the magnetic force and intermittently changed a parameter of the magnetic resistance adjusting means or a relation between the magnetic force and a parameter of the magnetic resistance adjusting means during normal operation; and
setting up the parameter to make the magnetic force smaller as the minimum magnetic force condition.

* * * * *